United States Patent
Hatch

(10) Patent No.: US 11,861,297 B2
(45) Date of Patent: Jan. 2, 2024

(54) SMART INTERFACE WITH FACILITATED INPUT AND MISTAKE RECOVERY

(71) Applicant: I.Q. JOE, LLC, Torrance, CA (US)

(72) Inventor: Jeffrey James Hatch, Wilmington, CA (US)

(73) Assignee: I.Q. JOE, LLC, Torrance, CA (US)

(*) Notice: Subject to any disclaimer, the term of this patent is extended or adjusted under 35 U.S.C. 154(b) by 0 days.

(21) Appl. No.: 17/811,813

(22) Filed: Jul. 11, 2022

(65) Prior Publication Data

US 2023/0169260 A1 Jun. 1, 2023

Related U.S. Application Data

(63) Continuation of application No. 17/302,672, filed on May 10, 2021, now Pat. No. 11,386,260, which is a continuation of application No. 15/965,619, filed on Apr. 27, 2018, now Pat. No. 11,003,839.

(60) Provisional application No. 62/492,005, filed on Apr. 28, 2017.

(51) Int. Cl.
| | |
|---|---|
| G06F 3/00 | (2006.01) |
| G06F 40/166 | (2020.01) |
| G10L 15/22 | (2006.01) |
| G06F 3/04886 | (2022.01) |
| G06F 3/01 | (2006.01) |

(52) U.S. Cl.
CPC ........ *G06F 40/166* (2020.01); *G06F 3/04886* (2013.01); *G10L 15/22* (2013.01); *G10L 2015/221* (2013.01)

(58) Field of Classification Search
None
See application file for complete search history.

(56) References Cited

U.S. PATENT DOCUMENTS

| | | | |
|---|---|---|---|
| 4,481,598 | A | 11/1984 | Ishiwata |
| 4,545,022 | A | 10/1985 | Hughins |
| 5,025,403 | A | 6/1991 | Stephens |
| 5,089,980 | A | 2/1992 | Bunsen et al. |
| 6,854,001 | B2 | 2/2005 | Good et al. |
| 8,074,172 | B2 | 12/2011 | Kocienda et al. |
| 8,232,973 | B2 | 7/2012 | Kocienda et al. |
| 8,504,600 | B2 | 8/2013 | Hatch |
| 8,788,548 | B2 | 7/2014 | Hatch |

(Continued)

OTHER PUBLICATIONS

PCT International Search Report, App. No.: PCT/US2009/032448, dated Jun. 22, 2009, in 3 pages.

(Continued)

*Primary Examiner* — Toan H Vu
(74) *Attorney, Agent, or Firm* — Knobbe Martens Olson & Bear LLP

(57) ABSTRACT

Systems, methods, and devices including smart interfaces with facilitated input and mistake recovery are described. For example, a smart interface system can identify one or more portions of user input as alterable decisions, and, for each of the one or more alterable decisions, store, in a memory, information about one or more alternative options for the alterable decision. The system can also identify one of the alterable decisions as the currently alterable decision, and upon receiving an input indicative of an actuation of the alteration key, alter the currently alterable decision to another of the one or more alternative options based on the stored information.

20 Claims, 56 Drawing Sheets

(56) References Cited

U.S. PATENT DOCUMENTS

| | | | |
|---|---|---|---|
| 8,904,309 B1* | 12/2014 | Zhai | G06F 3/0482 |
| | | | 715/780 |
| 9,176,668 B2* | 11/2015 | Eleftheriou | G06F 3/04842 |
| 9,652,448 B2* | 5/2017 | Pasquero | G06F 40/274 |
| 9,710,070 B2* | 7/2017 | St. Clair | G06F 3/0412 |
| 2005/0179665 A1 | 8/2005 | Kuo | |
| 2008/0104153 A1 | 5/2008 | Hatch | |
| 2008/0168366 A1 | 7/2008 | Kocienda | |
| 2009/0024366 A1 | 1/2009 | Atkinson | |
| 2011/0202876 A1 | 8/2011 | Badger | |
| 2013/0120267 A1 | 5/2013 | Pasquero | |
| 2014/0310639 A1* | 10/2014 | Zhai | G06F 3/0484 |
| | | | 715/780 |
| 2015/0100524 A1 | 4/2015 | Pantel | |
| 2015/0177981 A1 | 6/2015 | Starner | |
| 2015/0302301 A1* | 10/2015 | Petersen | G06N 5/04 |
| | | | 706/11 |
| 2016/0098098 A1 | 4/2016 | St. Clair | |
| 2016/0188526 A1 | 6/2016 | Kai | |
| 2017/0084201 A1 | 3/2017 | Dooley | |
| 2017/0286395 A1* | 10/2017 | Bi | G06F 40/274 |
| 2018/0005161 A1* | 1/2018 | Cong | G06Q 10/06398 |
| 2018/0173692 A1* | 6/2018 | Greenberg | G06F 3/04886 |
| 2018/0210874 A1* | 7/2018 | Fuxman | G06V 20/35 |
| 2019/0304471 A1* | 10/2019 | Elson | G10L 17/22 |

OTHER PUBLICATIONS http://web.archive.org/web/20040401164706/http://ftp.casio.co.jp/pub/world_manual/edu/en/fx115MS_991MS_E.pdf; CASIO Manual; Apr. 1, 2004; pp. 1-42.

http://web.archive.org/web/20010304195513/http://users.ece.gatech.edu/~bonnie/book/TUTORIAL/tut_1.html; MatLab Tutorial; Oct. 30, 2001.

FX-570es User's Guide, Casio, Dec. 31, 2009, http://support.casio.com/pdf/004/fx057ES_Eng.pdf, in 75 pages, See pp. E-8, E-21, E-22.

* cited by examiner

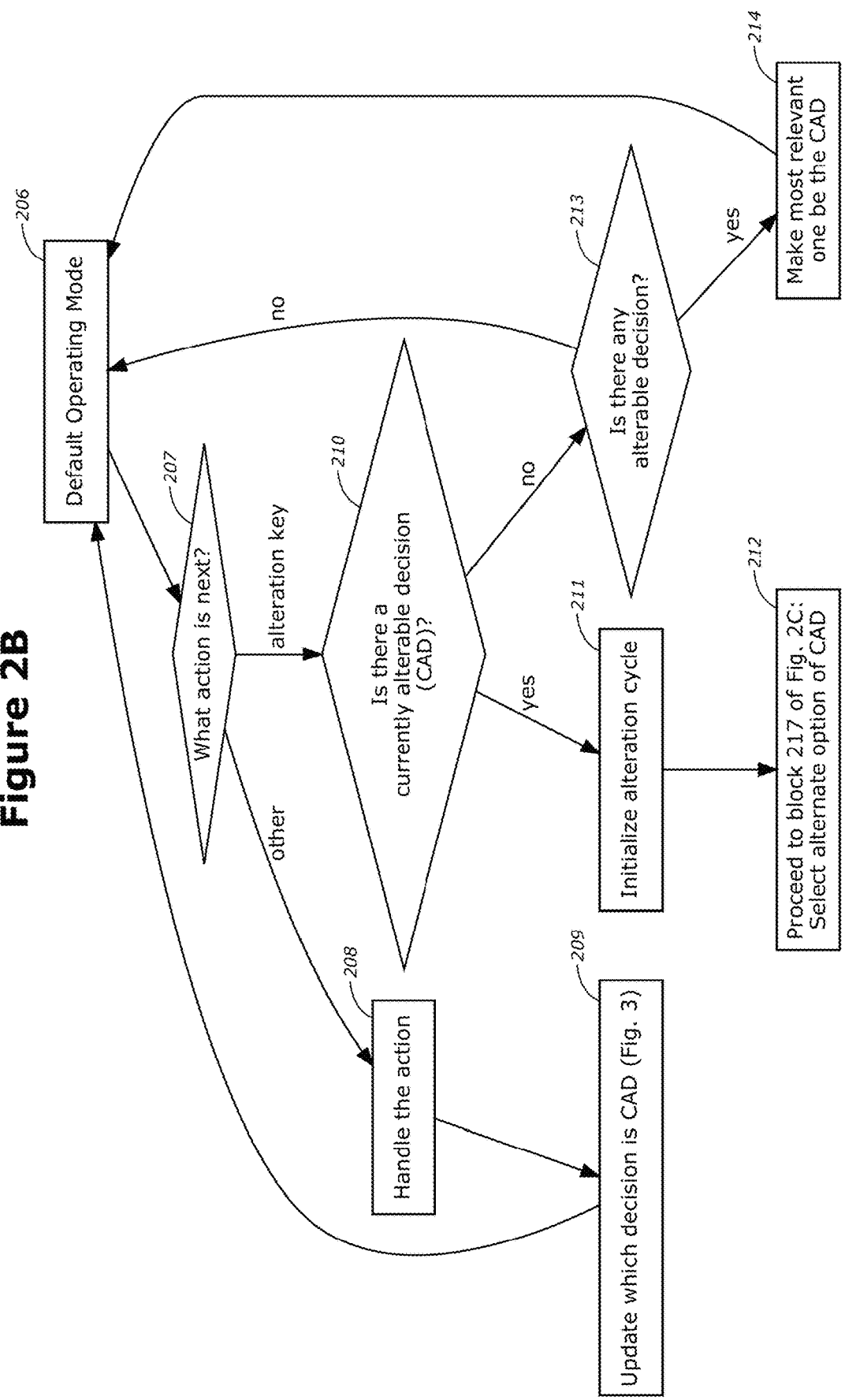

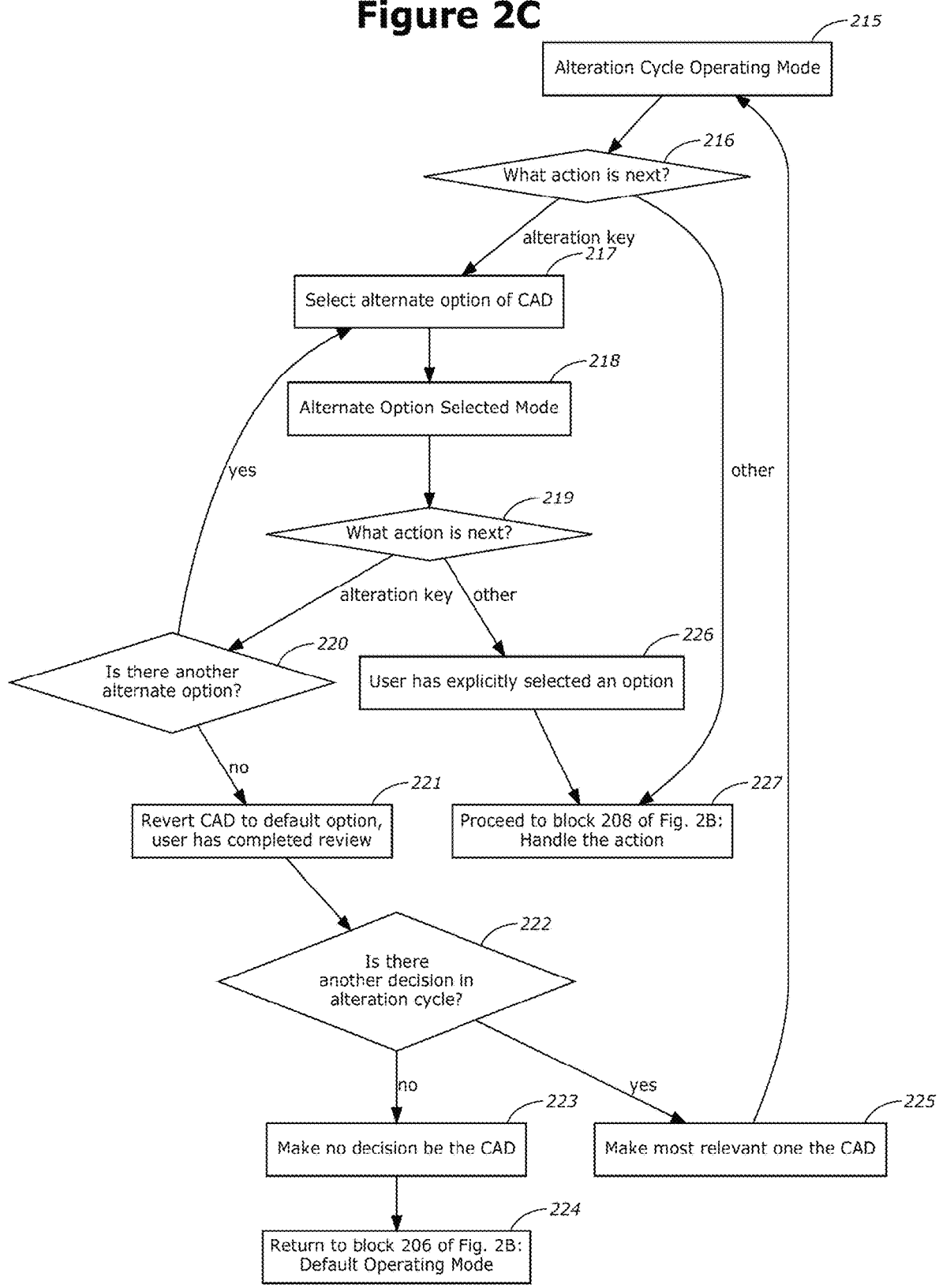

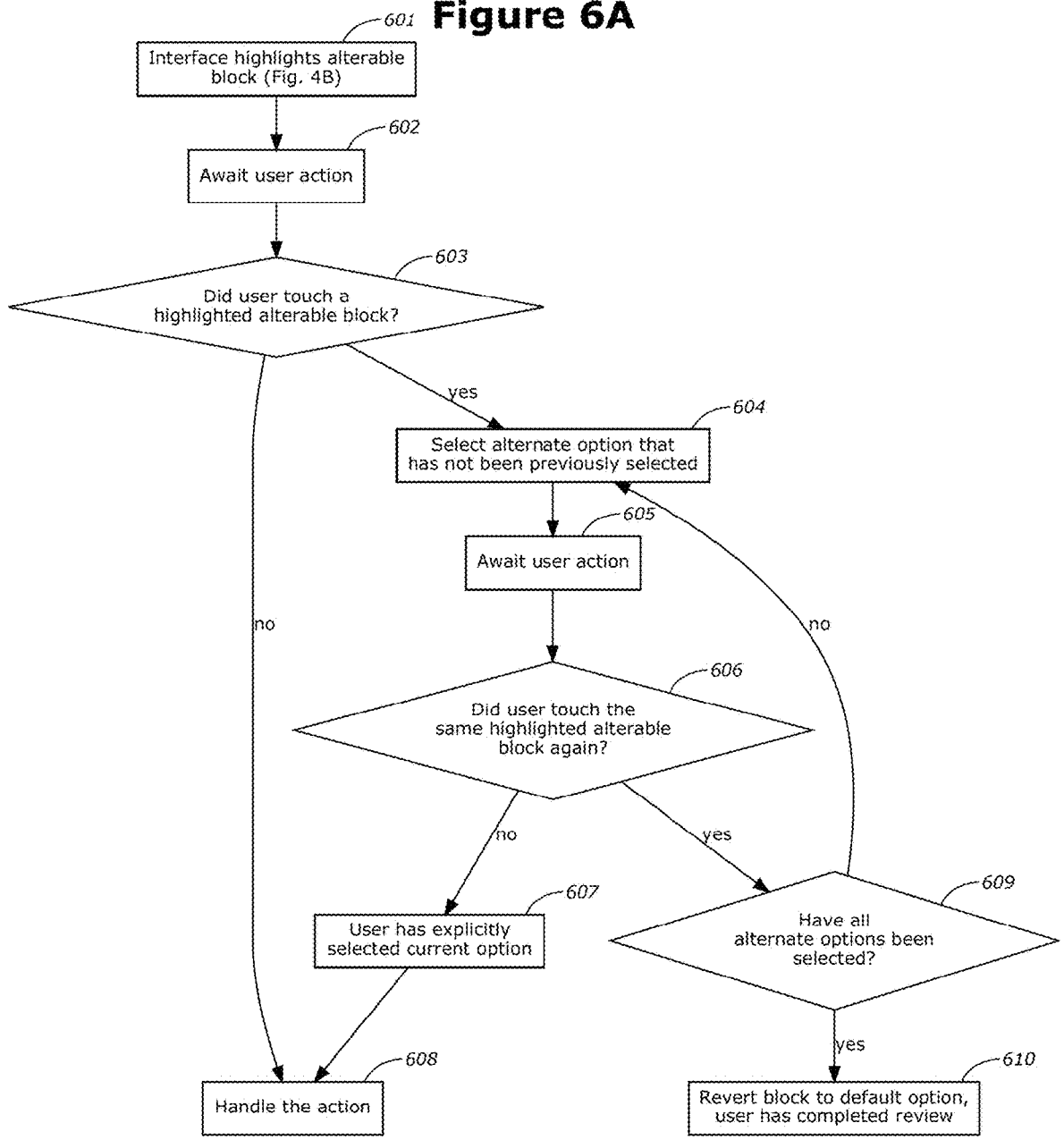

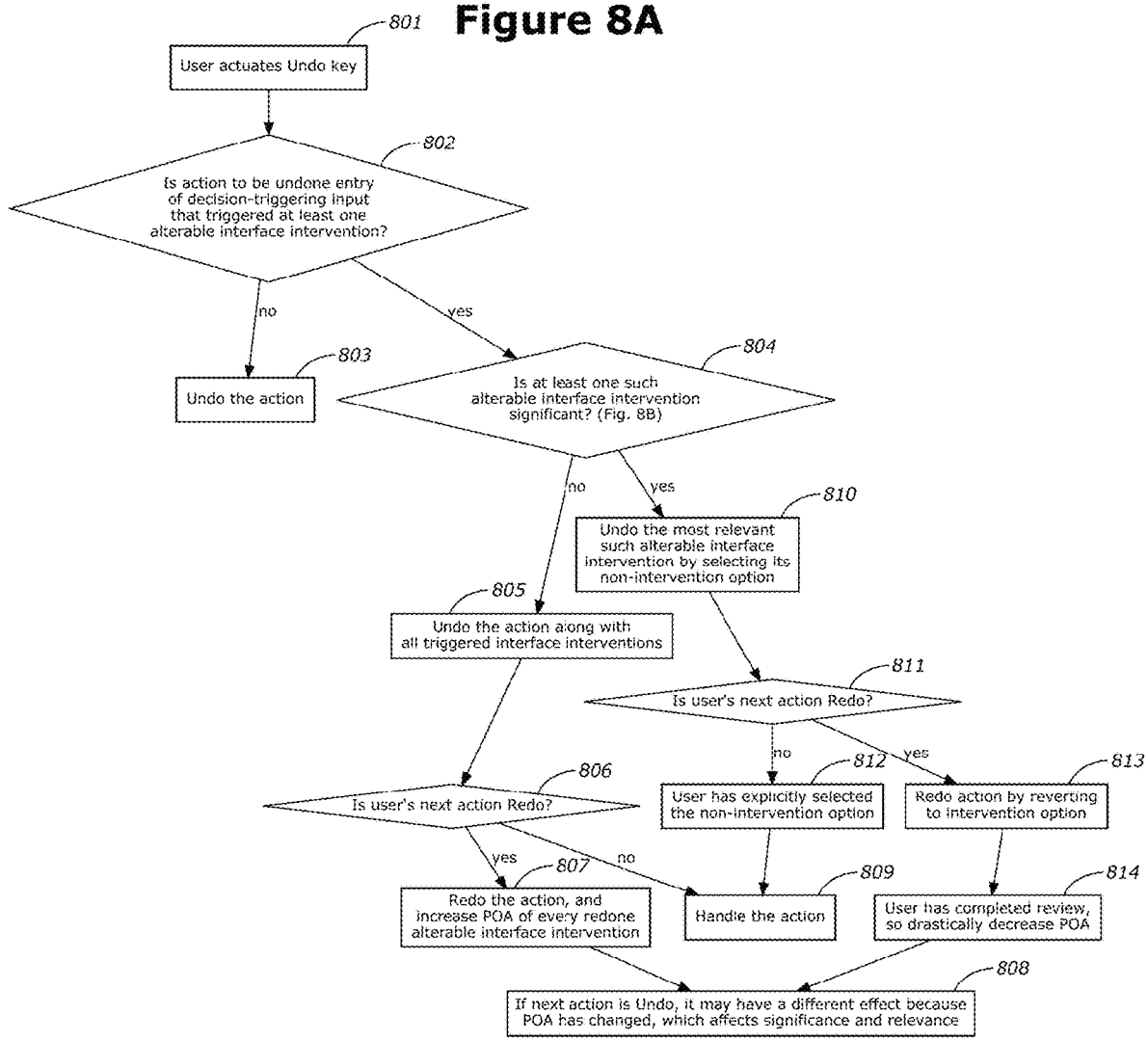

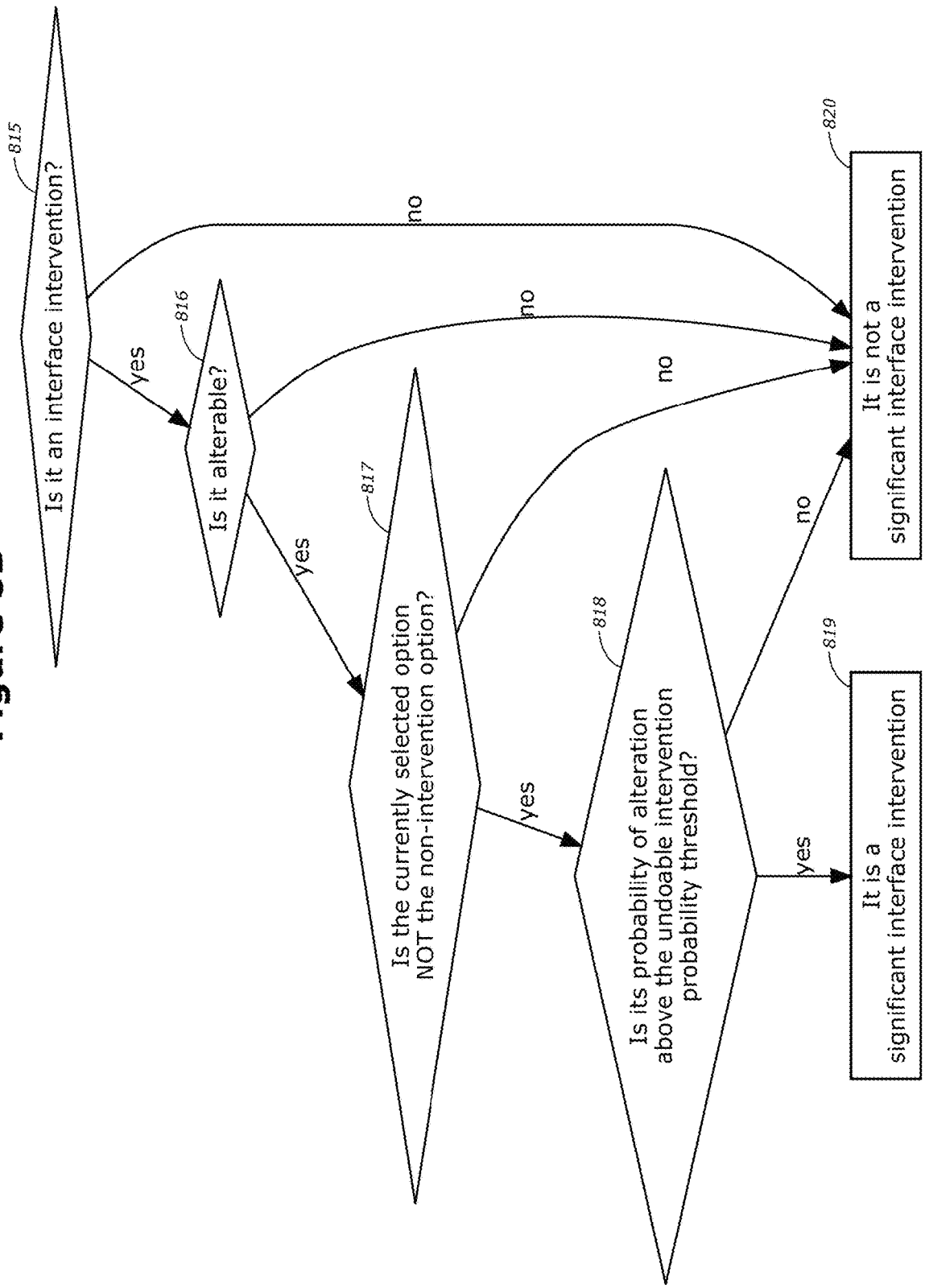

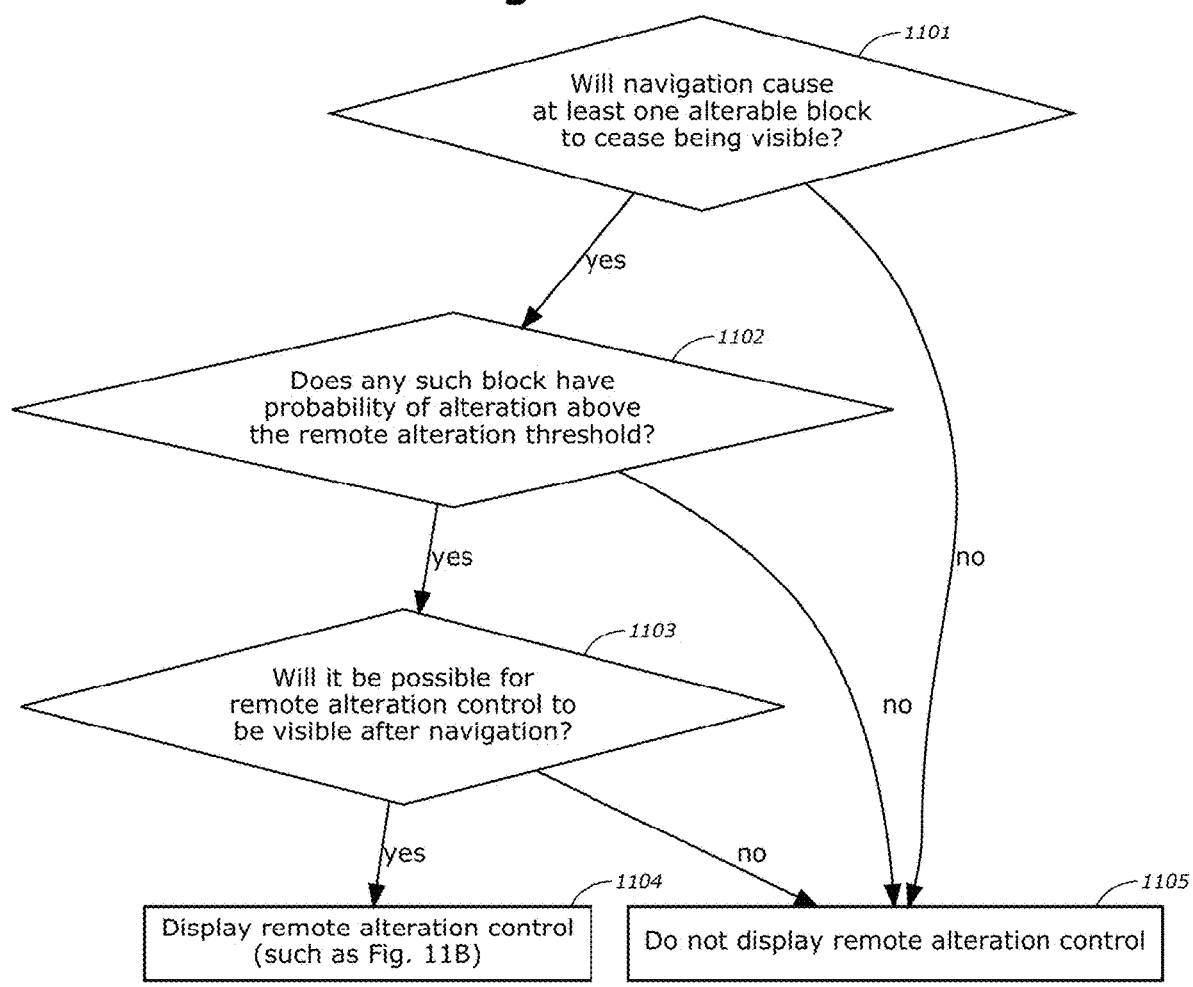

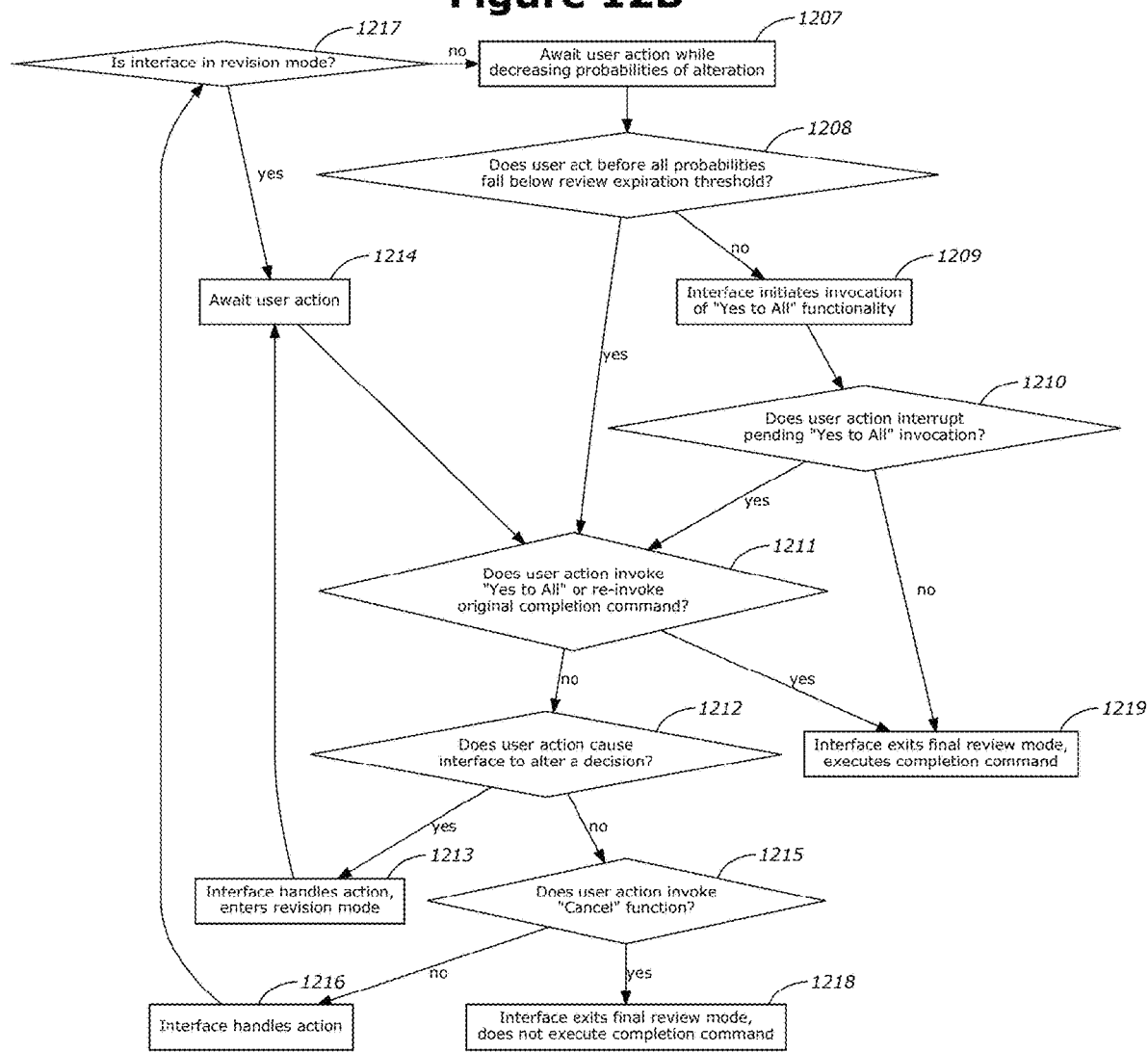

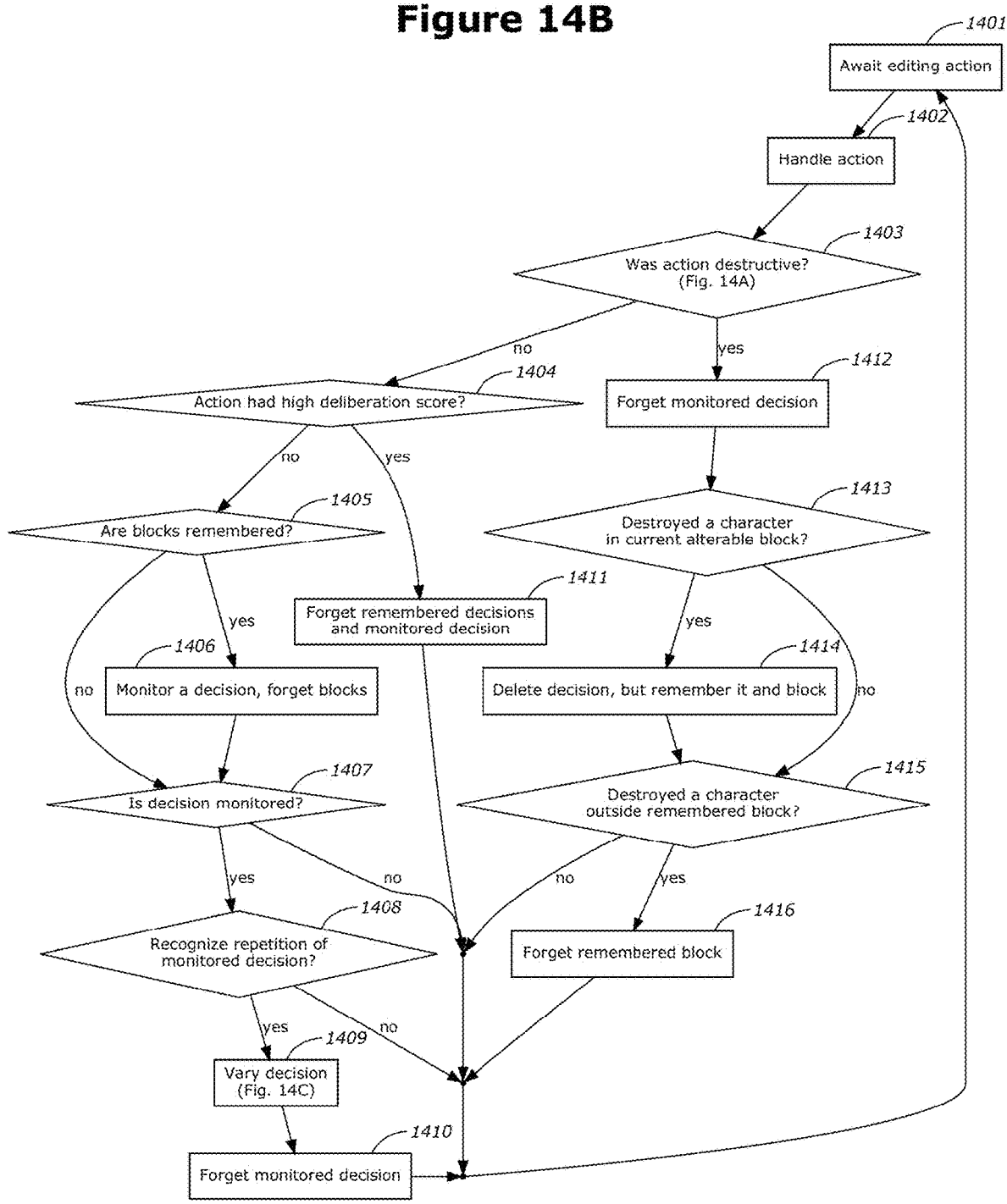

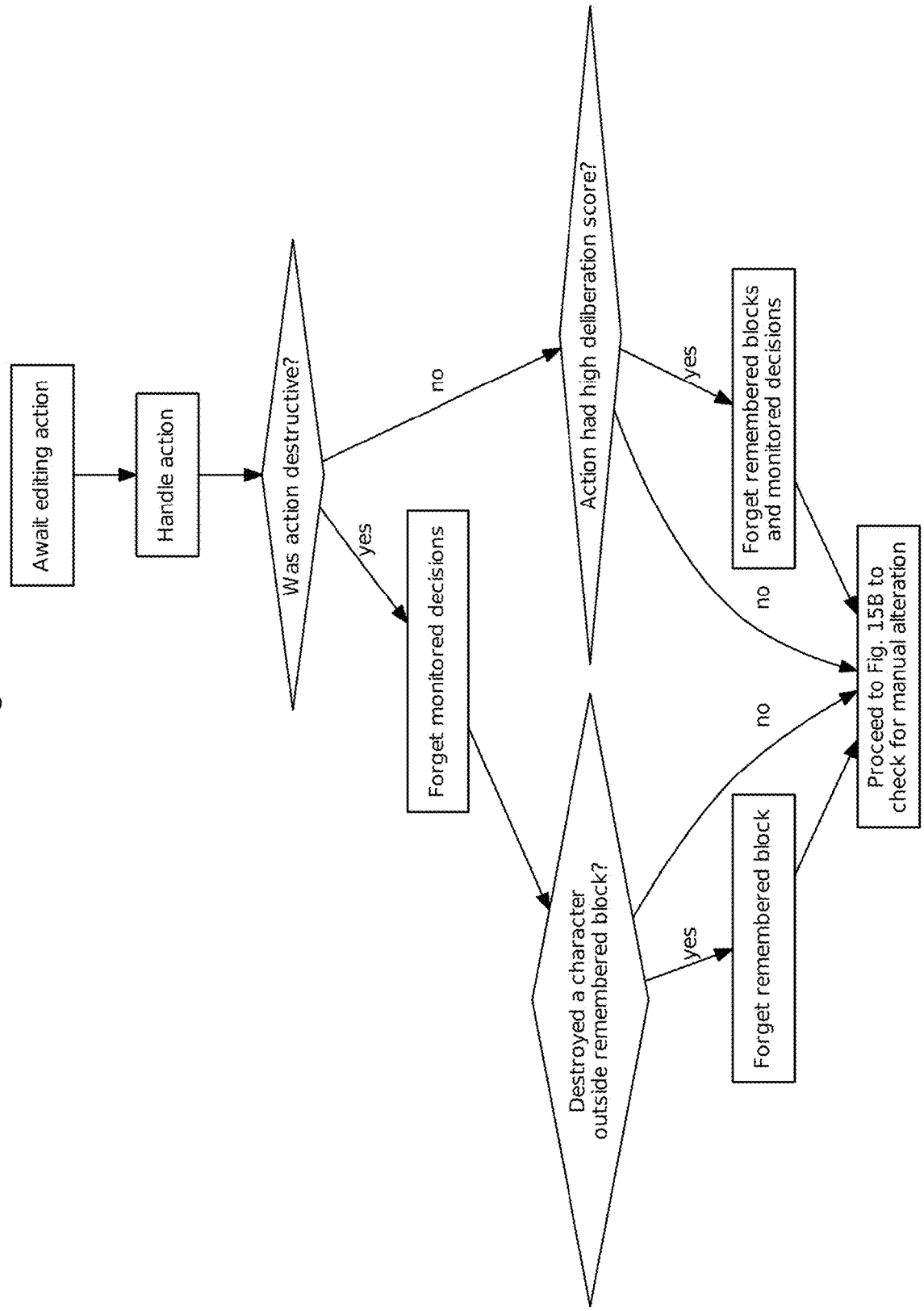

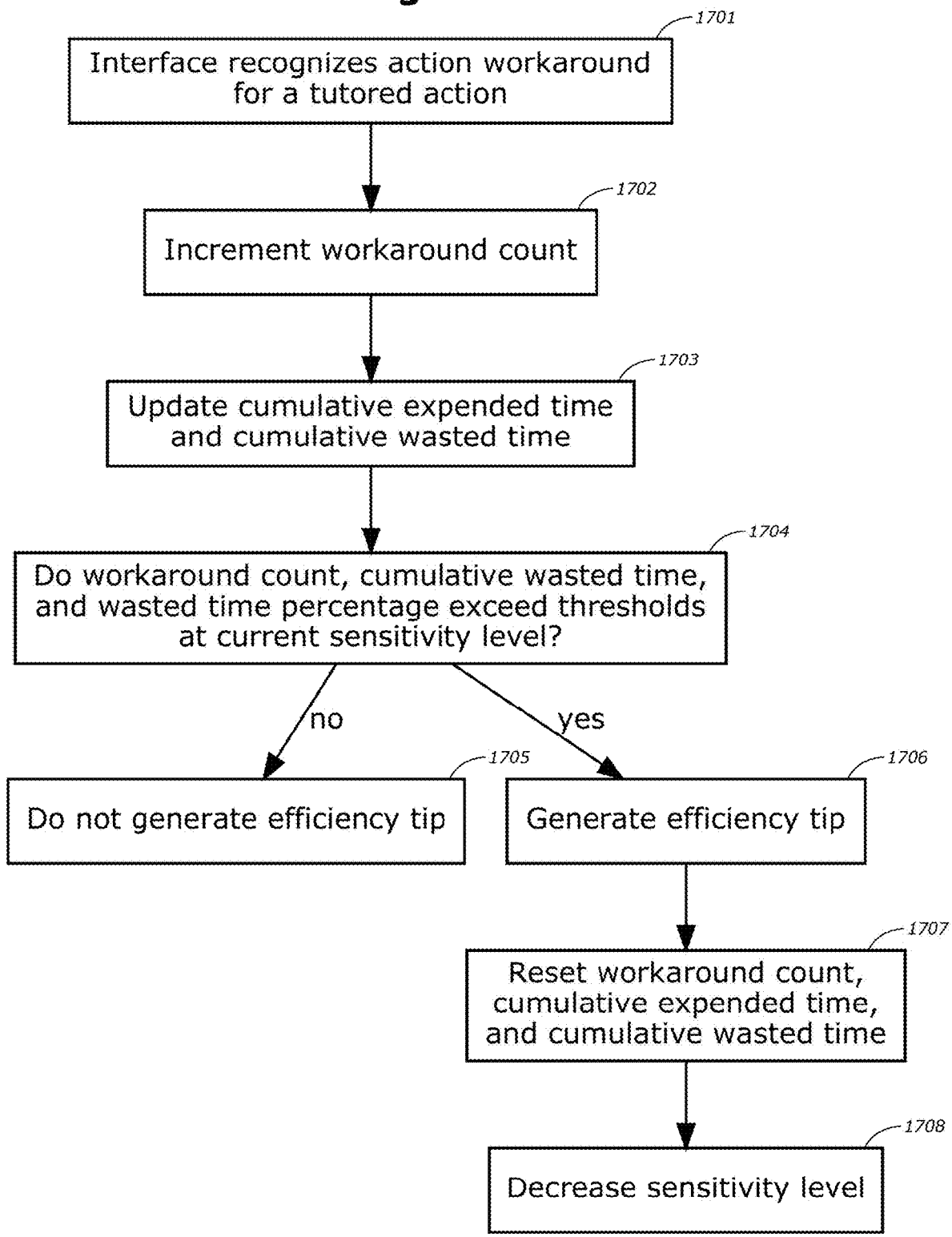

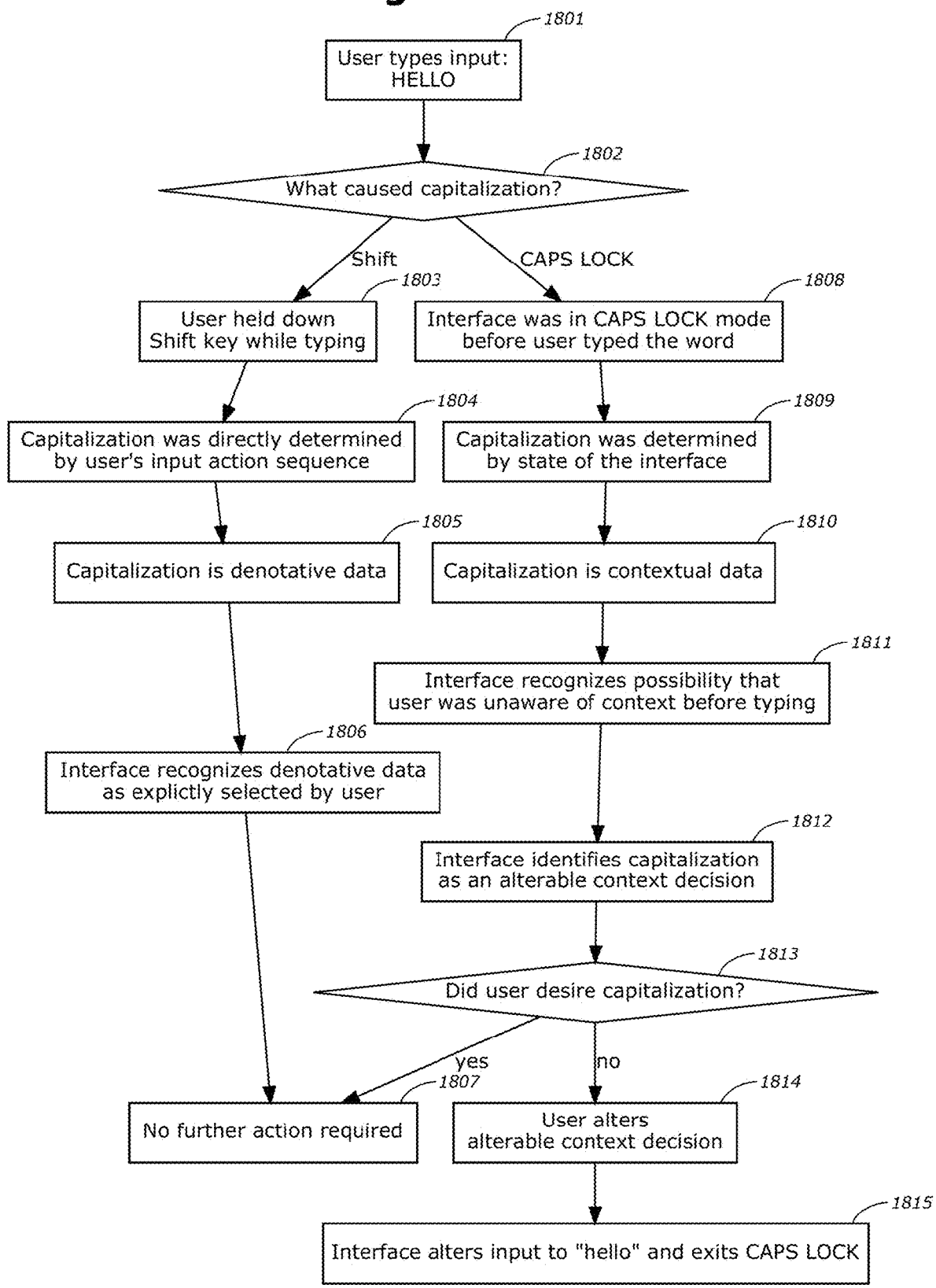

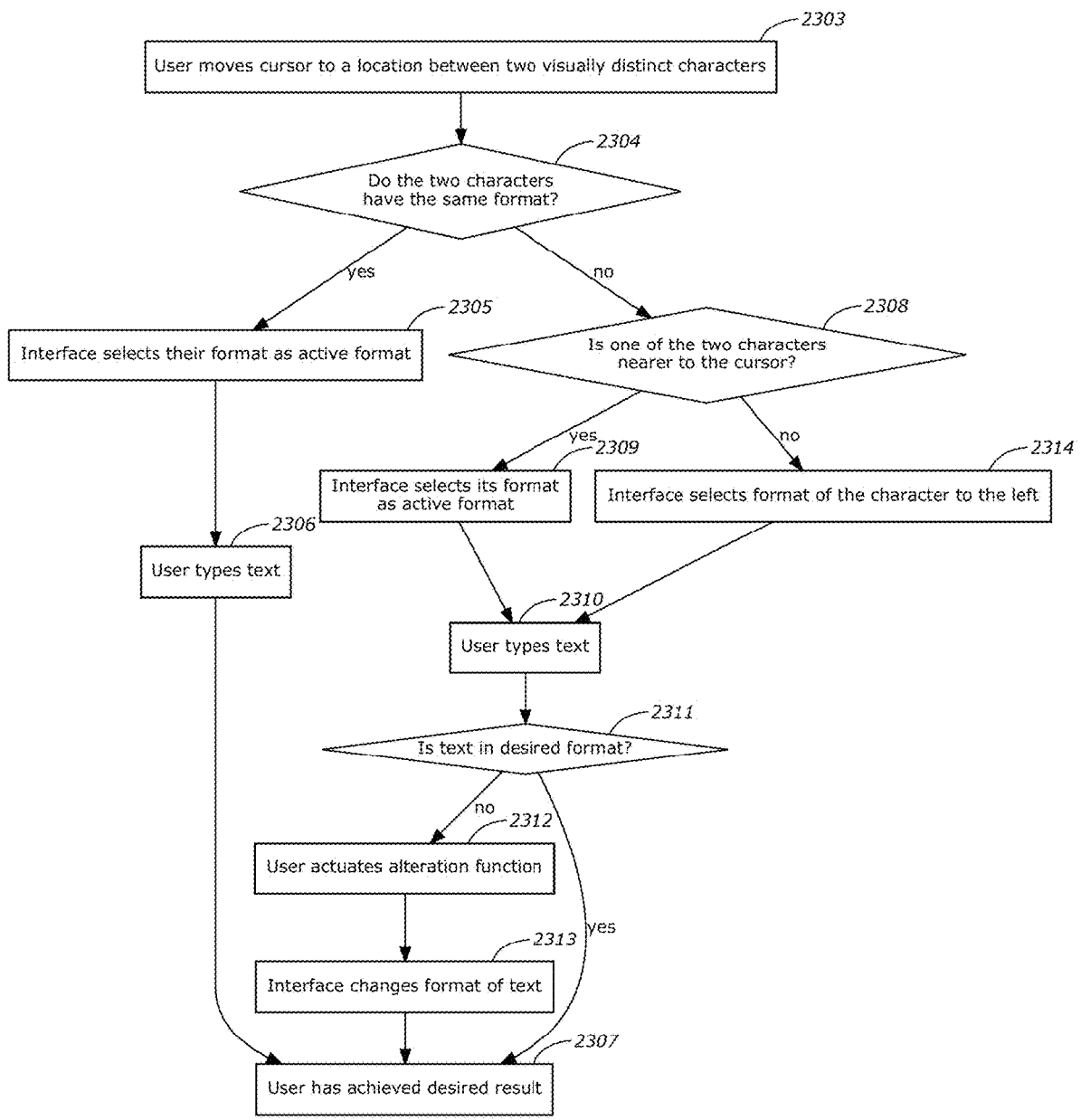

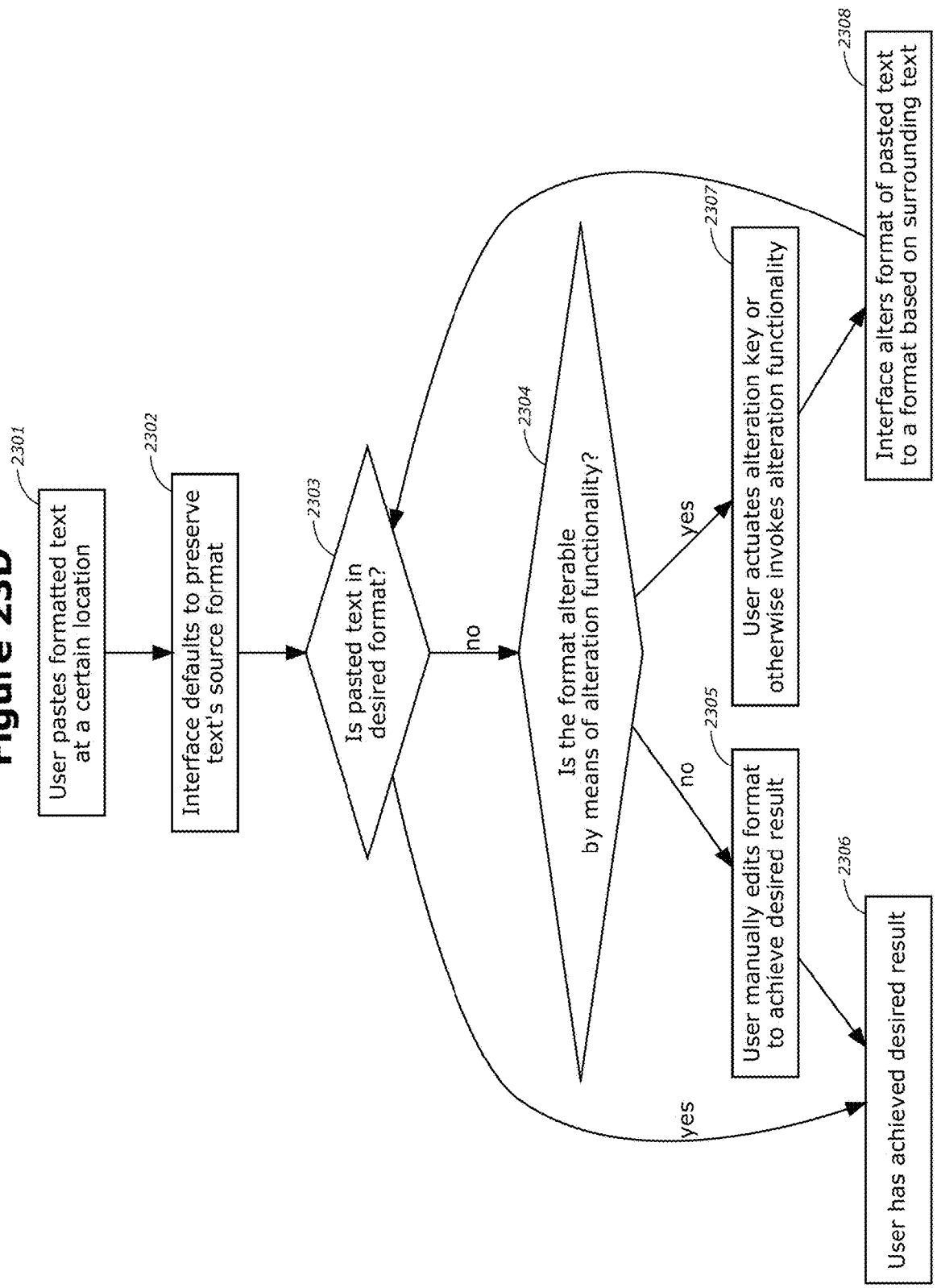

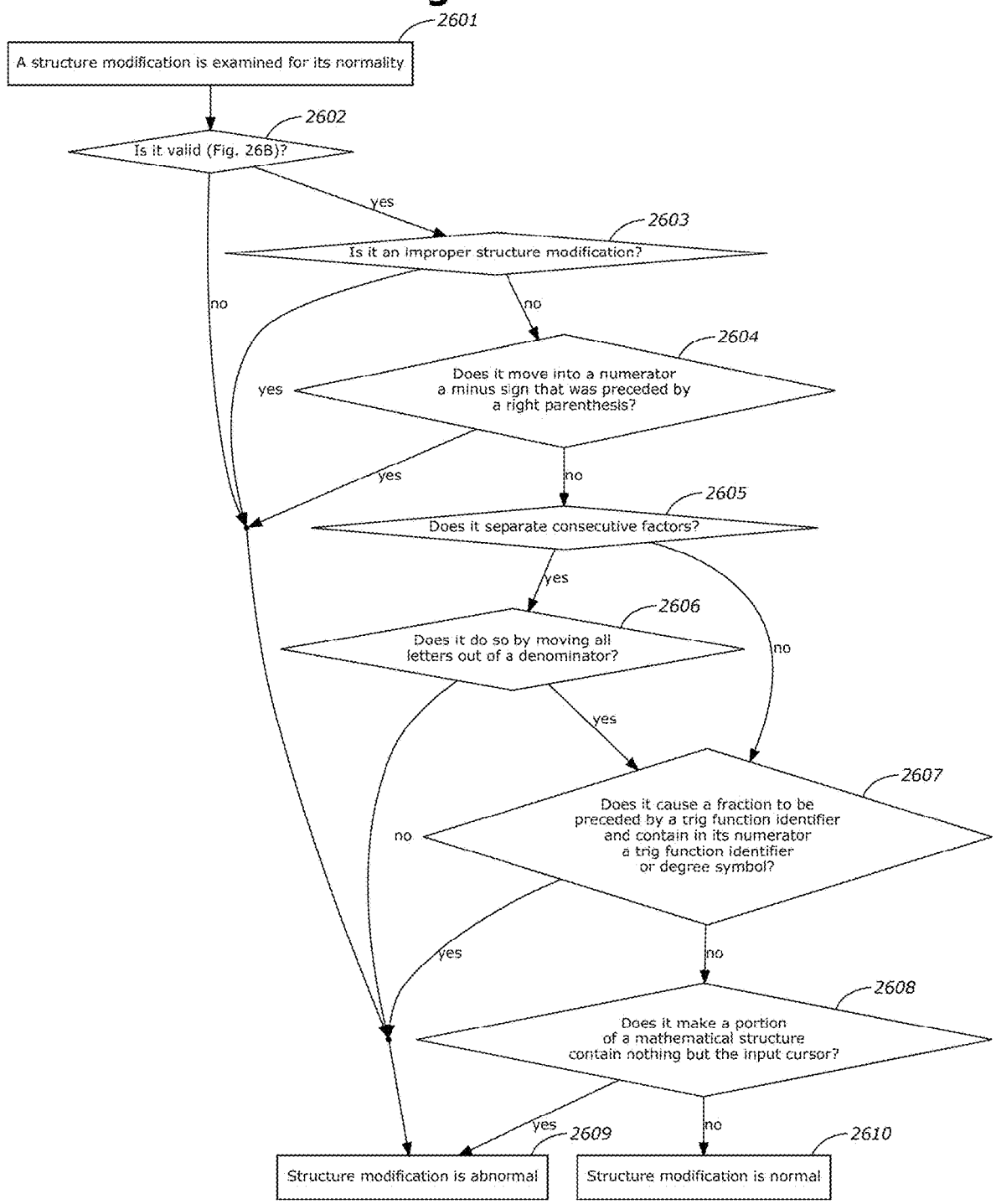

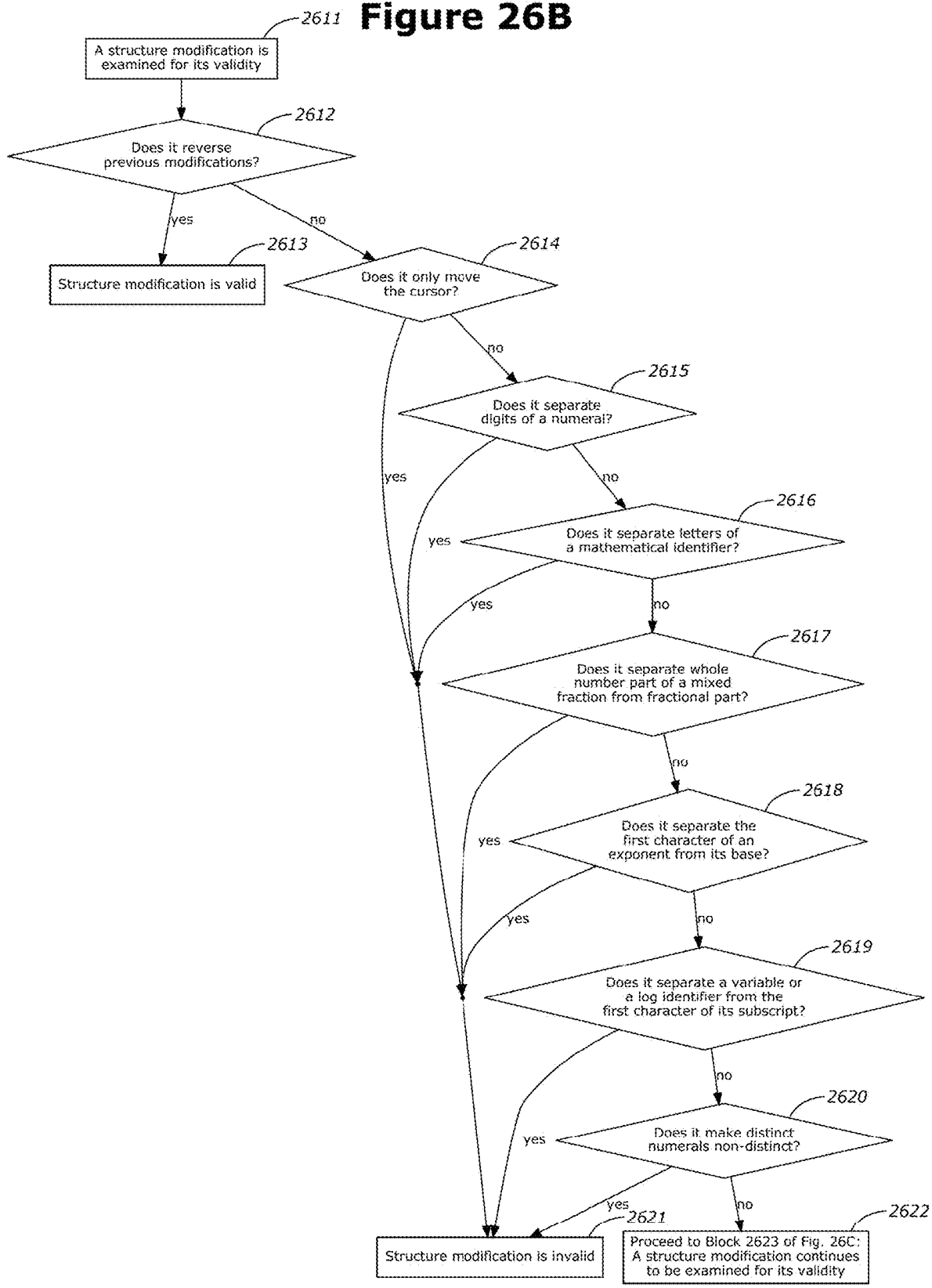

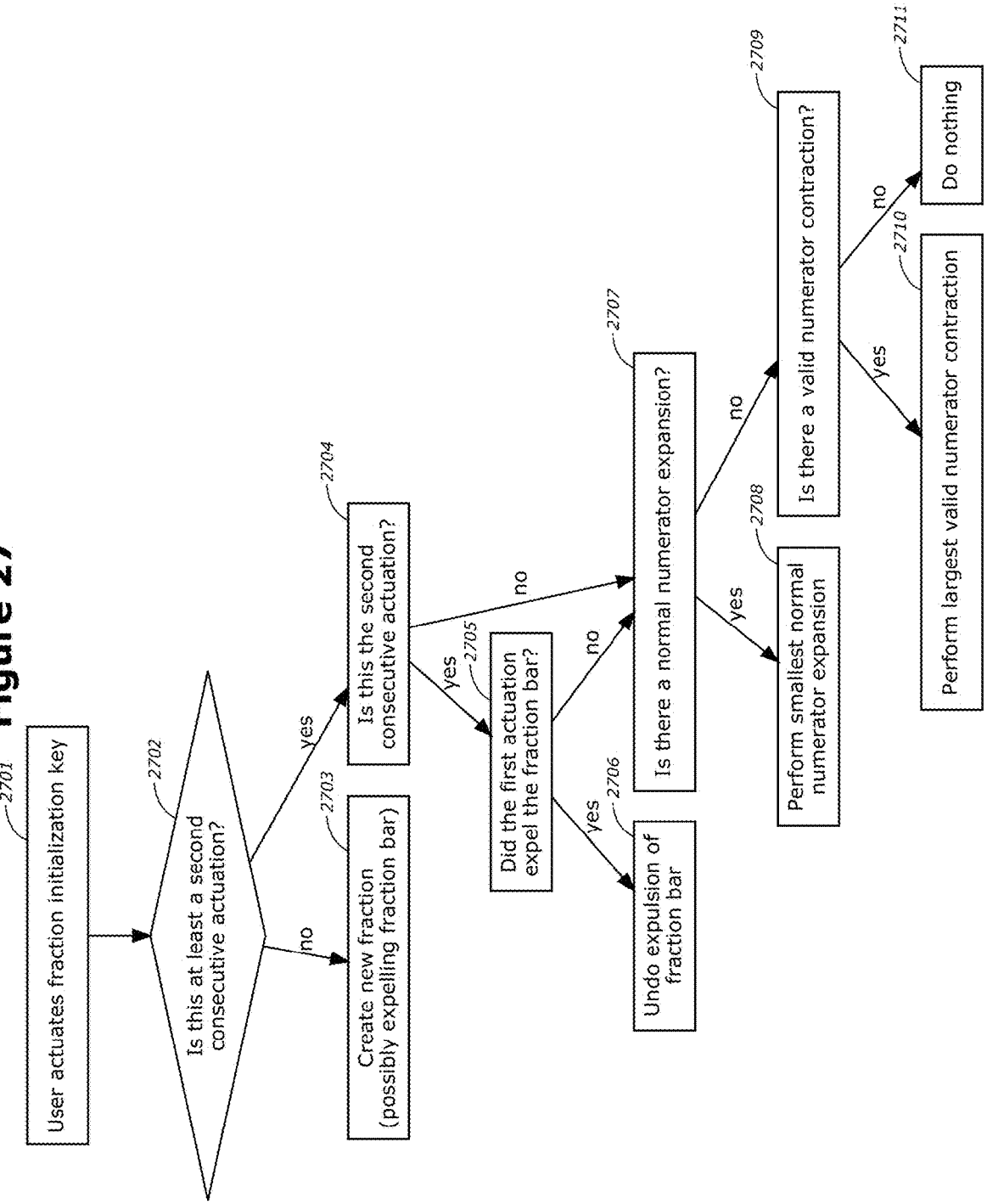

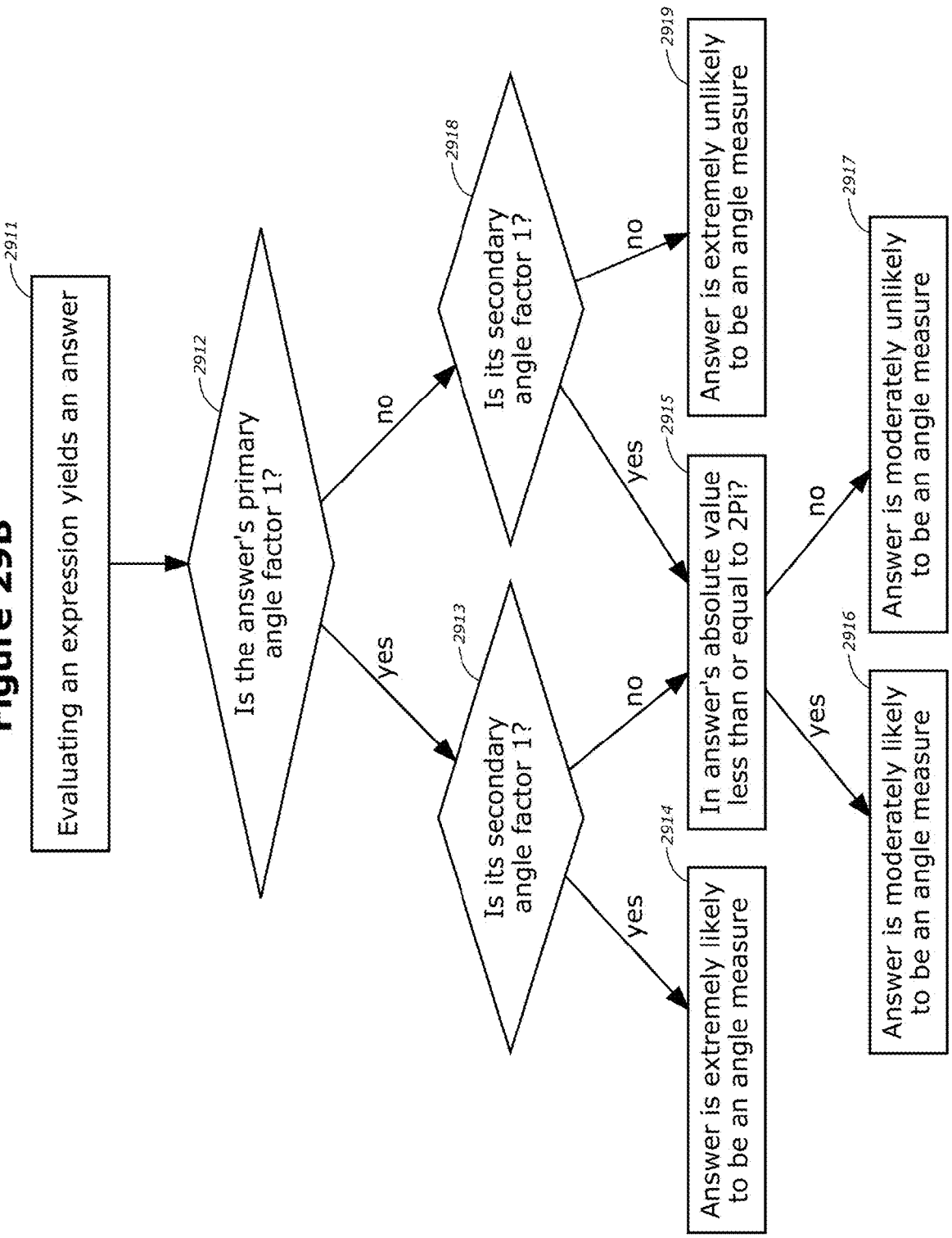

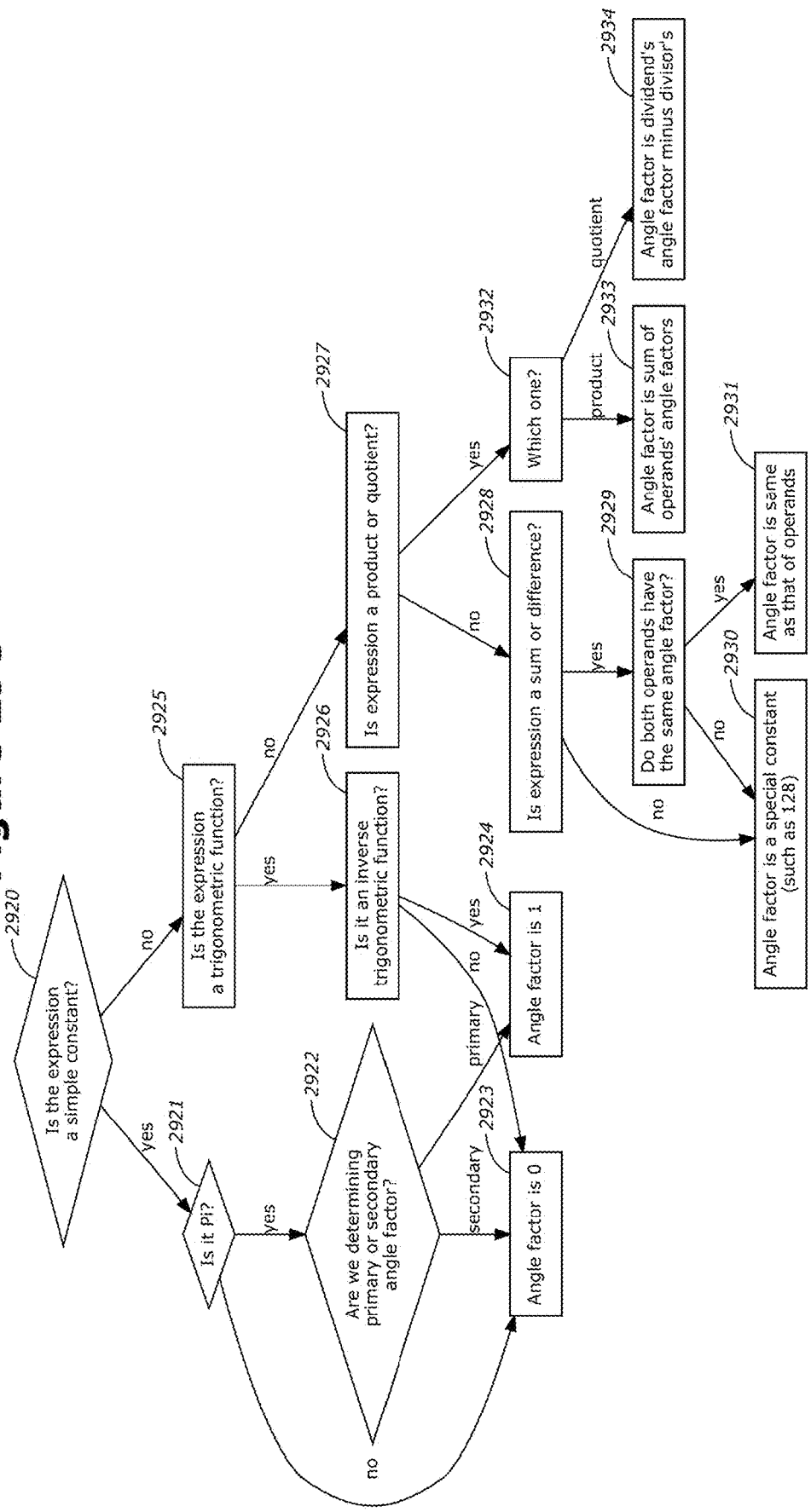

SMART INTERFACE WITH FACILITATED INPUT AND MISTAKE RECOVERY

INCORPORATION BY REFERENCE TO ANY PRIORITY APPLICATIONS

This application is a continuation of U.S. application Ser. No. 17/302,672, filed May 10, 2021, and scheduled to issue as U.S. Pat. No. 11,386,260, on Jul. 12, 2022, which is a continuation of U.S. application Ser. No. 15/965,619, filed Apr. 27, 2018, issued as U.S. Pat. No. 11,003,839, on May 11, 2021, which claims priority to U.S. Provisional Application No. 62/492,005, filed Apr. 28, 2017, each of which is incorporated herein by reference. Any and all applications for which a foreign or domestic priority claim is identified in the Application Data Sheet as filed with the present application are hereby incorporated by reference under 37 CFR 1.57. U.S. application Ser. No. 11/925,560, filed Oct. 26, 2007, now U.S. Pat. No. 8,788,548, and U.S. application Ser. No. 12/363,590, filed Jan. 30, 2009, now U.S. Pat. No. 8,504,600, are also incorporated herein by reference.

BACKGROUND

Field

This application relates to interfaces for electronic devices such as desktop computers, laptops, tablet computers, smartphones, or voice computers, among others. In particular, this application relates to smart interfaces with facilitated input and mistake recovery.

Description

Electronic devices commonly include interfaces that allow users to interact with the devices. Such interfaces often allow users to enter information into the devices and allow the devices to display information to the users. Commonly, interfaces include one or more input devices, for example, keyboards, touchscreens, etc., and a display device, such as a screen. The devices may also include a software component for controlling the interfaces.

SUMMARY

This application relates to systems, methods, and devices including smart interfaces with facilitated input and mistake recovery. For example, in an embodiment, a system having a smart interface can include an input device configured to receive user input from a user. The input device can include an alteration key, which can be implemented as a physical key or on a touchscreen. The system can also include a display for displaying information to the user. The system also includes at least one non-transitory computer readable medium having stored thereon executable instructions, and at least one processor in communication with the at least one non-transitory computer readable medium and configured to execute the instructions. When executed by the processor, the instructions cause the system to provide one or more of the interface functions described throughout this application. For example, the instructions can cause the system to: identify one or more portions of user input as one or more alterable decisions; for each of the one or more alterable decisions, store, in a memory, information about one or more alternative options for the alterable decision; identify one of the one or more alterable decisions as the currently alterable decision; upon receiving an input indicative of an actuation of the alteration key, alter the currently alterable decision to another of the one or more alternative options based on the stored information; and display, on the display, the altered currently alterable decision to the user. Other implementations and interface functionality are described in greater detail below.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIGS. 2B and 2C are flowcharts illustrating an embodiment of a method for a smart interface.

FIG. 6A is a flowchart that illustrates the behavior of an embodiment of an interface that has a touch alteration feature.

FIG. 8A is a flowchart that illustrates an example method for undo functionality.

FIG. 8B is a flowchart that illustrates an example decision-making process for determining whether an interface intervention is significant.

FIG. 11A is a flowchart that illustrates an example decision-making process for determining whether to display a remote alteration control.

FIG. 12B is a flowchart that illustrates an example method for interface operation while in a final review mode.

FIG. 14B is a flowchart that illustrates a simplified version of an automatic decision variation feature, according to one embodiment.

FIGS. 15A and 15B are flowcharts illustrating example methods for a manual alteration detection feature.

FIG. 17 is a flowchart that illustrates an example process by which an interface decides whether to generate an efficiency tip.

FIG. 18 is a flowchart that illustrates a distinction between denotative and contextual data, and also shows how contextual data is associated with alterable decisions, according to an embodiment.

FIGS. 23B and 23C illustrate features related to positional formatting.

FIG. 23D is a flowchart demonstrating interface use of contextual data to inform pasted text format determinations as alterable format decisions, according to an embodiment.

FIG. 26A is a flowchart that illustrates the process of evaluating a structure modification, according to an embodiment.

FIGS. 26B and 26C are flowcharts that together illustrate evaluating a structure modification's validity, according to an embodiment.

FIG. 27 is a flowchart that illustrates the results that occur when the user presses the fraction initialization key, in an embodiment that has a relatively simple version of the fraction initialization key, according to an embodiment.

FIG. 29B illustrates an example classification system.

FIG. 29C is a flowchart that illustrates an algorithm that determines, for a mathematical expression, an angle factor, which may be either a primary angle factor or a secondary angle factor, according to an embodiment.

DETAILED DESCRIPTION

Figure 1A:
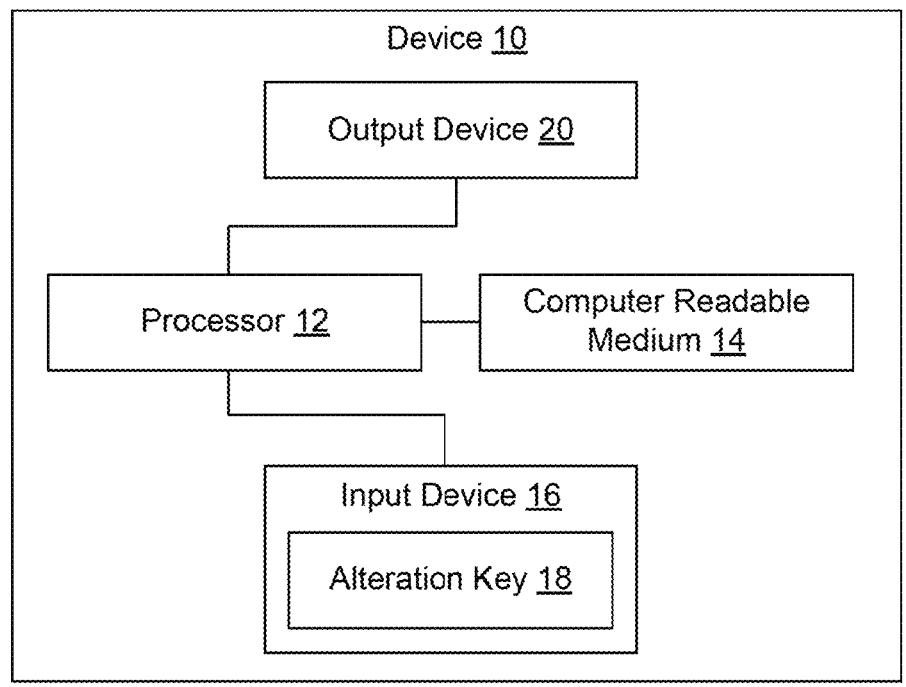
FIG. 1A is a block diagram of an embodiment of a device including an interface as described herein.

This detailed description discusses features and advantages of systems and methods related to smart interfaces with facilitated input and mistake recovery in relation to certain described embodiments, some of which are illustrated in the figures. Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Chapter 1: Introduction

How the Present Specification is Organized

For the convenience of the reader, the present specification is organized into numbered chapters. In some cases, where the present specification refers to a topic that is explained in more detail at a location that is many pages distant, it may reference the number of the chapter where the topic is explained.

The chapters within the present specification generally include section headings that are not numbered. For the most part, chapter titles are intended to broadly summarize the content of the chapters, and section headings are intended to broadly summarize the content of the paragraphs that follow the section headings. However, such chapter titles and section headings are intended only for the convenience of the reader, and are not intended to characterize the invention in a limiting way. For example, the chapter title that says "Alterable Formatting" does not limit the invention to embodiments that have alterable formatting functionality as described in that section. In fact, the chapter title that says "Alterable Formatting" is not even intended to characterize the contents of that chapter itself in a limiting way: certain of the formatting behaviors that are described in that chapter may be quite useful even in an embodiment that includes no alteration functionality whatsoever.

The present specification may be divided into three large sections, along with a smaller amount of additional material at the beginning and at the end. Part I consists of Chapters 2 to 15, which explain various interface features that may facilitate altering "alterable decisions" in order to efficiently recover from mistakes. Part II consists of Chapters 16 to 23, which explain interface features that may tend to prevent the interface from yielding undesired results and interface features that may help educate the user how to achieve desired results more efficiently. Part III consists of Chapters 24 to 52, which explain interface improvements that are applicable to specific situations, and which explain various circumstances in which the interface may make alterable decisions; for example, Chapter 36 explains interface improvements that are applicable when editing a spreadsheet.

The preceding paragraph is intended to summarize the most prominent topic within each of the three large sections of the patent, but is not intended to characterize the invention in a limiting way. Each large section may include descriptions of additional features that do not fit the summaries provided in the preceding paragraph, and such features may be advantageous even in an embodiment that has none of the functionality mentioned in the preceding paragraph. For example, Part I includes explanations of improvements to undo functionality that may be advantageous even in an embodiment that has no functionality pertaining to alterable decisions or to anything else that was mentioned in the preceding paragraph. Each large section itself begins with a summary of the contents of that large section; such summaries may be more detailed and comprehensive than the brief summaries provided above, but still are to be construed in a nonlimiting way. In order to understand the scope of a particular section, it is necessary to actually read the section itself, not just a summary.

An Embodiment May be Described as a Device, Method, or Interface

In some embodiments, the invention that is disclosed herein comprises a computing device that has an improved user interface. Phrased another way, the invention that is disclosed herein comprises an improved method by which a computing device responds to user input actions. Phrased yet another way, the invention that is disclosed herein comprises an improved user interface for a computing device.

Various ways of characterizing some embodiments of the invention may simultaneously be equally valid. A programmer who reads the present specification may observe that the present specification describes an improved method by which a computing device will respond to user input actions; if the programmer then programs a computing device accordingly, then the change that the programmer makes to the computing device will consist of an improvement of the user interface of the computing device; a user may then correctly perceive that the result is an improved computing device.

Embodiments of the invention will generally be described herein in terms of a detailed explanation of how "the interface" will behave in response to various user input actions in certain embodiments. Sufficient information about such interface behaviors will be provided that those of ordinary skill in the art will be able to configure a computing device to follow methods that cause its user interface to behave as described herein.

Various Embodiments Are Possible

It is possible for an embodiment to include nearly all the new interface behaviors that are disclosed herein, or to include only a few. Whenever the present specification begins a sentence or paragraph by saying "In an embodiment," this does not necessarily mean that the embodiment whose behavior is described in that sentence or paragraph does or does not include any of the other interface behaviors described elsewhere.

However, in some cases the present specification will describe two or more distinct and incompatible approaches to a particular situation. When the present specification begins a sentence or paragraph by saying, "In an alternative embodiment," in some cases this may mean that the behavior that is described for that alternative embodiment is incompatible with a behavior described prior to that sentence or paragraph. In such cases, this does not necessarily mean that the alternative embodiment is inferior to any such previously described embodiment: it only means that it may be incompatible.

A variety of computing devices may be improved by integrating various interface behaviors that are disclosed herein. For example, an embodiment may be a desktop computer, smartphone, or graphing calculator. However, some of the new interface behaviors that are disclosed herein may be more readily applicable to some computing devices than to others. For example, if a computing device has a touchscreen or mouse or some other means of quickly indicating a location on the display of the computing device, it will be relatively straightforward to implement a feature that is invoked by means of a "touch gesture" that requires the user to indicate a specific location on the display of the computing device. As another example, the present specification may suggest that a particular interface behavior may be applicable "in an embodiment that is a computing device that has a mouse" in order to indicate that the description of that particular interface behavior makes reference to a mouse, and that the behavior may be more readily implemented on a computing device that has a mouse. (Such phrasing emphasizes the configuration of the interface hardware for a particular embodiment, but the phrase "in an embodiment that is an interface that has mouse functionality" would have a substantially identical meaning, since it is equally valid to characterize the invention as an improved interface for a computing device as well as characterizing it as a computing device with an improved interface.)

Internal Implementation Variations do not Distinguish Features

Generally, an interface behavior may be conceived of as a mapping of circumstances and sequences of user input actions to interface responses. In other words, anyone who knows exactly how an interface will respond to every possible sequence of user input actions in all circumstances has a complete understanding of all the interface's behaviors. If two distinct interface algorithms are guaranteed to always yield exactly the same results in response to the same sequence of user input actions in all circumstances, then these two algorithms implement the exact same interface behavior. Internal implementation details do not distinguish one interface behavior from another. For example, if one interface algorithm responds to the backspace key by deleting the character to the left of the input cursor, and another interface algorithm responds to the backspace key by first moving the input cursor past the character to its left and then immediately deleting the character that is now to the right of the input cursor, then these two algorithms implement the exact same interface behavior: they work differently, but yield the same results.

Generally, interface behaviors that make it easier for users to achieve desired results faster may nevertheless be relatively complex and difficult to understand. For example, a user may find that prior art autocorrection functionality makes it easier to achieve desired results faster even if the algorithm that determines the behavior of the autocorrection functionality is too complex for the user to understand.

The present specification describes in detail various interface behaviors that may enable users to achieve desired results faster. Certain of these interface behaviors are relatively complex. In many cases, in order to fully define a complex interface behavior, the present specification will specify a particular means by which a particular embodiment will determine how to respond to a sequence of user input actions. In other words, the present specification will often specify a complex interface behavior by means of explaining how to construct one particular algorithm that implements the interface behavior.

However, those of ordinary skill in the art will understand that it is always possible to create various equivalent algorithms that implement the exact same interface behavior. If a programmer implements an interface feature that will always respond to a sequence of user input actions in exactly the same way as an interface feature that is described herein, but the programmer implements such an interface feature by means of an algorithm that operates in an entirely different way than is suggested herein, then those of ordinary skill in the art will understand that the feature that the programmer has implemented still constitutes exactly the same feature as the one that is described herein. Furthermore, those of ordinary skill in the art will understand that it is possible to create various algorithms that implement interface features that are mostly equivalent to interface features that are described herein, but that behave slightly differently in rare cases.

For example, the present specification describes an embodiment in which a key is configured so that in certain circumstances if a user actuates that key then the interface will move a plus sign that is immediately after a mathematical structure into the mathematical structure. A programmer may instead create an embodiment such that if a user actuates the same key in the same circumstances then the interface will first insert a plus sign within the mathematical structure and will then delete the plus sign that is immediately after the mathematical structure. If a programmer were to do so, then the interface feature the programmer thus implemented would always appear to respond to a user's input actions in exactly the same way as if it moved the plus sign from immediately after the mathematical structure into the mathematical structure, and those of ordinary skill in the art would understand that such use of a distinct yet equivalent algorithm would not distinguish the feature that the programmer thus implemented from the feature that is described herein.

Improvements May be Implemented in Various Software Domains

Those of ordinary skill in the art will understand that various improvements that are described herein may be implemented in the interface of an individual application, or in the interface functionality of a code library, or in the interface layer of the operating system of a computing device, or in some other software domain.

Certain specific improvements that are described herein are applicable when editing text documents, or when editing spreadsheets, or in other specific situations that typically occur within the context of an individual application. Such improvements may of course be implemented within the interface of a particular application, so that a computing device will embody the invention whenever that application is installed on the computing device. However, even improvements such as these may instead be implemented in the interface layer of the operating system of a computing device, within the library of functionality that is available to applications that run on the computing device, so that various applications can easily make use of the improvements. When improvements are implemented in the operating system, in some cases this may enable certain applications to automatically take advantage of such improvements, without necessarily requiring the programmers of such applications to make an explicit effort to integrate these improvements. For example, if the autocorrection functionality within the interface layer of the operating system of a computing device is replaced with improved autocorrection functionality that is described herein, then any application that uses such autocorrection functionality may automatically be improved. It may even be advantageous for relatively specialized functionality to be implemented within the library of functionality that is available to applications that run on a computing device; for example, it may be advantageous for a tablet computer to have an operating system that includes math input interface functionality with math input interface improvements that are described herein, so that programmers of applications for such a tablet computer can easily take advantage of such math input interface functionality.

Some of the improvements that are described herein pertain to functionality that is typically the responsibility of the interface layer of the operating system of a computing device, such as functionality for moving the mouse cursor, for switching the keyboard focus from one application to another, for superimposing a window over an application window, and so forth. Such improvements may of course be implemented within the interface layer of the operating system of a computing device, so that the computing device will embody the invention whenever that operating system is installed on the computing device, regardless of what applications are installed. However, many operating systems include functionality that enables applications to essentially modify the operation of the operating system itself, so that even functionality that is the responsibility of the interface layer of the operating system of the computing device can be improved by installing an appropriately configured application. For example, installing a prior art speech recognition application on a computer with a Microsoft Windows operating system may make it possible for a user to move the mouse cursor by means of spoken commands, as though the operating system functionality pertaining to the mouse cursor had itself been modified; likewise, those of ordinary skill in the art will understand that an application can be created such that installing the application on a computer with a Microsoft Windows operating system may cause the computer to embody the present invention in essentially the same way as if certain improvements were implemented within the interface layer of Microsoft Windows itself.

Putting Features in Perspective

The present specification describes numerous features. An embodiment of the invention may have significant advantages over prior art even if it has only one or two of these features. However, many of these features may have a great deal of synergy with one another, so that an embodiment that has several of the features that are described herein may have advantages that exceed the sum of the advantages of the individual features.

In various places throughout the present specification, in order to put various features in perspective, the present specification will include brief discussions of how certain features compare to prior art, or how the features relate to other features that are described herein, or both. Such a discussion may consist of a single paragraph at the end of a section, or an entire section within a chapter. Such a discussion may point out how a certain feature or group of features has advantages over prior art in its own right, may explain synergistic advantages that a certain feature has in conjunction with other features, may suggest ways to ensure that an embodiment that lacks a certain feature still retains most of the advantages of its other features, and so forth. At the end of the present specification there is a longer discussion of additional possible advantages of some embodiments. Such discussions are intended to be helpful, but are not intended as exhaustive explanations of advantages, synergies, or interrelationships of features; if a particular feature is never specifically mentioned in any such discussion, then this does not mean that the feature does not have any synergy with other features.

Keyboards

Figure 25A:
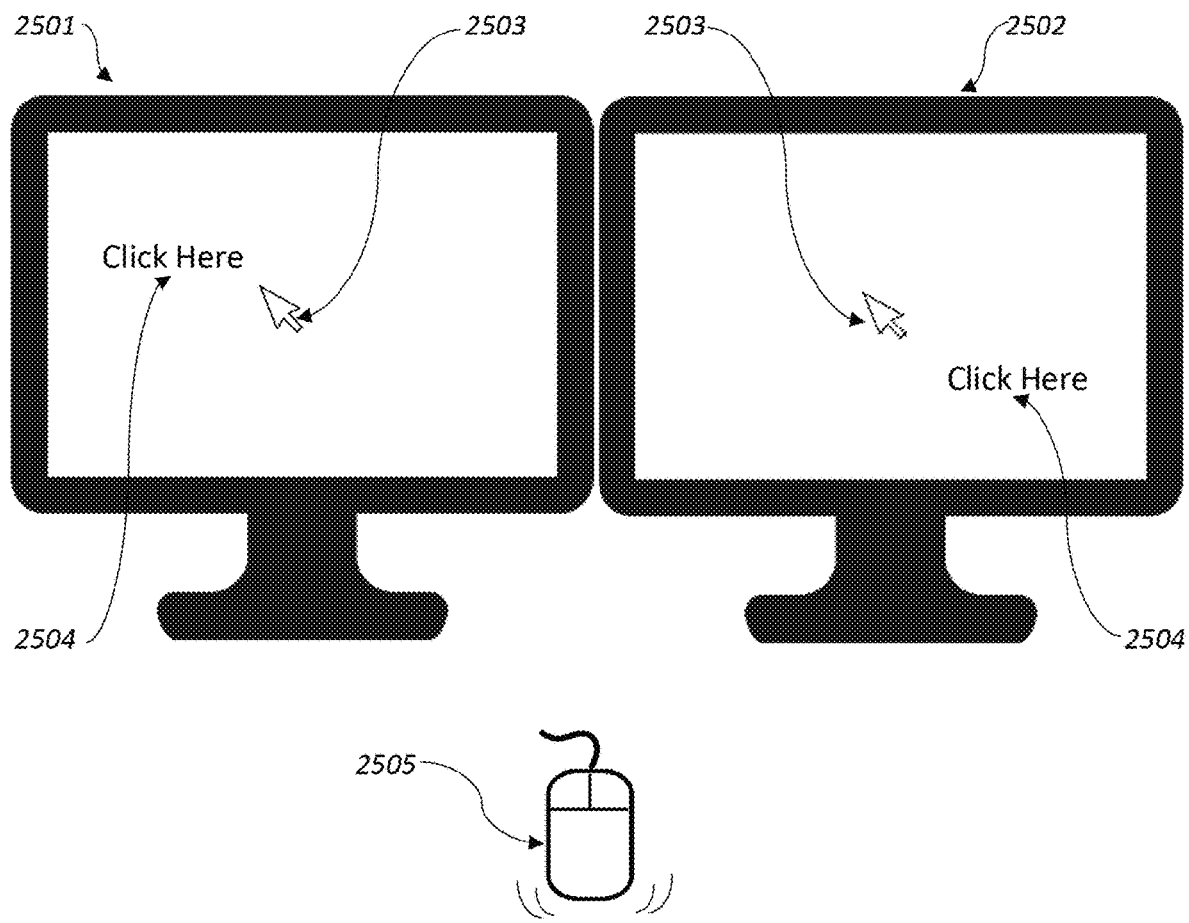
FIG. 25A illustrates a directed input cursor jumping feature in action, according to an embodiment.
Figure 25B:
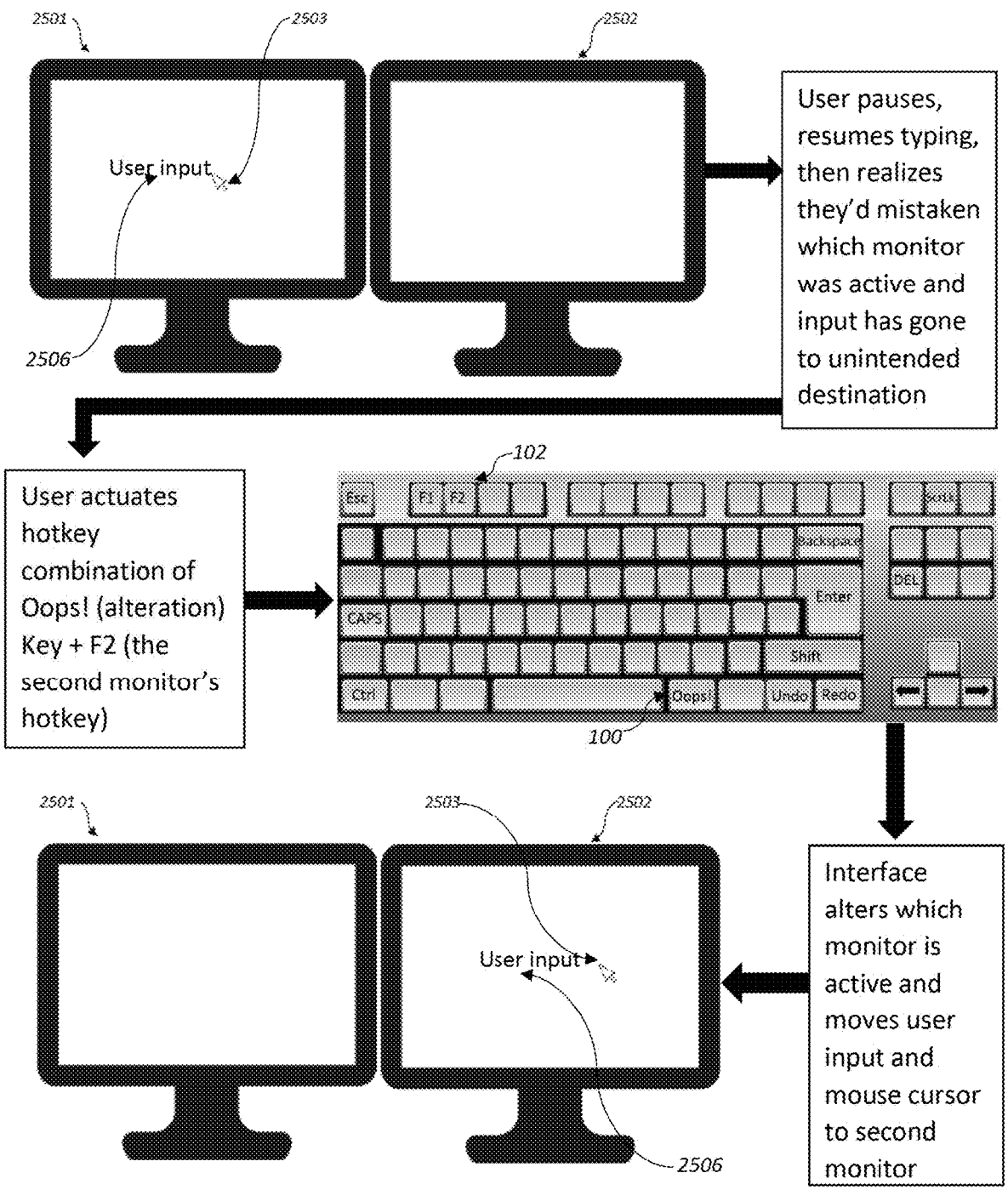
FIG. 25B illustrates advantages associated with some embodiments of a directed mouse cursor jumping feature.
Figure 26C:
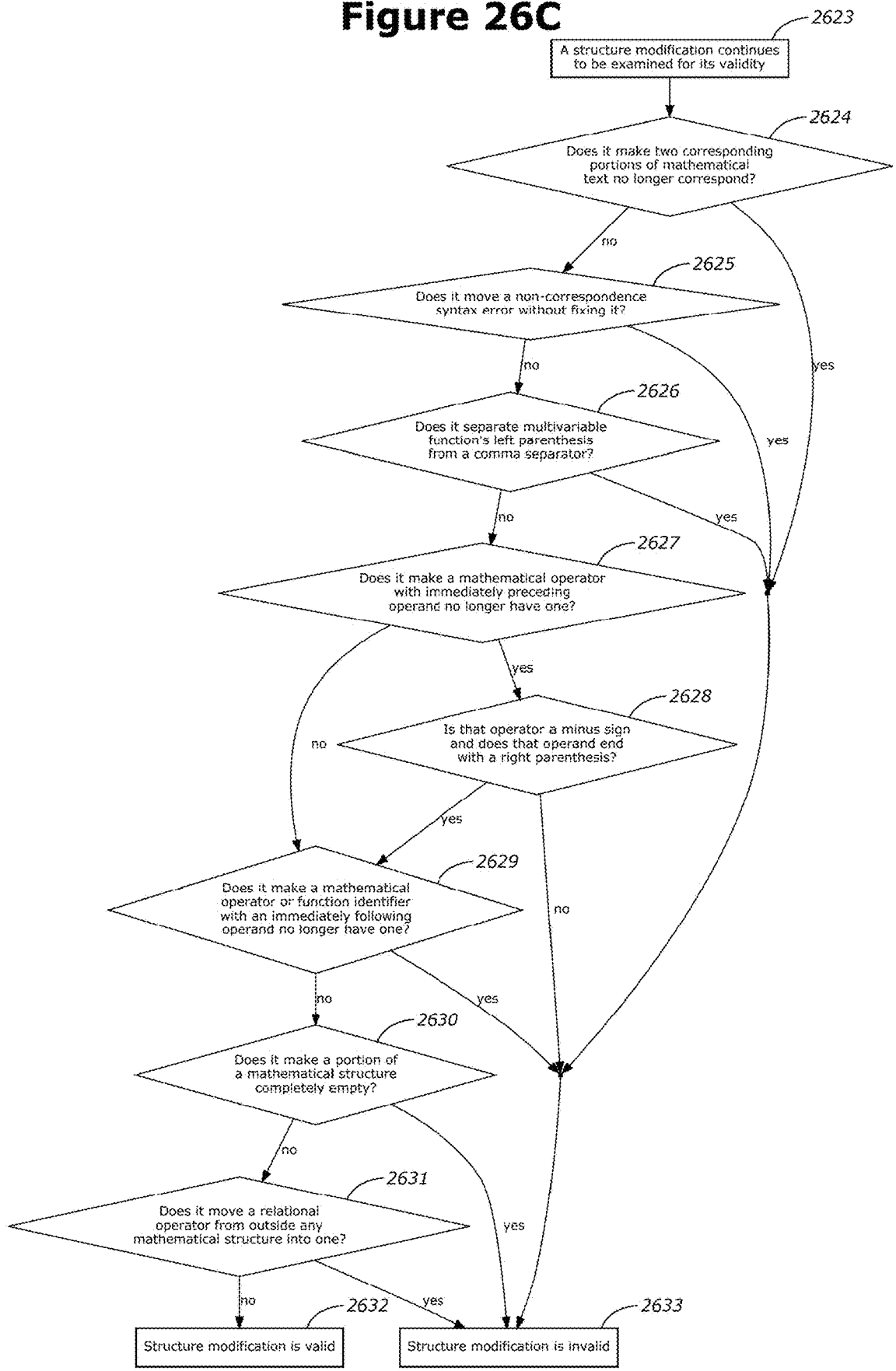
Figure 28A:
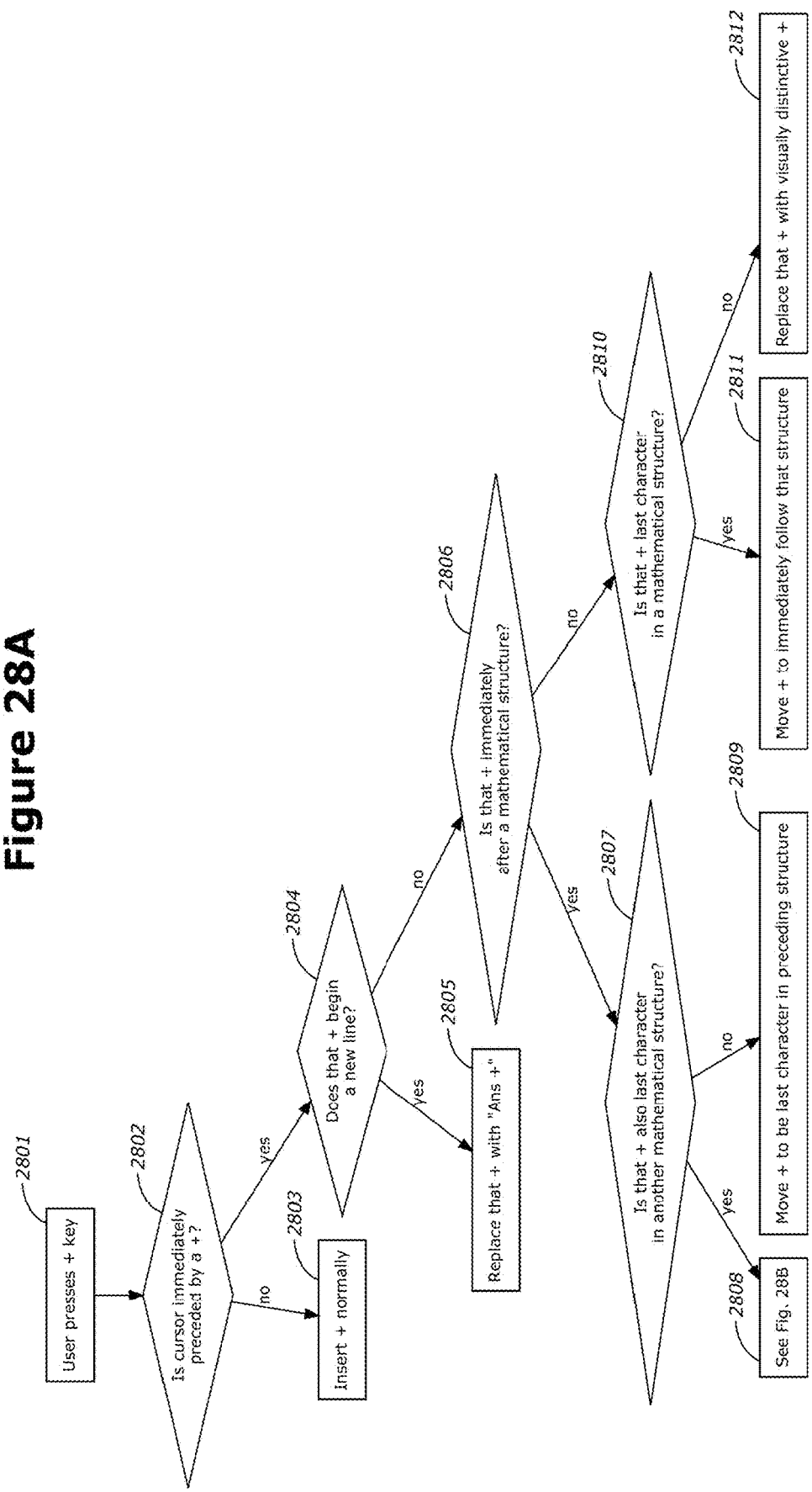
FIG. 28A is a flowchart that illustrates various features that may be invoked when a user double-clicks the plus key, according to an embodiment.
Figure 28B:
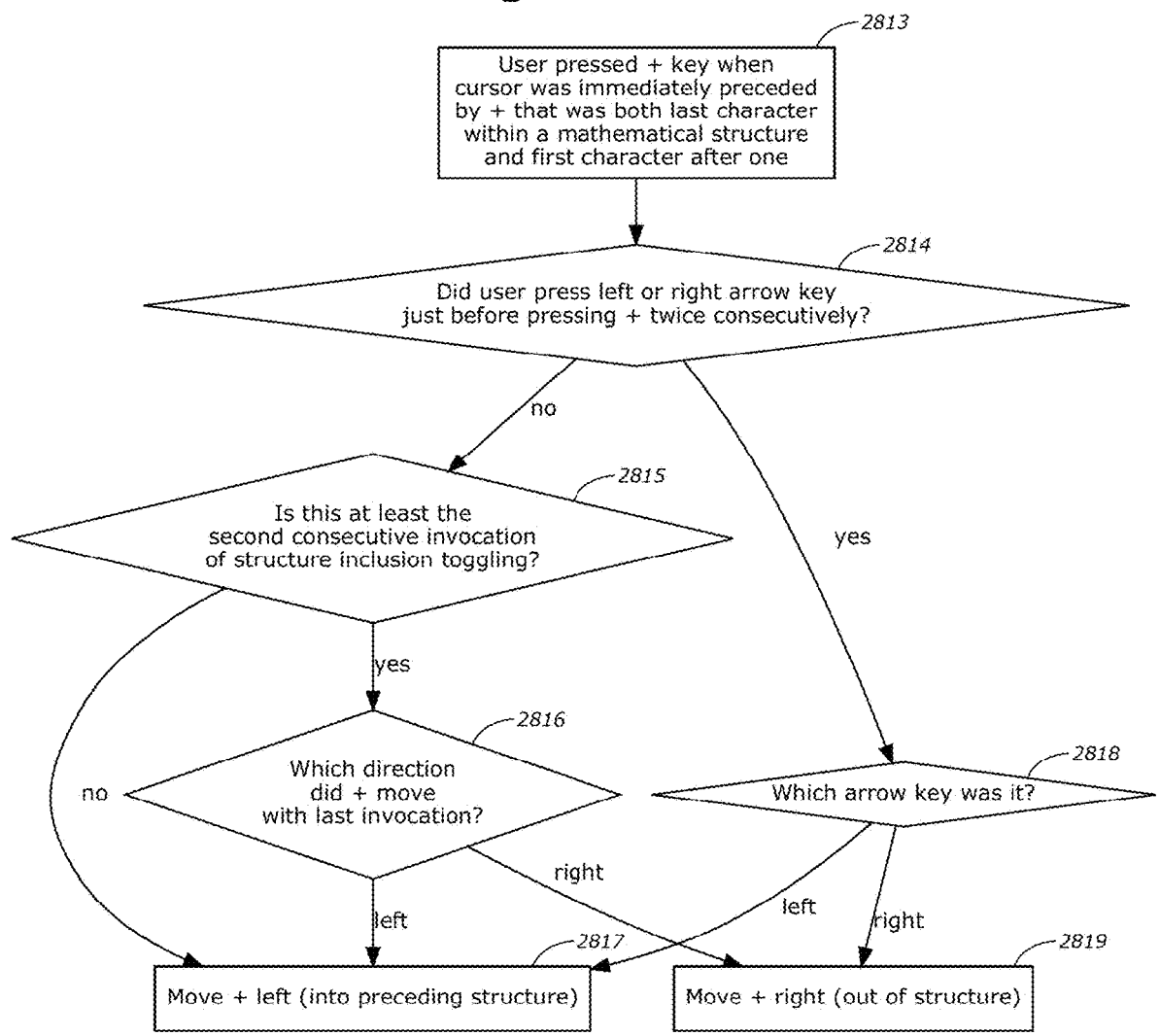
FIG. 28B is a flowchart that illustrates an example process that occurs in an ambiguous case where a previously typed plus sign is both the last character within a mathematical structure and the first character after a mathematical structure.
Figure 29A:
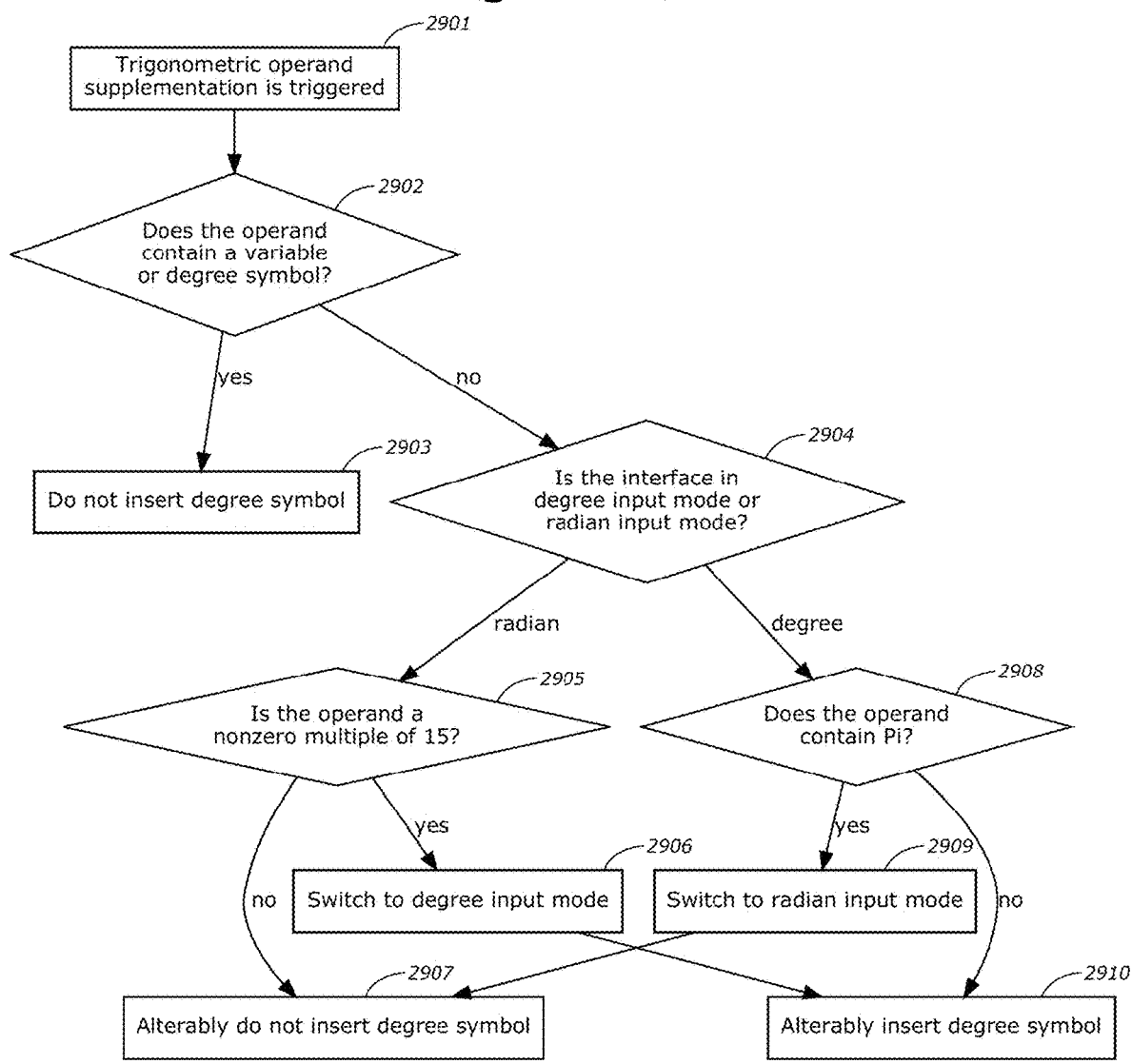
FIG. 29A is a flowchart that illustrates an example method for making smart adaptive angle measure mode decisions.

In some embodiments, the computing device has a hardware keyboard. In particular, in some embodiments the computing device has a keyboard with an individual physical key that serves as an alteration key as described in the following chapter. FIG. 1B shows a computer keyboard featuring an alteration key labeled "Oops!" (100) as well as featuring an F12 Key (102) which is also referenced in FIG. 25B. FIG. 1C shows a calculator keypad featuring an alteration key labeled "Oops!" (100), an ANS key (103), an Enter key (104), a Log key (105), a "Right" arrow key (106), a "Left" arrow key (107), a "±" Key (108) that may serve as a fraction initialization key as defined in Chapter 44, a "−" Key (109), and a "+" Key (110).

Key Actuations

For purposes of the following discussion of key actuations, an "invocable function" is an interface function that a user can invoke that takes no parameters. In other words, an invocable function is an interface function that can be assigned to a single key, without any need for the user to supply additional information before the function is invoked. For example, many application interfaces have a Print function such that invoking the function opens a Print dialog box; this is an invocable function that is often assigned to the key combination Ctrl-P, and can often be invoked by other means as well.

In most cases, on most computing devices, most of the invocable functions that are referred to in the present specification can be invoked by pressing a single physical key or a single depiction of a key on a virtual keyboard. In some cases, however, on certain computing devices, certain invocable functions that are referred to in the present specification cannot be invoked by pressing a single physical key or a single depiction of a key, but must instead be accessed by some other means. For example, a TI-84 Plus graphing calculator does not have a dedicated square root key, so on a TI-84 the invocable function of inputting a square root symbol cannot be invoked by pressing a single key, but is instead invoked by means of first pressing the key labeled 2nd and then pressing the key labeled $x^2$.

Generally, for the sake of simplicity, the present specification will not refer to invocations of specific invocable functions, but will instead refer to "actuations" of specific "keys." Those of ordinary skill in the art will understand that any reference to "keys" or "keystrokes" in the present specification applies equally to other means for invoking specific invocable functions; in most cases, the details of how specific invocable functions are invoked are not essential to the present invention. Thus, in the present specification, the word "key" may refer to any means whereby the user of an interface can invoke a single specific invocable function, without regard to whether such means actually consists of pressing a single physical key on a keyboard. Likewise, "actuating a key" refers to invoking such a function, "having a key" refers to having a means for invoking such a function, "keystroke" refers to an invocation of such a function, and so forth.

For example, on a typical desktop computer keyboard, pressing the 2 key while holding down the Shift key constitutes "actuating the @ key" because this combination of actions invokes the function that causes the character @ to be entered into the user's input. Such a keyboard may be said to "have an @ key."

Similarly, in many computer software applications, pressing the S key while holding down the Ctrl key constitutes "actuating the Save key," because this combination of actions invokes the function that causes the software to save the file that the user is currently editing. Likewise, using a computer mouse to open a menu of options and choose the Save option constitutes "actuating the Save key" according to the definition used in the present specification. Similarly, many software applications have a toolbar that can be displayed that includes a depiction of a Save button, and clicking on such a depiction of a button or otherwise actuating such a depiction of a button constitutes "actuating the Save key" according to the definition used in the present specification.

On certain graphing calculators, the sequence of actions consisting of first pressing a key labeled 2nd and then pressing a key labeled $x^2$ has the effect of entering a square root into the user's input; thus, such a sequence of actions constitutes "actuating the square root key" according to the definition used in the present specification, and such a calculator may be said to "have a square root key."

On certain cell phones that have text messaging capabilities and do not have touchscreens, in certain circumstances it is possible to type the letter a by pressing a key labeled 2; thus, pressing the 2 key in such circumstances constitutes "actuating the a key" according to the definition used in the present specification. On certain such cell phones, in certain circumstances, it is possible to type the letter b by pressing the key that is labeled 2 twice rapidly: the first time the key is pressed, the letter a appears, and the second time the key is pressed, the letter a is replaced with the letter b. From the user's perspective, pressing the 2 key twice rapidly is the means of typing the letter b; when the user types the letter b, the temporary appearance of the letter a serves no purpose that the user then desires other then enabling the user to access the letter b, so pressing the 2 key twice rapidly is, from the user's perspective, equivalent to "actuating the b key" according to the definition used in the present specification.

Several examples have now been given in which a user performs more than one action in order to "actuate a key." In each of these examples, the first action that the user performs—such as holding down the Shift key or Ctrl key on a computer keyboard, or opening a menu of options, or pressing the 2nd key on a graphing calculator—has no effect that the user desires other than enabling the user to subsequently perform an action that then causes the invocation of the function that the user desires to invoke. Thus, in each case, although the user may perform a plurality of actions, the user has in view the invocation of a single function.

If a user performs a sequence of actions that has the same result as if the user had invoked a single function, but this sequence of actions consists of a plurality of independent actions each of which causes the invocation of an independent function that yields a portion of the desired result, then this sequence of actions is not a single key actuation according to the definition used in the present specification. For example, if an interface has a cosine key such that actuating the cosine key causes the three letters "cos" to be inserted into the user's input, but a user of the interface instead sequentially types the same three letters by means of actuating three individual letter keys, then the user will not be said to have "actuated the cosine key." As another example, a TI-84 Plus graphing calculator has a cubed function that causes an exponent of 3 to be entered into the user's input, and a user can access this function as the #3 option within the calculator's MATH menu, so if a user presses the calculator's MATH key and then presses the 3 key, this sequence of actions constitutes "actuating the cubed key" according to the definition used in the present specification; but if a user instead enters an exponent of 3 by pressing the A key and then pressing the 3 key, this latter sequence of actions does not constitute "actuating the cubed key."

(In a user interface that has Undo functionality, a single invocation of the Undo function will typically reverse a single invocation of an invocable function other than a cursor navigation function; thus, the intuitions of an experienced user as to how an Undo function will operate can serve as an approximate guide to what constitutes a single invocation of an invocable function and thus constitutes a single "key actuation" according to the definition used in the present specification. For example, a user of a TI-84 Plus graphing calculator can press the calculator's MATH key to cause the MATH menu to appear and then press the 3 key to choose the cubed function from the MATH menu, thus causing the MATH menu to disappear and an exponent of 3 to be entered into the user's input; if an experienced user of computing devices were then asked what would happen if an Undo function were to be invoked a single time, the user would answer that the exponent of 3 would be removed from the input that was entered. Such a user would not answer that the exponent of 3 would be removed and the MATH menu would reappear; thus, the user's answer indicates that the user would expect a single invocation of an Undo function to undo the entire cumulative effect of pressing the MATH key and then pressing the 3 key, and not to undo only the effect of pressing the 3 key. The user's intuition thus confirms that such a sequence of two keystrokes may be considered to constitute a single invocation of an invocable function.)

Because a "key actuation" as defined above may actually involve a sequence of several actions, reducing the number of key actuations required to accomplish a particular editing task may not always make it easier for a user to perform the task: the ease of accomplishing a task depends not only on how many key actuations are required but also on how easy it is to perform those key actuations. Nevertheless, reducing the number of key actuations required to accomplish various editing tasks will generally tend to make it easier to perform those tasks. Furthermore, reducing the number of actuations of distinct keys required to accomplish various editing tasks will generally tend to make it easier to accomplish those tasks: double-clicking a single key is usually easier than finding and pressing two distinct keys. The present specification will explain specific means by which specific editing tasks can be made more efficient by reducing the number of key actuations or reducing the number of distinct key actuations that are needed in order to accomplish the tasks.

In the present specification, a "first actuation" of a particular key is any actuation of that key such that the most recent user action prior to that actuation was not also an actuation of that key. In other words, any actuation of a key is a first actuation of that key if it is not at least the second consecutive actuation of that key.

Naming of Keys

A "key," as defined above, may serve as a means to invoke a function that determines based on current circumstances which other function to invoke from among a plurality of other functions. When the present specification refers to a particular key, the present specification will typically name the key in terms of the function it invokes; however, because the function that a key invokes may at times be a means for invoking some other particular function, such a key may at times be named in terms of another function it may invoke, and thus a single key may have more than one name in the present specification. For example, a typical desktop computer keyboard has a physical key that could be called the "numeric keypad 2 key" which invokes the same function as a "2 key" when the keyboard is operating in Num Lock mode and invokes the same function as a "down arrow key" at other times; this "numeric keypad 2 key" thus may also be referred to as a "2 key" or as a "down arrow key" under the appropriate circumstances.

Under circumstances where the function that a key invokes is currently a means for invoking some other particular function, that key may be named in terms of the other function it currently invokes; thus, the "numeric keypad 2 key" may be referred to as the "2 key" when the keyboard is operating in Num Lock mode. Under such circumstances, however, a key that serves a simpler function will not be named in terms of the more complex function that currently yields the same result. For example, a "2 key" that never serves any purpose other than entry of a 2 character will not be referred to as a "numeric keypad 2 key" even under circumstances where a "numeric keypad 2 key" would happen to serve the purpose of entry of a 2 character. As another example, it is possible to devise circumstances in a typical text document editing program such that either invoking the Undo function or invoking the Paste function will result in the entry of a 2 character, but a "2 key" that never serves any purpose other than entry of a 2 character will not be referred to as an "Undo key" or a "Paste key" even under such circumstances.

Touch Gestures

The details of how a particular location on the screen of a computing device is indicated by the user are not generally essential, and will not always be explicitly specified in the present specification. Thus, in the present specification, except as otherwise specified, the word "touch" may refer to any means whereby the user of an interface indicates a specific location on the screen of a computing device, without regard to whether or not said means actually consists of touching the screen with a finger or stylus. For example, on a computing device that does not have a touch-sensitive display but that does have a mouse, positioning the mouse cursor over a highlighted region on the screen of a computing device and clicking the mouse button may constitute "touching a highlighted region."

In the present specification, whenever an interface action is described that is invoked by a touch of a specific location, it is to be understood that various alternative embodiments may require various means of "touch" in order to invoke the specified interface action. For example, if an interface action is described that is invoked by "touching a highlighted region," then in one alternative embodiment the interface action may be invoked only if the user rapidly double-clicks the mouse button when the mouse cursor is on the highlighted region, and in another alternative embodiment the interface action may be invoked only if the user presses the highlighted region with a finger and holds the touch for at least one second, and so forth. Various such alternative touch gestures will be obvious to those of ordinary skill in the art.

Embodiment-Specific Terminology

In the discussion of specific features of certain embodiments of the present invention, many terms are defined. In some cases, a term is defined that is said to have a certain meaning "in an embodiment" or is said to pertain to a certain circumstance "in an embodiment," and the specification makes use of that term when describing a feature that is present in certain embodiments. In such cases, for purposes of any feature that is described using that term, that meaning of the term is applicable in at least one embodiment, but it is not necessarily applicable in all embodiments.

For example, in Chapter 11, the present specification details certain functionality pertaining to "significant interface interventions" in certain embodiments. Chapter 11 also says, "In an embodiment, for purposes of the following paragraphs, a 'significant interface intervention' is an alterable interface intervention that does not currently have its non-intervention option selected, and that has a probability of alteration that is above a certain 'undoable intervention threshold.'" It is to be understood that it may also be possible to create an alternative embodiment that still includes functionality pertaining to significant interface interventions, but uses a different definition for "significant interface interventions." (In fact, one such alternative embodiment is also described in Chapter 11: "In an alternative embodiment, a 'significant interface intervention' is any alterable interface intervention that does not currently have its non-intervention option selected, regardless of its probability of alteration.")

Example Device or System

Figure 1B:
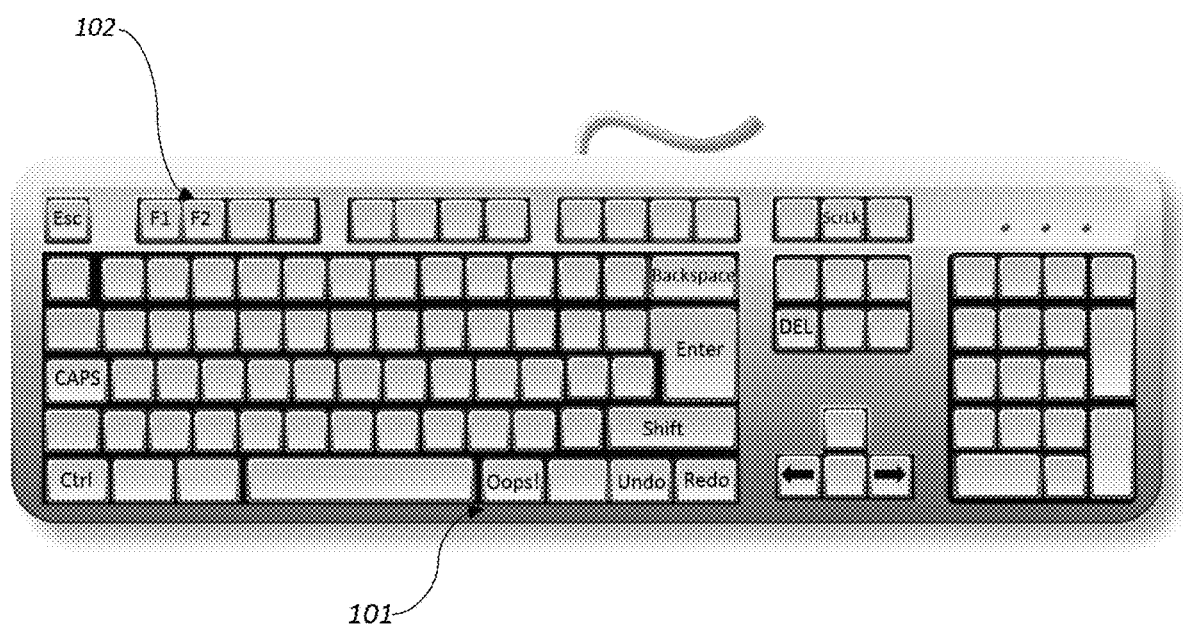
FIG. 1B illustrates an embodiment of a keyboard including an alteration key.
Figure 1C:
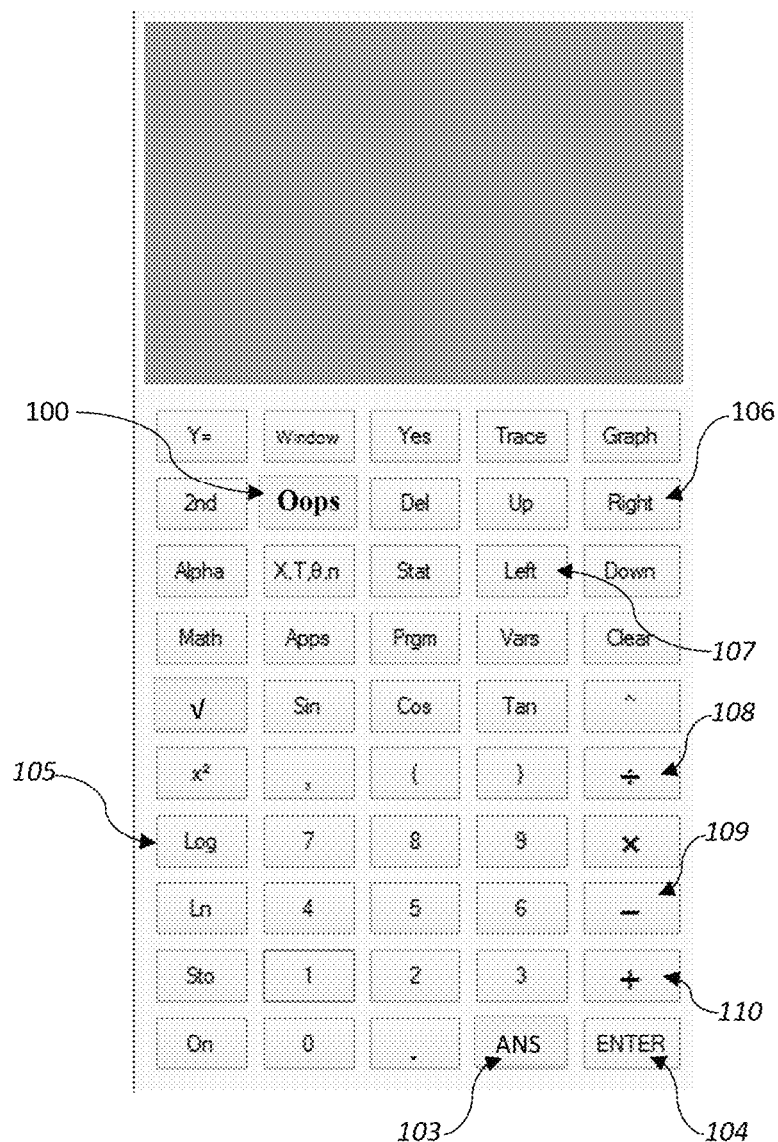
FIG. 1C illustrates an embodiment of a calculator including an alteration key.

FIG. 1A is a block diagram of an embodiment of a device 10 including an interface as described herein. The device 10 can be any type of electronic or computing device including, for example, a desktop computer, a laptop, a tablet, a smartphone, a voice computer, or a calculator, among others. The interface allows a user to interact with the device 10. For example, the interface allows a user to input information into the device 10 and view or receive information from the device 10.

In the illustrated embodiment, the device 10 includes a processor 12 and a computer readable medium 14. The computer readable medium 14 can include instructions that, when executed by the processor 12, cause the device 10 to implement one or more of the many interface functions described herein. The computer readable medium 14 can also be used to store information, as necessary, for use by the interface.

As shown, the device 10 includes an input device 16. The input device 16 allows the user to input information into and interact with the device 10. Many types of input devices 16 are possible, including keyboards, mice, touchscreens, microphones (for voice commands), etc. The input device 16 can include an alteration key 18. The alteration key 18 can be used, for example, to alter an alterable decision made by the interface as described below, as well as for additional functionality as described throughout this application. In some embodiments, the alteration key 18 is a dedicated key or button. In some embodiments, the alteration key 18 is a soft-key implanted on a touch screen. In some embodiments, the alteration key 18 can be implemented by having a user click or press on an alterable decision to alter it. In some embodiments, the alteration key 18 can be a voice command. Additional examples of the alteration key 18 are found throughout this application.

The device 10 also includes an output device 20. The output device 20 can be configured to display or otherwise communicate information to a user. For example, the output device 20 can be a monitor or screen. In some embodiments, the output device 20 can comprise a speaker for audibly communicating information to the user.

As noted previously, the interface of the device 10 can be configured to implement one or more of the various interface functions described herein.

Chapter 2: Alterable Decisions and the Alteration Key

About Part I

Part I of the present specification includes Chapters 2 to 15. Part I explains various features that may facilitate mistake recovery, including features that pertain to "alterable decisions" as described below, and also including features that pertain to undo functionality and autocorrection functionality.

Farther below, Part II explains features that may tend to prevent the interface from repeating mistakes and features that may tend to prevent users from wasting time. Part III explains for various situations interface improvements that may make it easier for a user to achieve desired results quickly; in particular, Part III explains for various situations various specific circumstances in which the interface may make alterable decisions.

Alterable Decisions

Various embodiments include various features that pertain to "alterable decisions." As used in the present specification, an "alterable decision" or "alterable interface decision" can be an interface decision such that the interface either saves sufficient information to subsequently identify the portion of input that the decision pertained to, or sufficient information to later determine what the user's input would then be if the outcome of the earlier decision had been different, or both. For example, in an embodiment, when the interface decides to autocorrect a word that a user typed, the decision to autocorrect the word will be an alterable decision, which means that the interface will either save sufficient information to subsequently identify the word that was autocorrected as the portion of input that this alterable decision pertained to, or sufficient information to later determine what the user's input would be if the word's uncorrected spelling were retroactively restored, or both.

However, the term "alterable decision" may be a misnomer in some embodiments because not all embodiments will necessarily facilitate altering such decisions: some embodiments may, and others may not. For example, an embodiment is described in Chapter 5 in which the interface highlights the outcomes of "alterable decisions" in order to call attention to possible mistakes, and such an embodiment may yield significant advantages over prior art even if it does not also facilitate the correction of such mistakes. Also, the term "alterable decision" may be a misnomer for certain types of alterable decisions because when a user performs an action that causes the interface to "make an alterable decision," the interface will not necessarily have any real choice as to how it initially responds to the user's action. For example, an embodiment is described in Chapter 33 such that if a user pauses for a long time while the interface is in Caps Lock mode, the interface may "alterably decide to remain in Caps Lock mode." In such an embodiment, even though the interface makes a so-called "alterable decision" in such circumstances, it has no real choice: arguably, a long pause is not a sufficient reason for the interface to automatically exit Caps Lock mode. Thus, the term "alterable decision" should be understood in light of the entirety of the present specification, and should not be strictly construed.

Above, and in various other places, the present specification mentions the "portion of input" that an interface decision pertains to. However, in some embodiments, the interface functionality that is specified herein may also interact with software output or interact with something else that is not input. Throughout the present specification, where appropriate, the word "input" should be understood to also refer to software output or to anything else that interface functionality may display and modify. For example, in an embodiment where the interface makes a decision whether to display the output of a calculation as a fraction or as a decimal, the so-called "portion of input" that this interface decision pertains to is actually the output of the calculation.

Alterable Decisions in Perspective

In the present specification, alterable decisions are often associated with potential user mistakes: in some embodiments, if an interface decision has an outcome that a user does not expect and does not desire, then in many cases the user will be able to correct the mistake by altering the decision. However, even though alteration functionality is often associated with mistake recovery herein, it is to be understood that alteration functionality need not be exclusively used for mistake recovery. For example, in some cases, a user who is familiar with alteration technology may deliberately make a "mistake" and then alter an interface decision because this is an efficient way to achieve a desired outcome.

The most common mistakes that a typical user of a computing device will encounter are word entry mistakes, which are typographical errors or spelling mistakes that are the user's fault. In some interfaces autocorrection functionality will often, but not always, correct word entry mistakes. Arguably, the most frustrating mistakes that a typical user of a computing device will commonly encounter are "undesired interface interventions," which are the mistakes that occur when the computing device performs an autocorrection or automatic formatting action that the user does not desire.

An interface decision regarding whether or not to autocorrect a word is a familiar example of an interface decision that is reasonably likely to have an outcome that a user regrets, and for that reason, autocorrection decisions are frequently used herein as convenient examples of alterable decisions. However, autocorrection decisions are not the only possible type of alterable decision: in Part III the present specification explains many other types of interface decisions that are alterable decisions in some embodiments.

Where prior art interfaces include specialized mistake recovery features (other than generic undo functionality), those features typically only facilitate recovery from word entry mistakes or undesired interface interventions. For that reason, when the present specification compares new mistake recovery features to prior art mistake recovery features, the present specification will generally emphasize how new mistake recovery features may do better at facilitating recovery from word entry mistakes or undesired interface interventions. Despite this emphasis on word entry mistakes and undesired interface interventions, it is to be understood that the new mistake recovery features described herein may also do better than prior art at facilitating recovery from various other types of mistakes, since prior art interfaces generally lack functionality that especially facilitates recovery from the other types of mistakes that are described herein.

An embodiment that has even just one feature that interacts with alterable decisions and has just one type of alterable decision may have significant advantages. For example, in a very early prototype, the only feature that interacted with alterable decisions was a simple alteration key, and the only alterable decisions that the alteration key could interact with were alterable structure exiting decisions; even in that relatively simple embodiment, the alteration key was useful.

However, the more interface decisions are alterable decisions, the more useful it will be to add functionality pertaining to such decisions, and conversely, the more functionality an embodiment has pertaining to alterable interface decisions, the more useful it will be to make interface decisions be alterable decisions. Alterable decisions may thus be at the core of a synergistic virtuous cycle.

Much of the present specification is devoted to explaining features that interact with alterable decisions in certain circumstances and features that cause the interface to make alterable decisions in certain circumstances. Other features are explained herein that do not directly pertain to alterable decisions, but may be more advantageous in an embodiment that has alterable decision functionality. For example, if a particular feature usually facilitates faster input, but careless users occasionally tend to make a certain type of mistake when using that feature, then such a feature may be advantageous on its own, but may be more advantageous in an embodiment that has alterable decision functionality that is specifically configured to facilitate correcting that type of mistake.

An Alteration Key Example

Figure 2A:
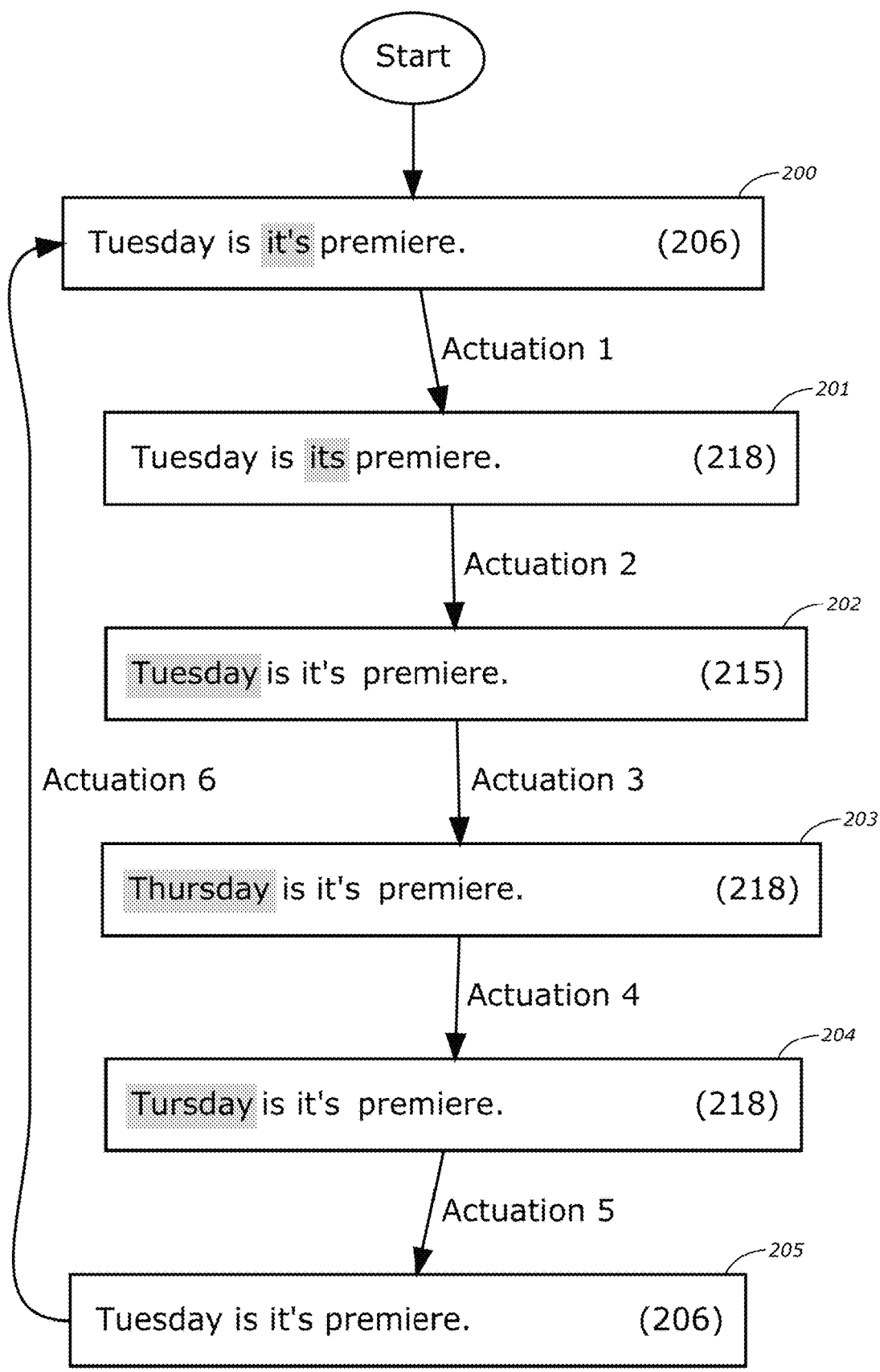
FIG. 2A is a flowchart illustrating repeated consecutive actuations of an alteration key, according to one embodiment.
Figure 3:
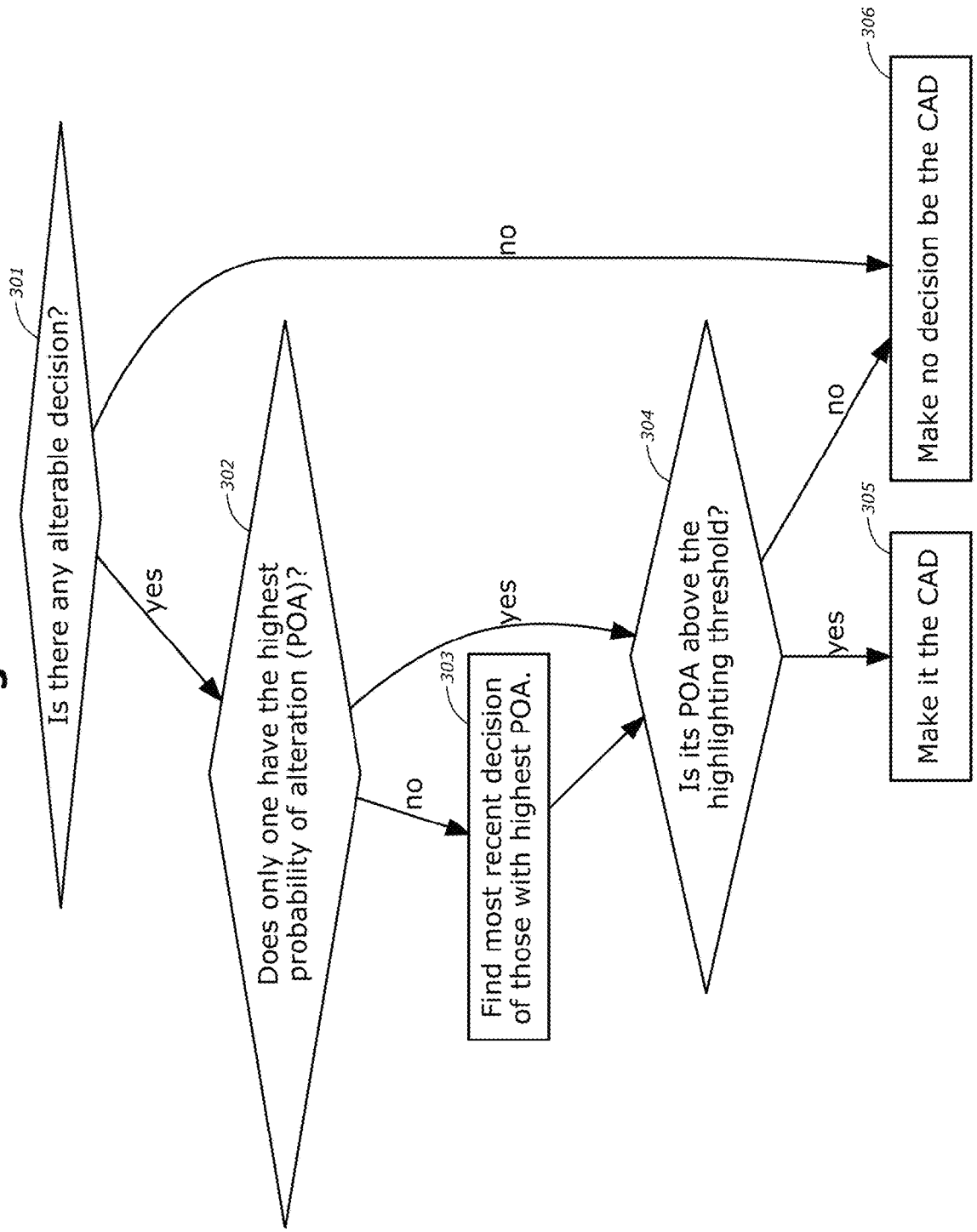
FIG. 3 is a flowchart that illustrates in detail how the currently alterable decision is determined, according to one embodiment.
Figure 4A:
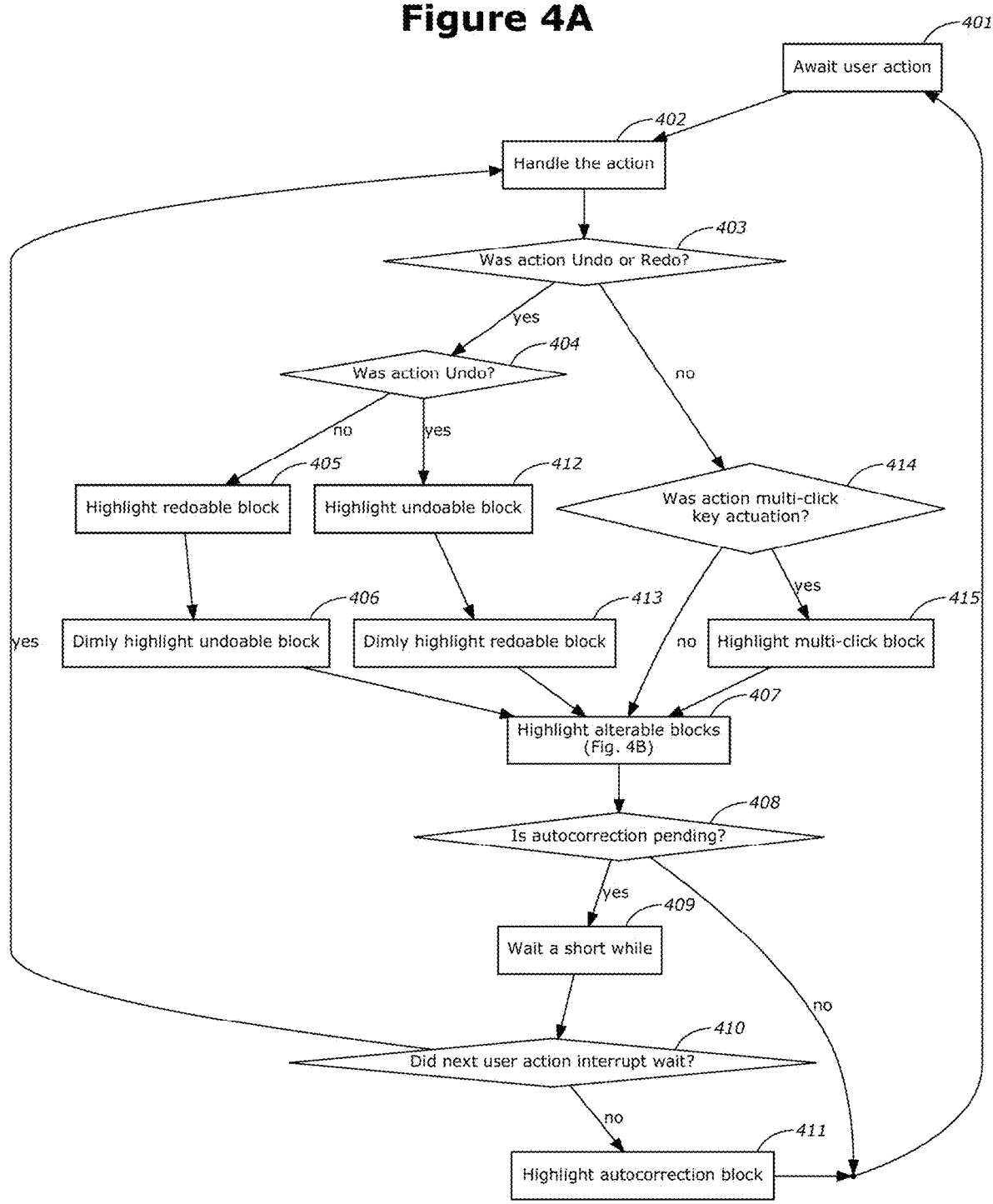
FIGS. 4A and 4B illustrate an embodiment of a method for determining what to highlight after each user action.
Figure 4B:
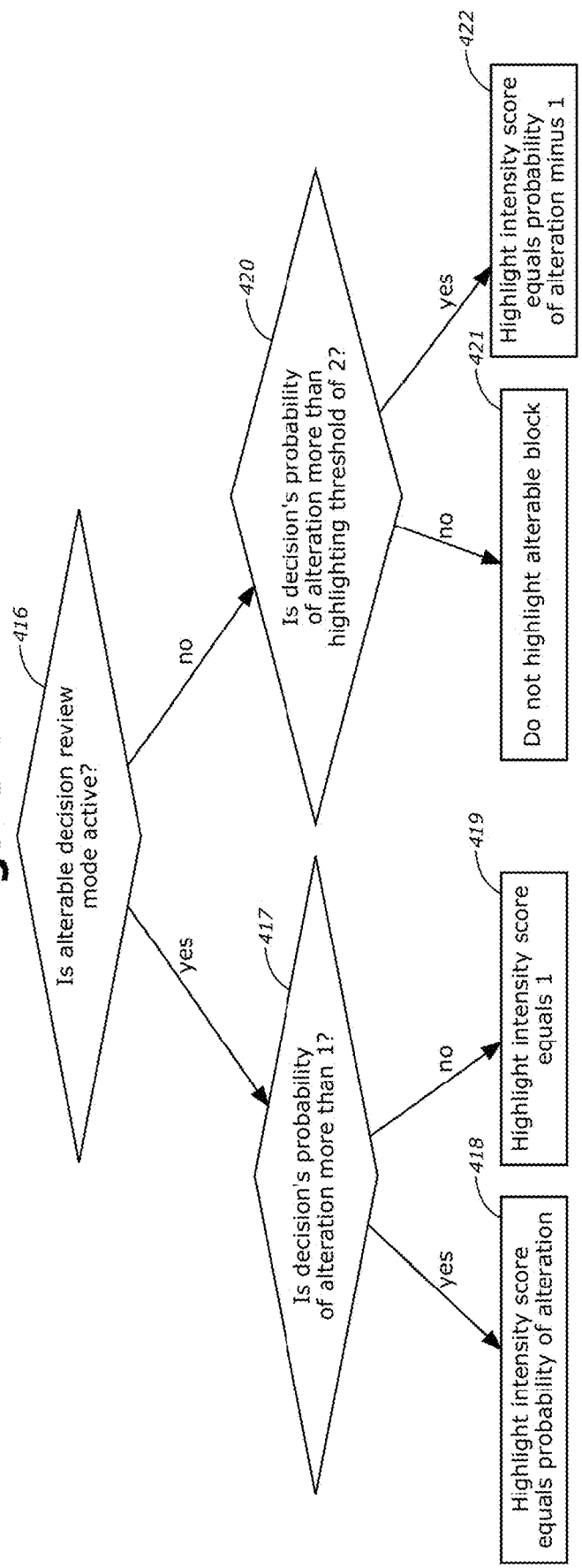
Figure 5:
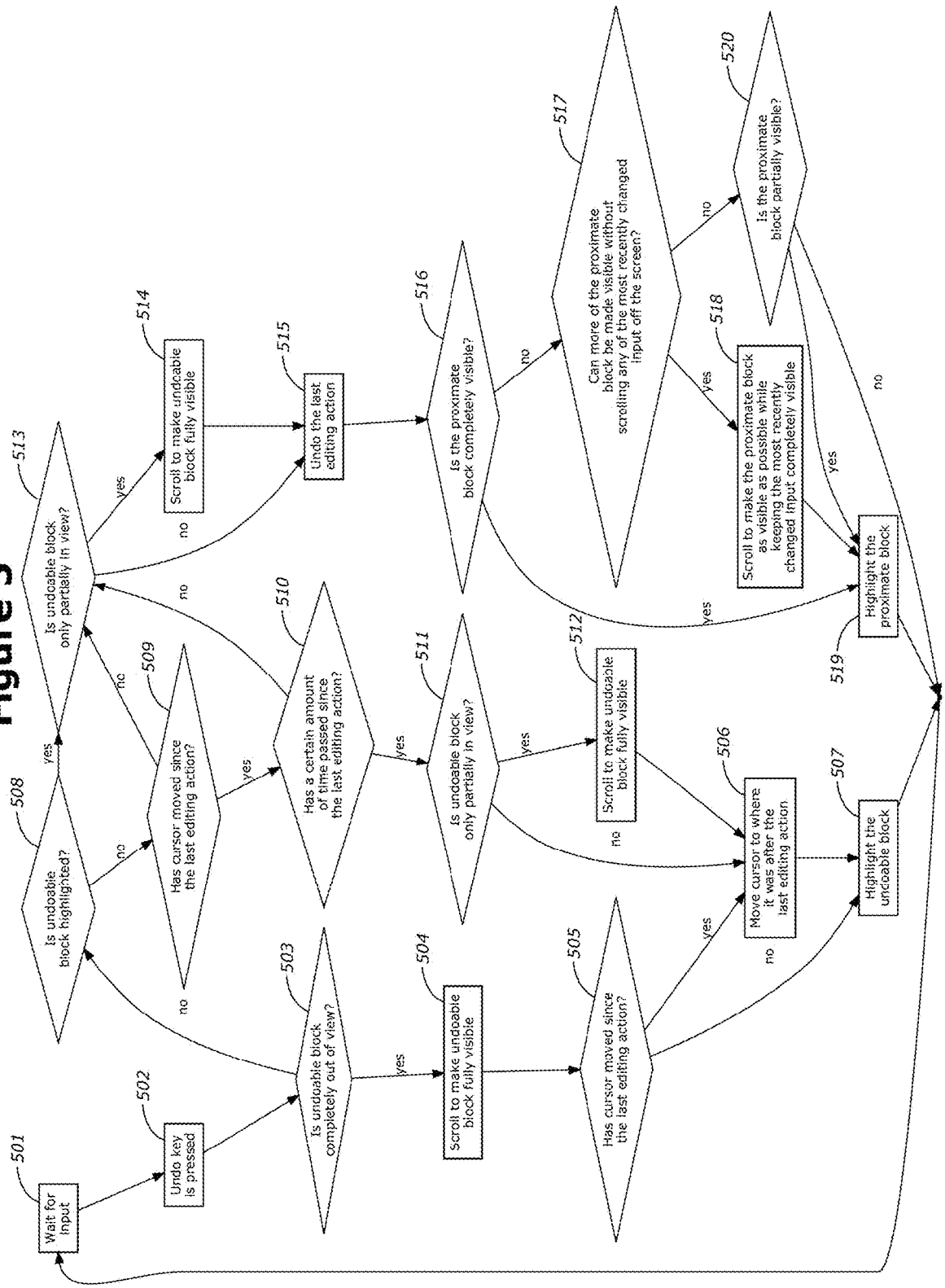
FIG. 5 is a flowchart that illustrates, according to one embodiment, how an interface will react when an Undo key is pressed, with particular attention to how the interface will attempt to make undo changes visible for the user.
Figure 6B:
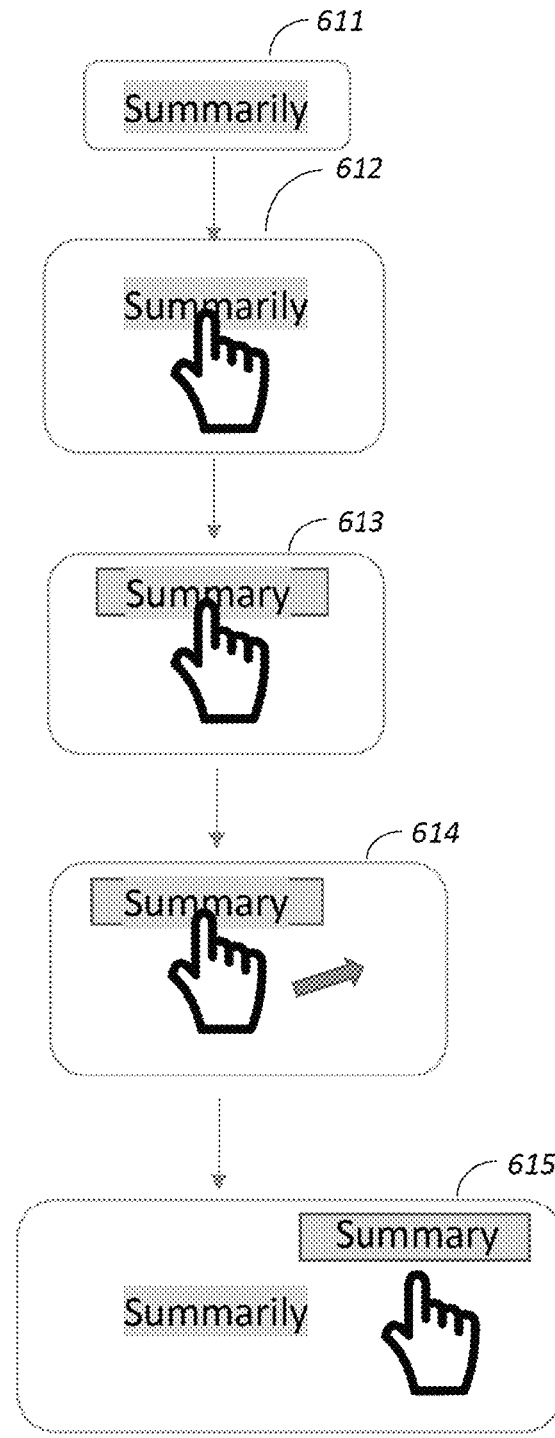
FIG. 6B illustrates an example of touch cancellation.
Figure 7A:
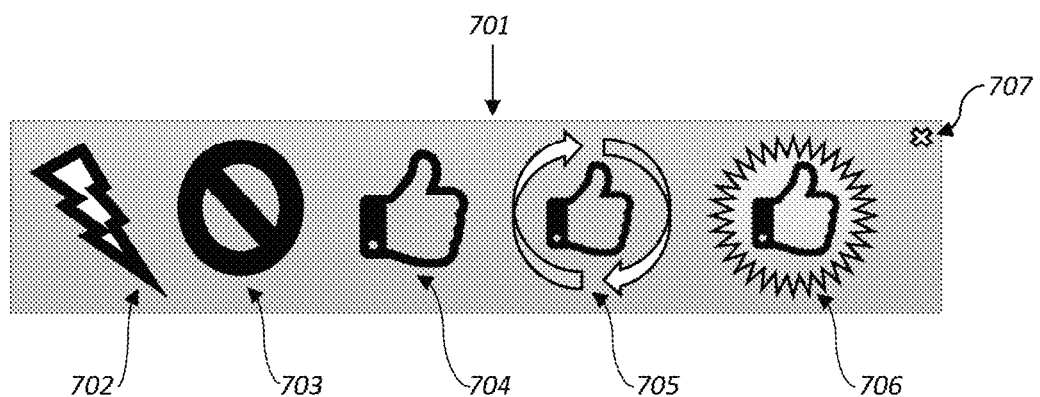
FIG. 7A illustrates an example of an alteration control panel.
Figure 7B:
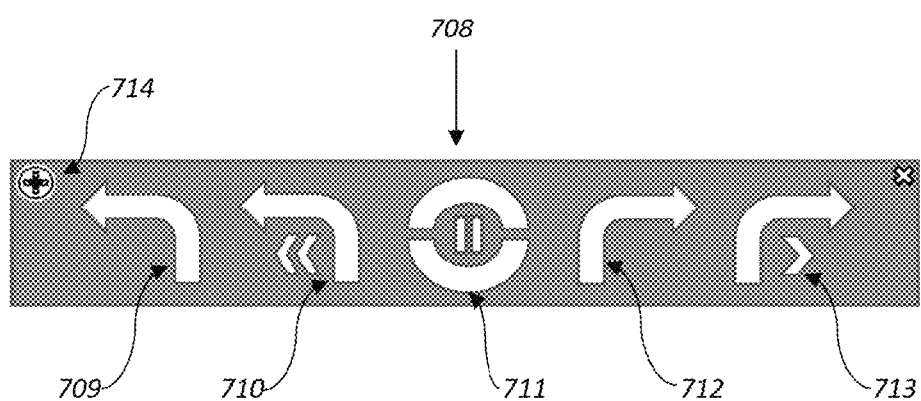
FIG. 7B illustrates an example of an undo control panel.
Figure 9A:
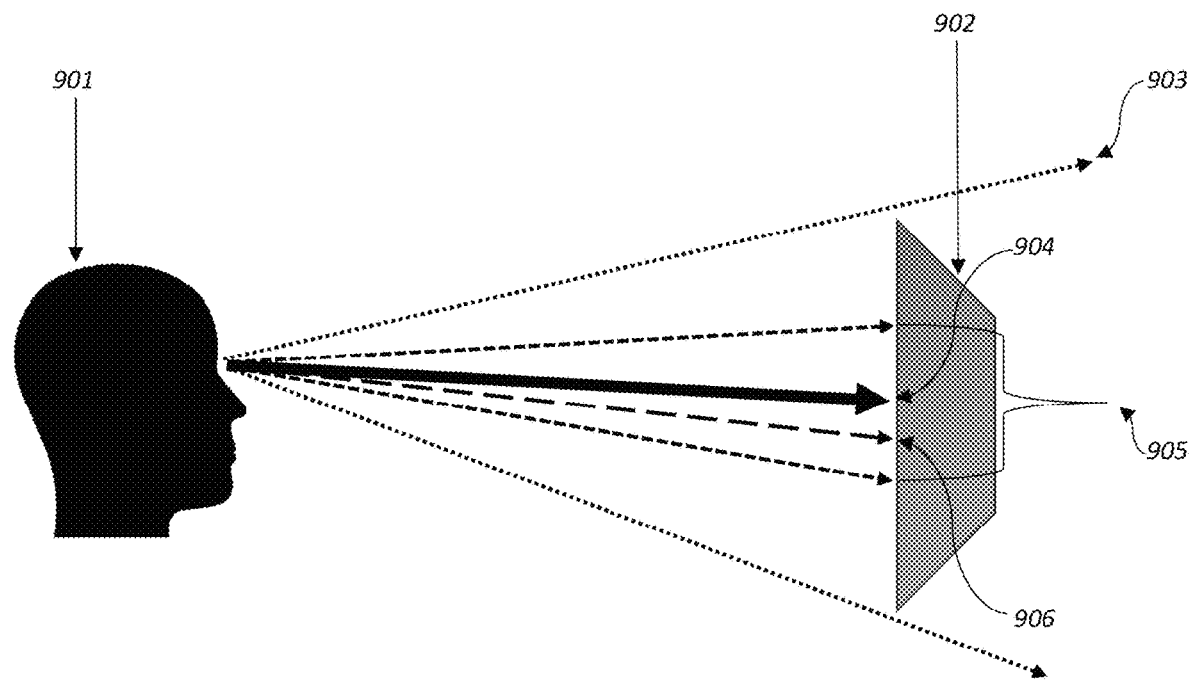
FIG. 9A illustrates a side-view of an interface user who is looking at a display device.
Figure 9B:
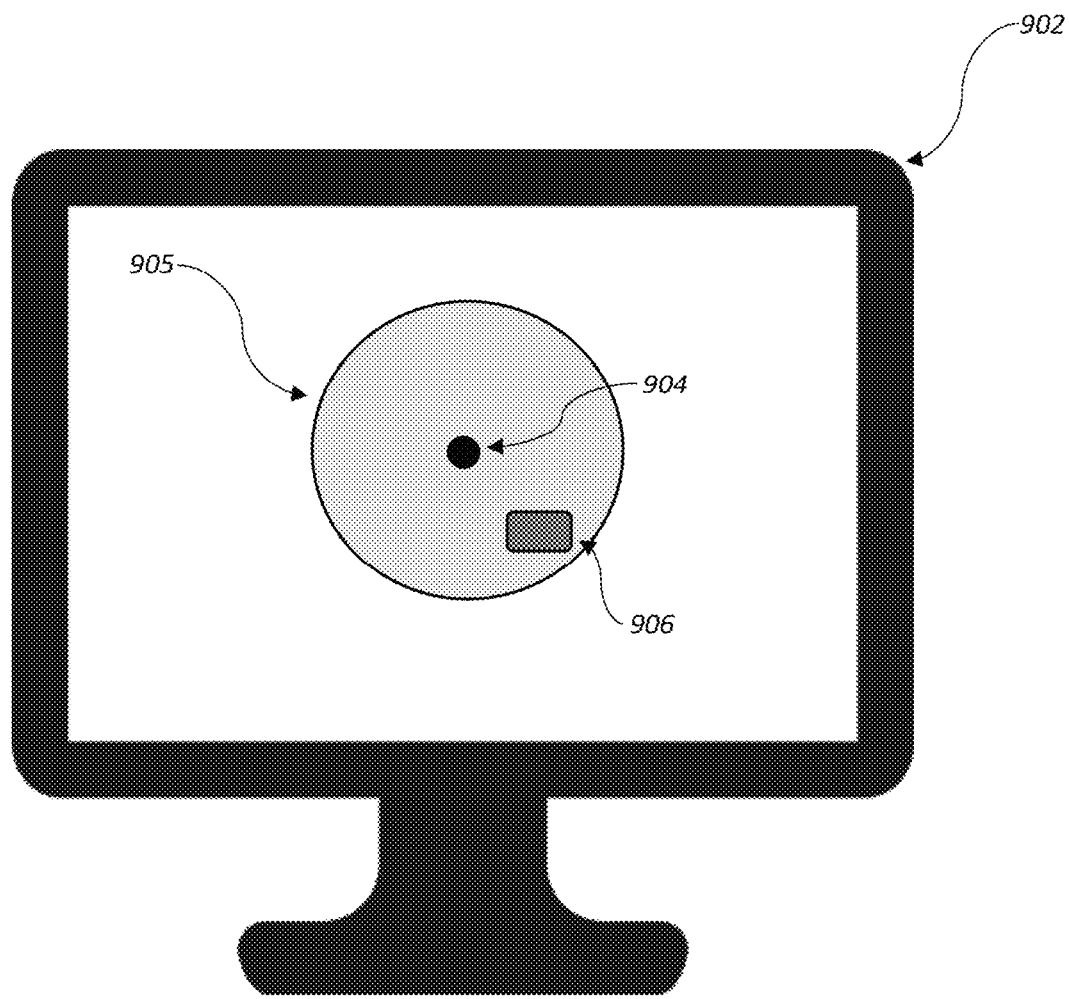
FIG. 9B is a front-facing view of the display device, including the target region and the focal zone centered on the focal location, according to one embodiment.
Figure 10:
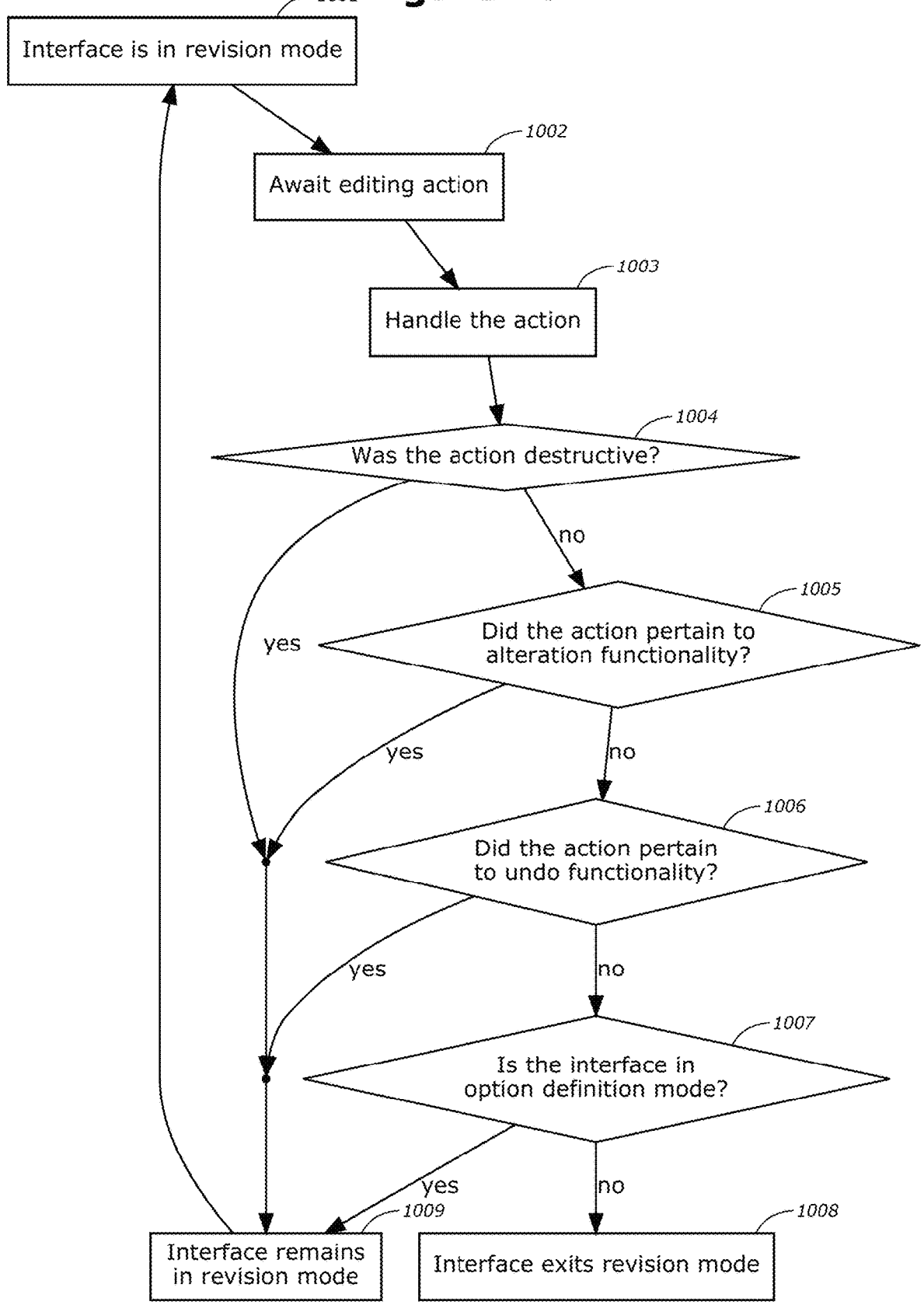
FIG. 10 is a flowchart that illustrates an example method for determining whether an interface remains in revision mode, beginning with the assumption that the interface is in revision mode
Figure 11B:
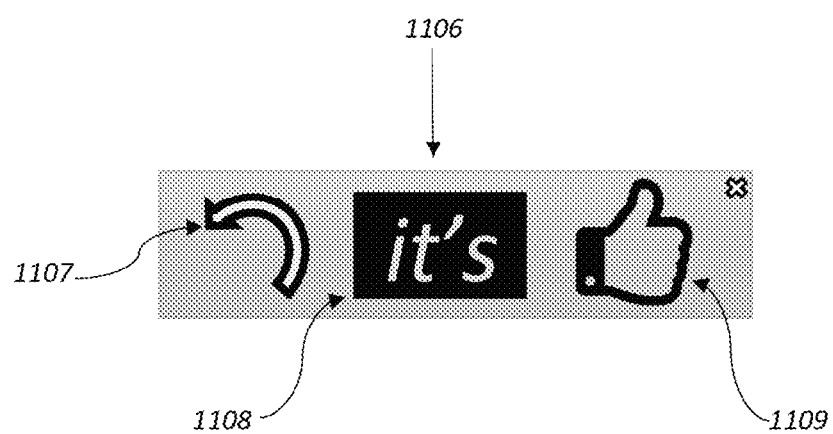
FIG. 11B illustrates an example remote alteration control.
Figure 12A:
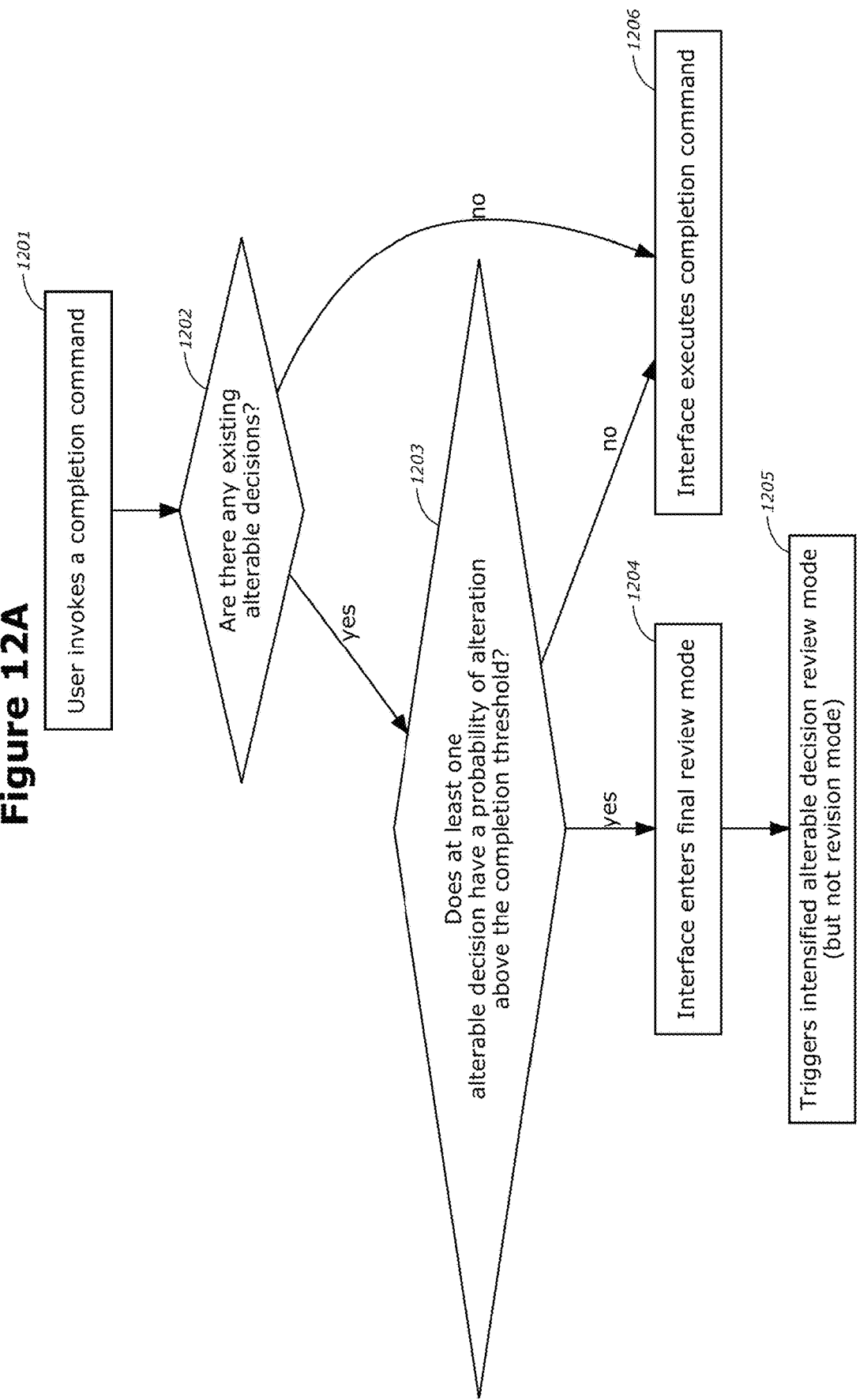
FIG. 12A is a flowchart that illustrates a method for deciding whether the interface enters a final review mode in response to a completion command, according to one embodiment.
Figure 13:
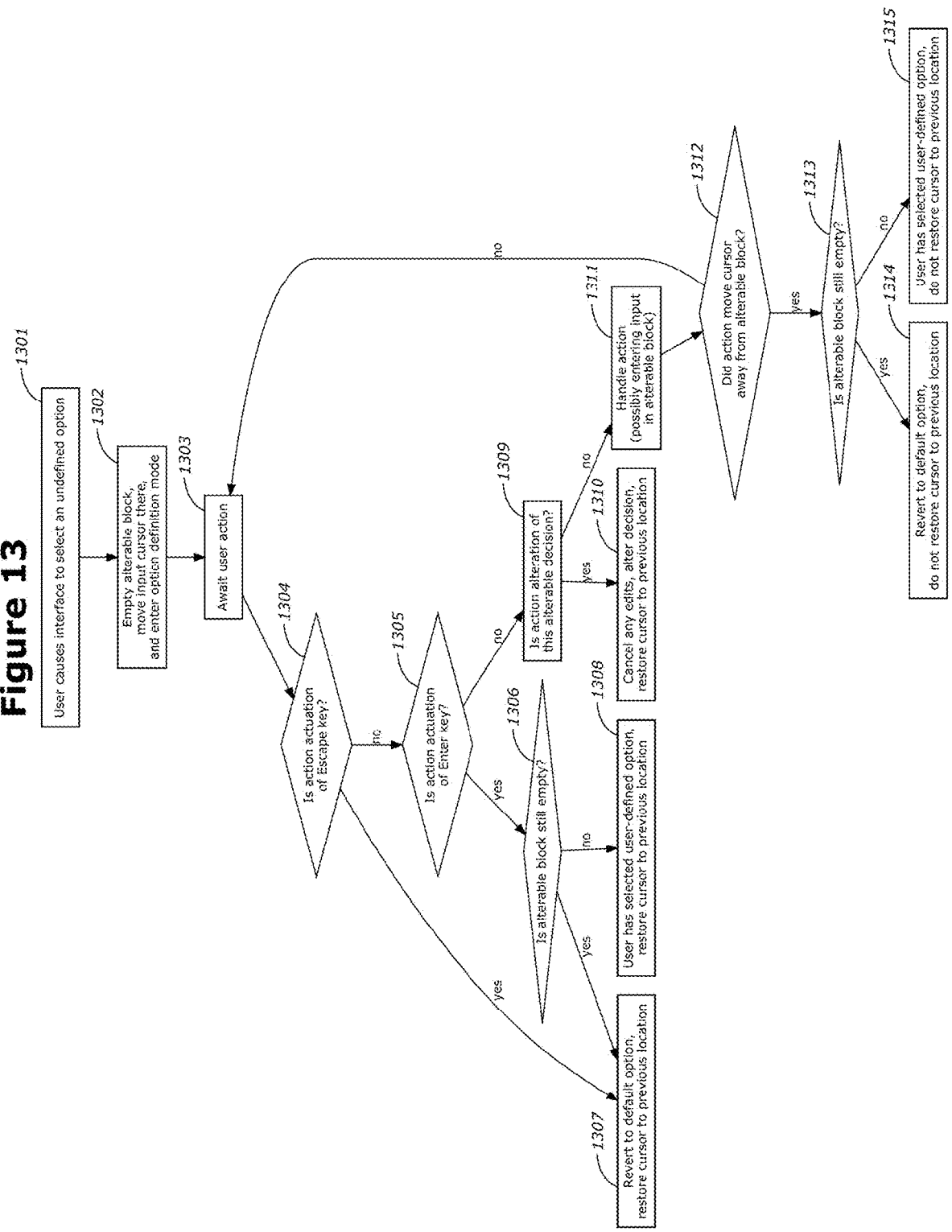
FIG. 13 is a flowchart that illustrates an example method for interface operation while in an option definition mode.
Figure 14A:
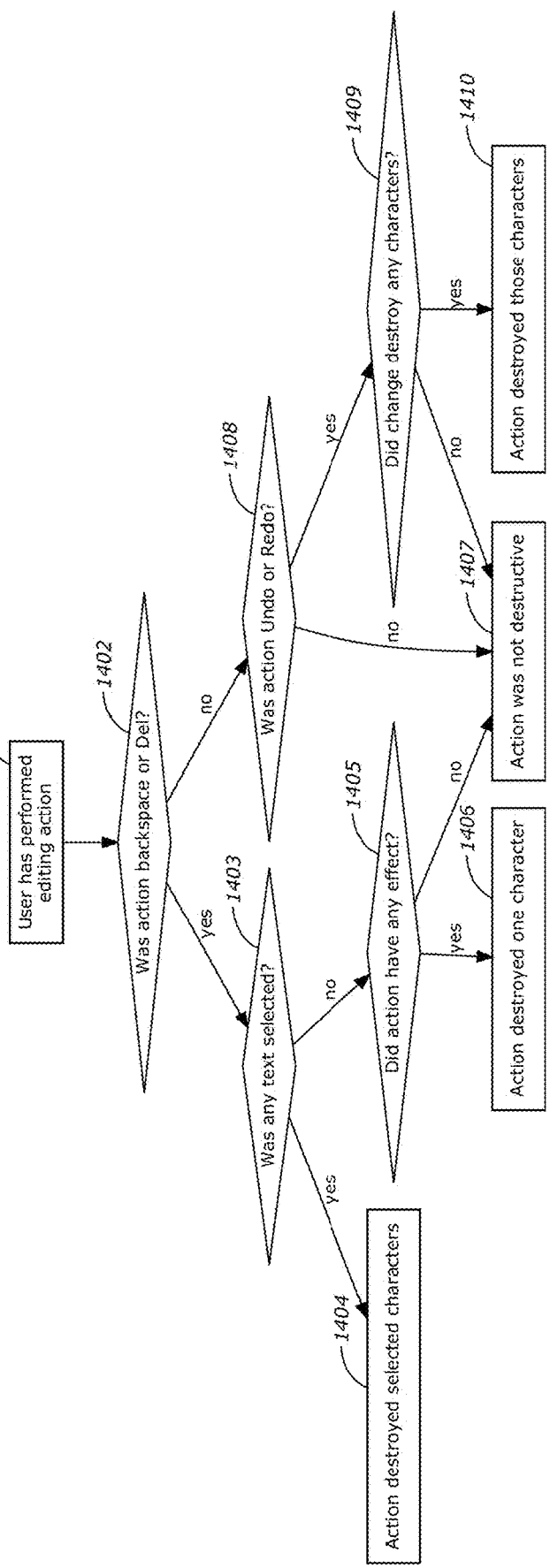
FIG. 14A is a flowchart that illustrates an example method for determining whether or not an action was a destructive action, and what characters it destroyed.
Figure 14C:
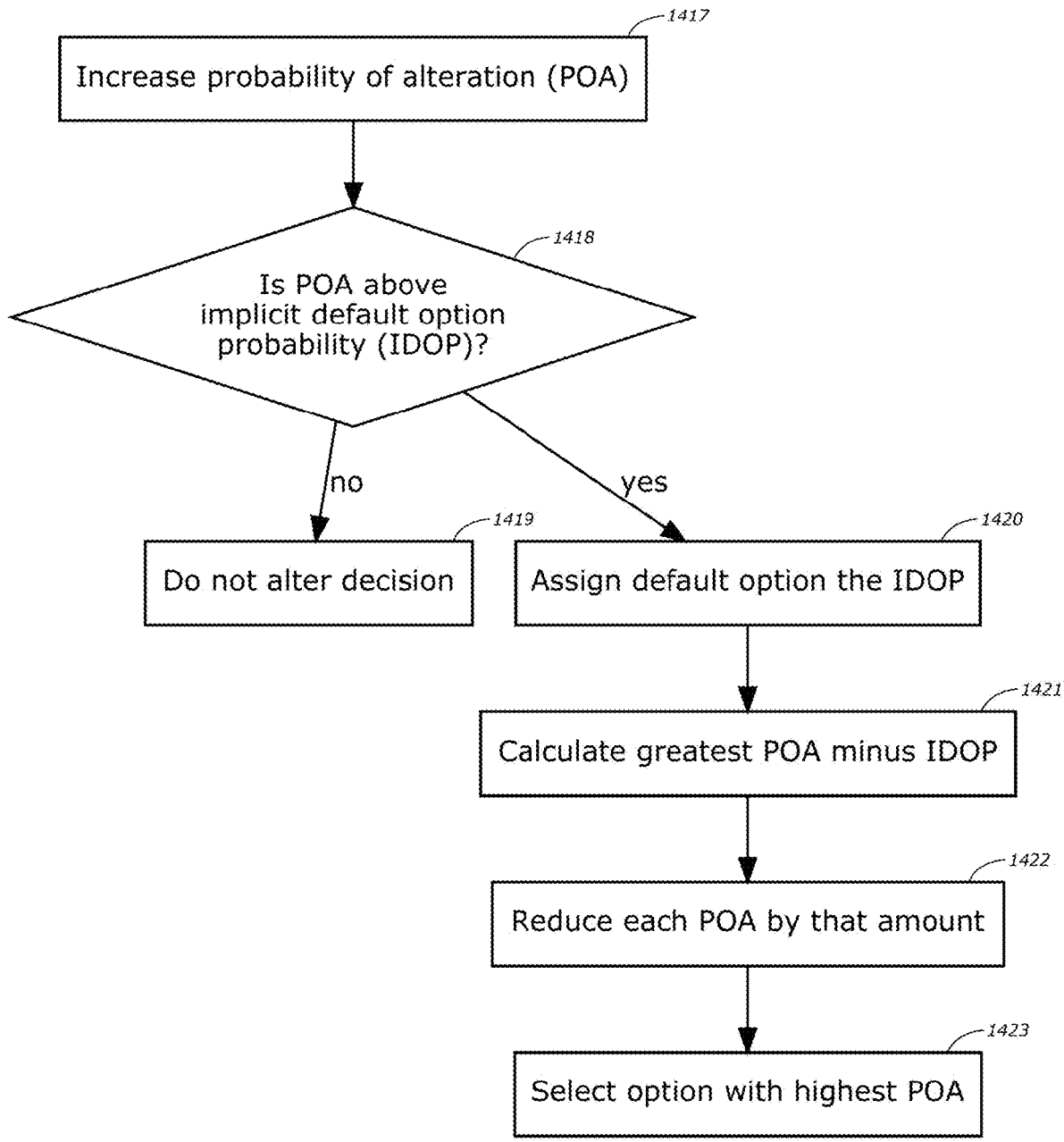
FIG. 14C is a flowchart that illustrates an example method for varying a decision that is identical to a monitored alterable decision.
Figure 15B:
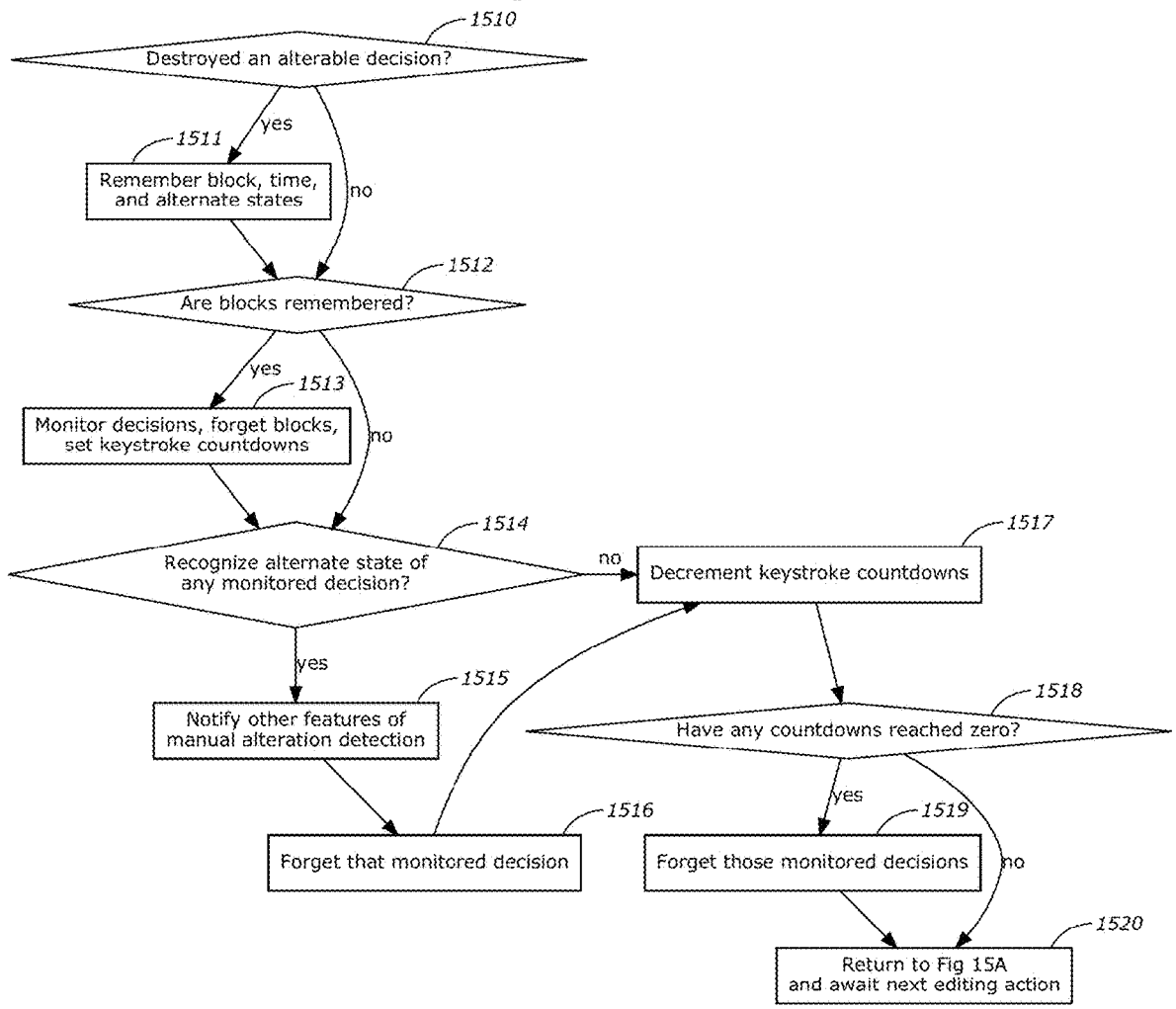
Figure 16:
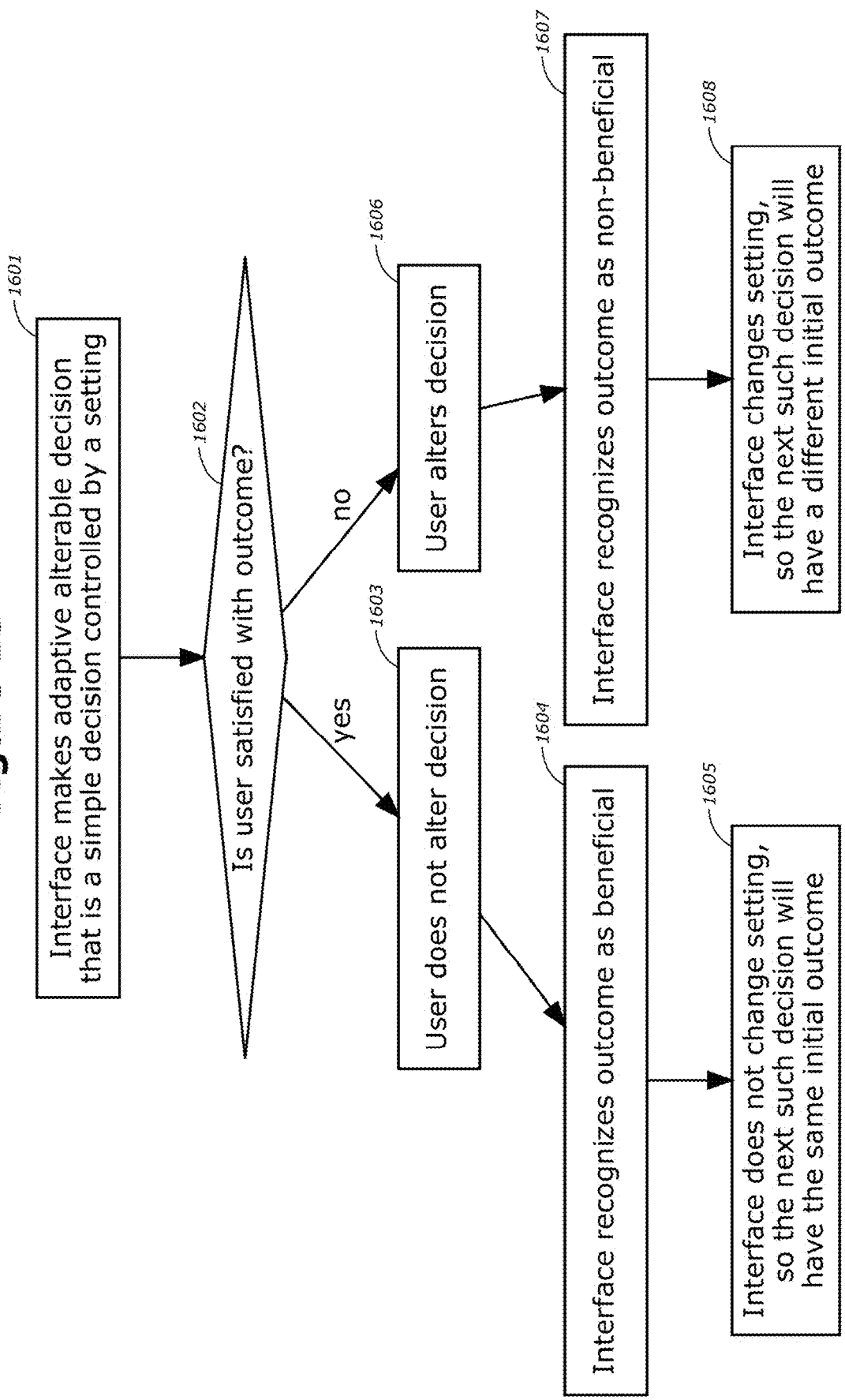
FIG. 16 is a flowchart that illustrates a simple case of an adaptive decision that may affect interface settings, according to one embodiment.
Figure 19A:
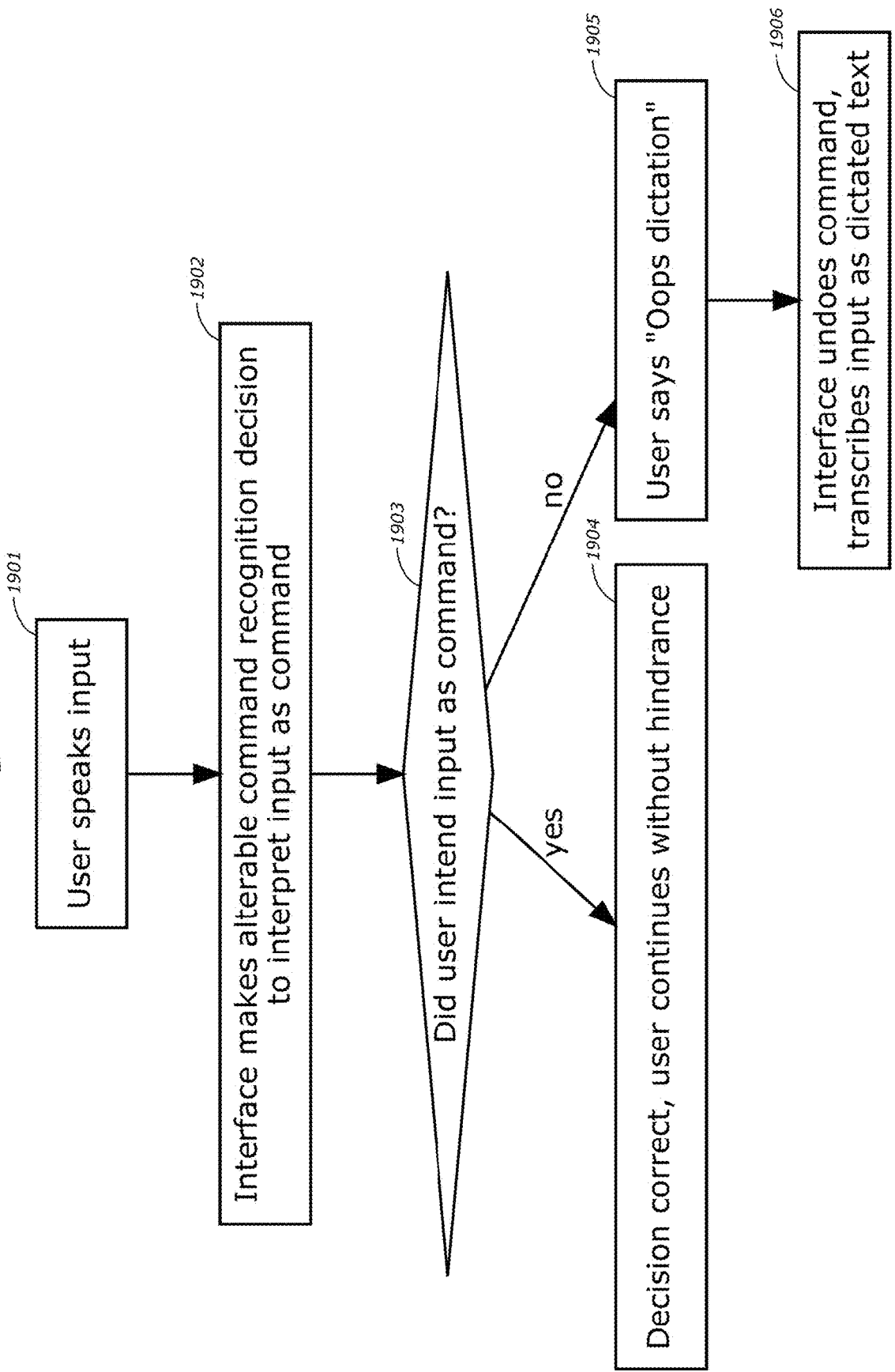
FIGS. 19A and 19B are flowcharts depicting example scenarios where alterable command recognition decisions may facilitate mistake correction.
Figure 19B:
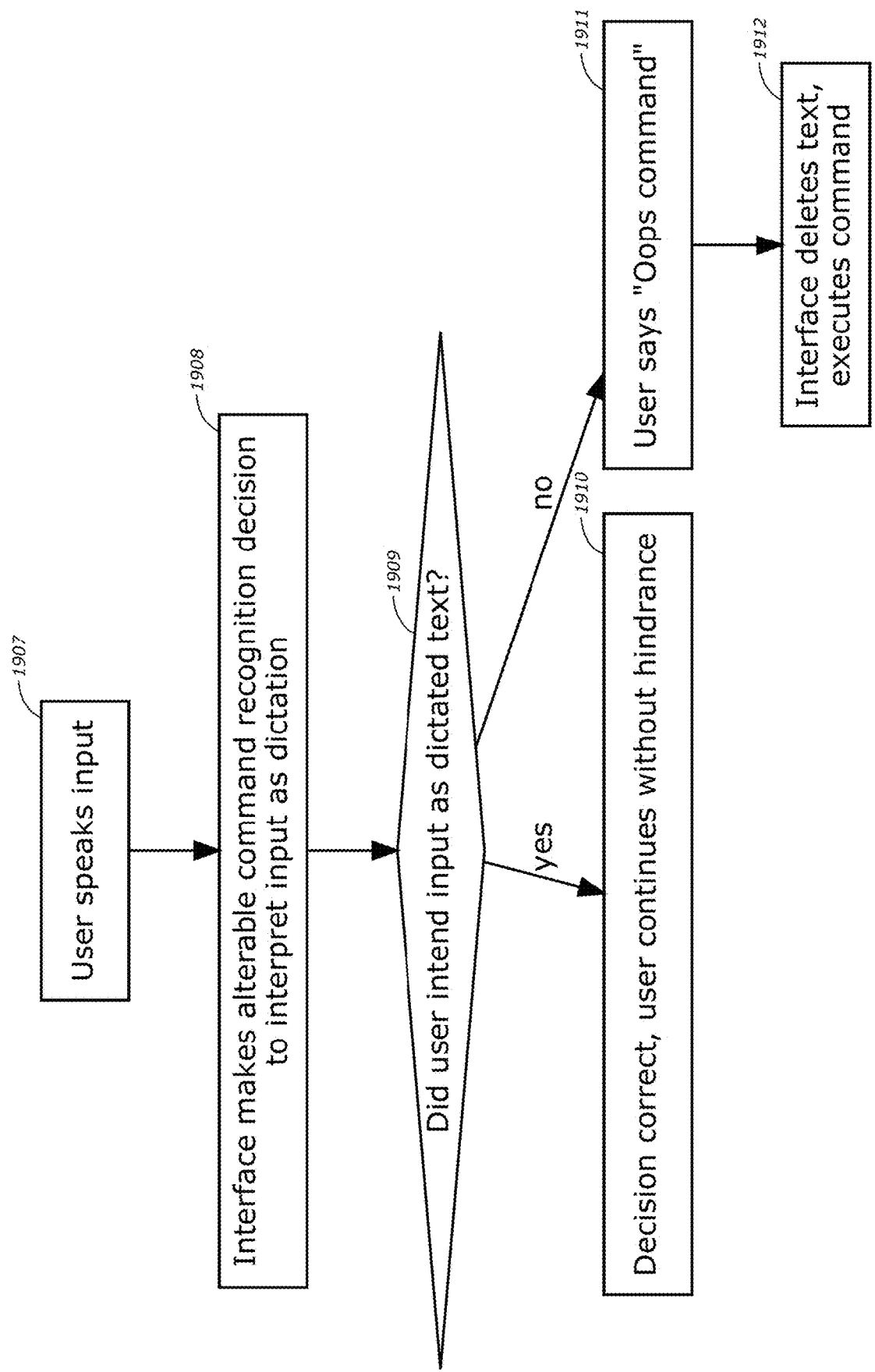
Figure 19C:
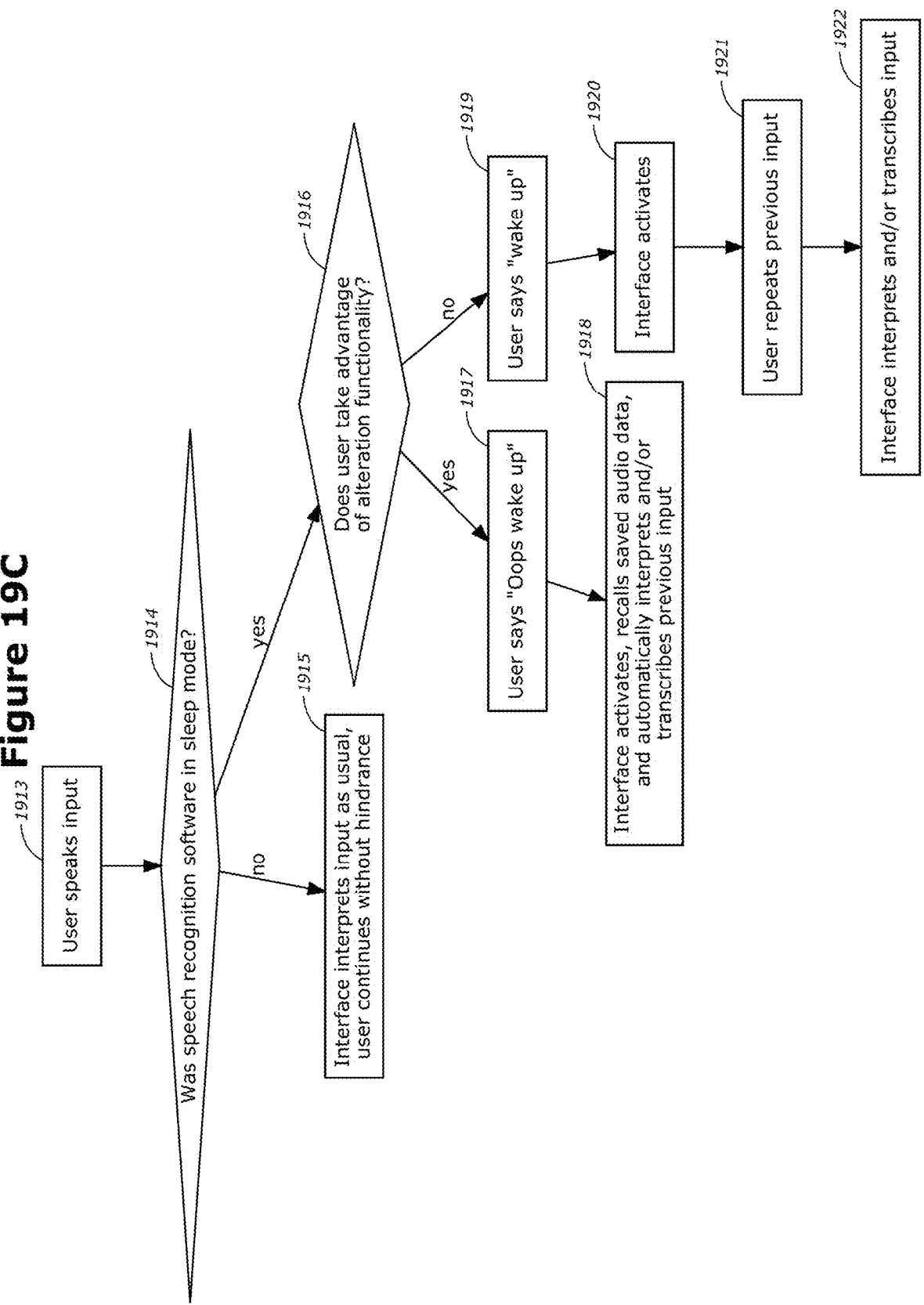
FIG. 19C is a flowchart depicting an example scenario for applying corrective alteration functionality to a mistake that may occur when speech recognition software is in sleep mode.
Figure 20A:
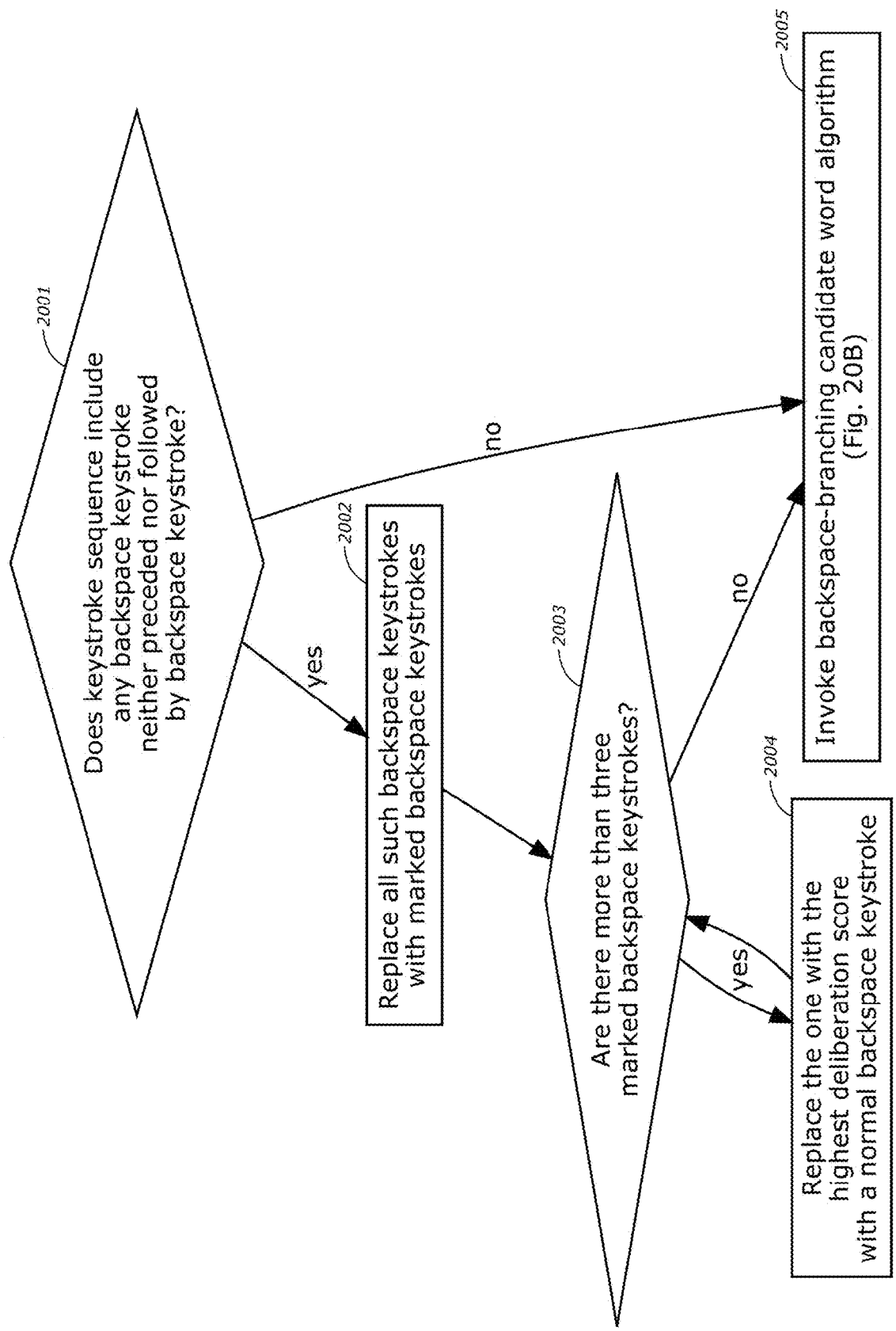
FIGS. 20A and 20B are flowcharts that illustrate an example method that occurs when an enhanced typo-correcting candidate word algorithm is invoked, according to one embodiment.
Figure 20B:
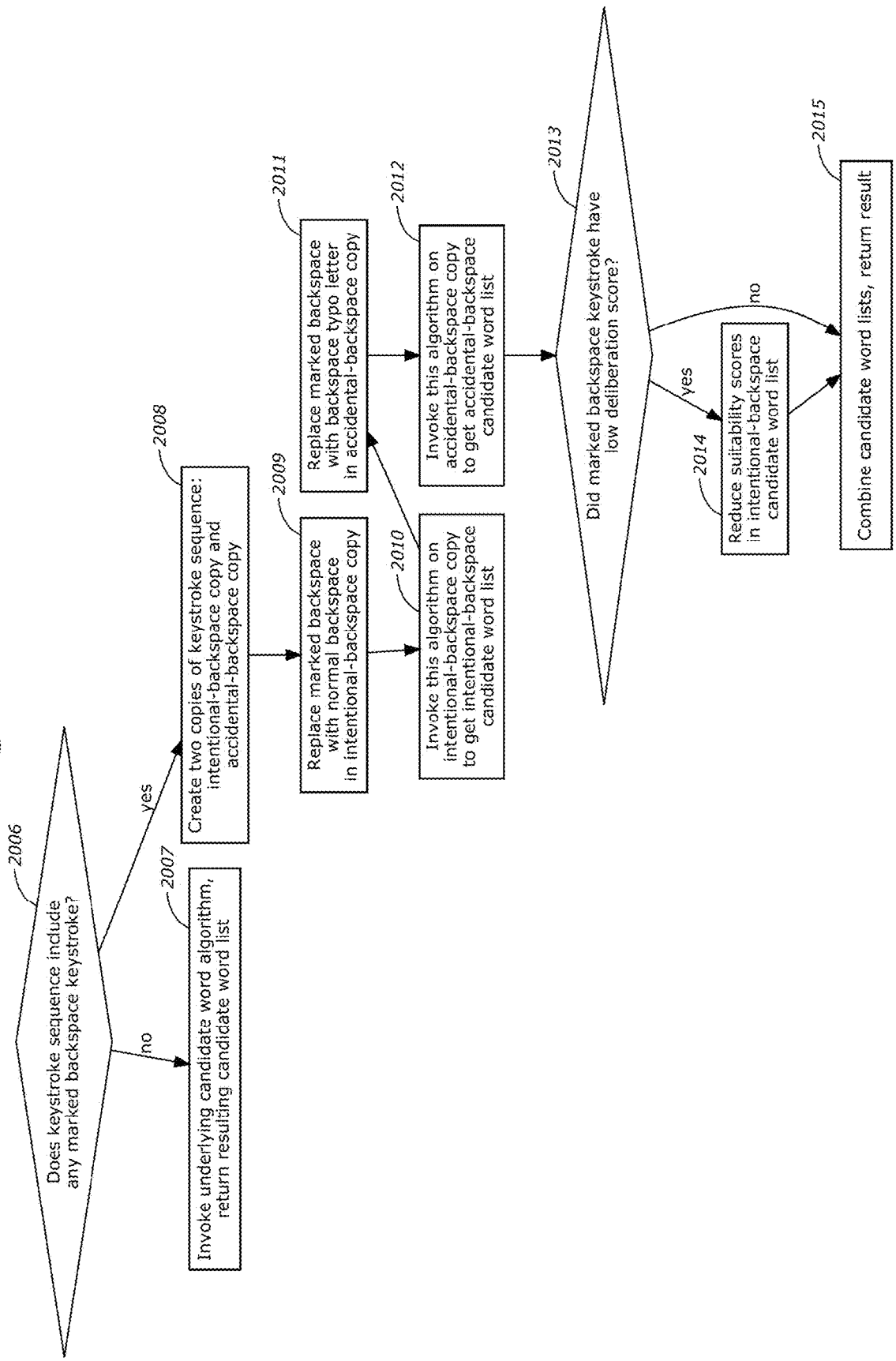
Figure 21A:
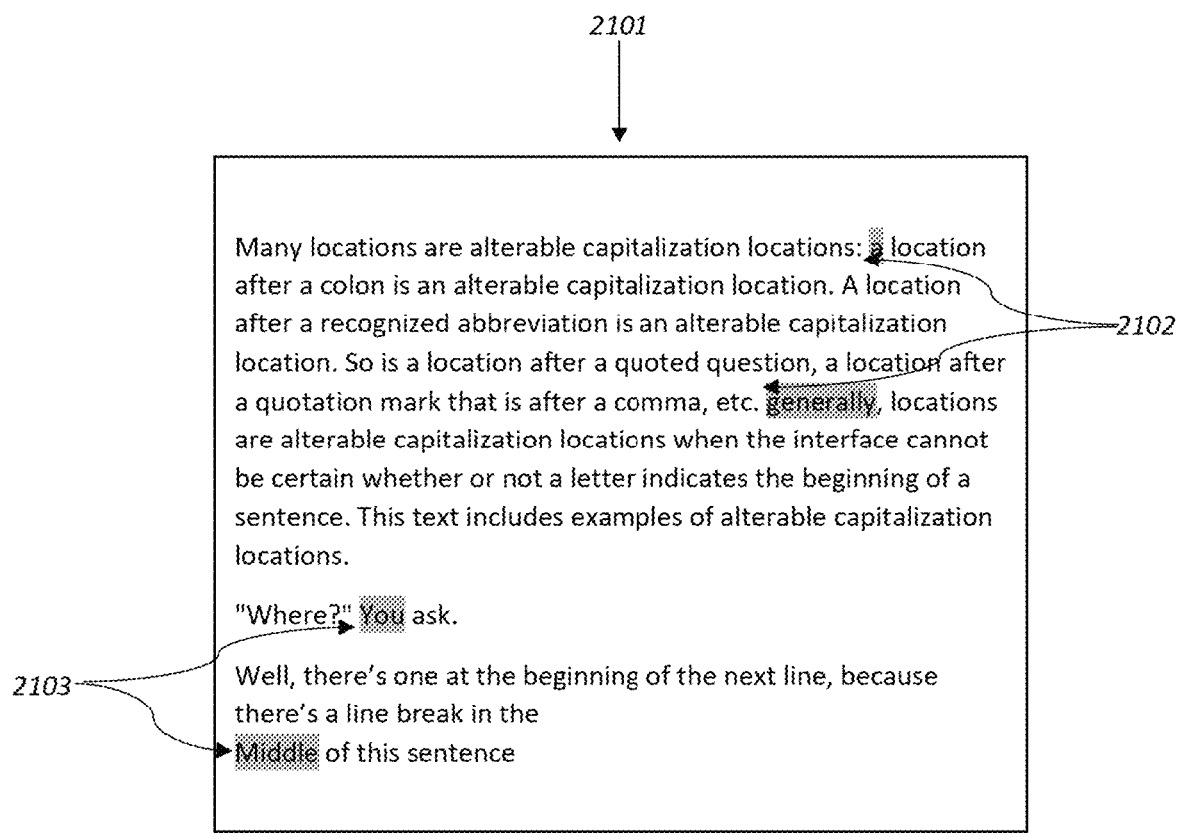
FIG. 21A illustrates features of an alterable capitalization decision.
Figure 21B:
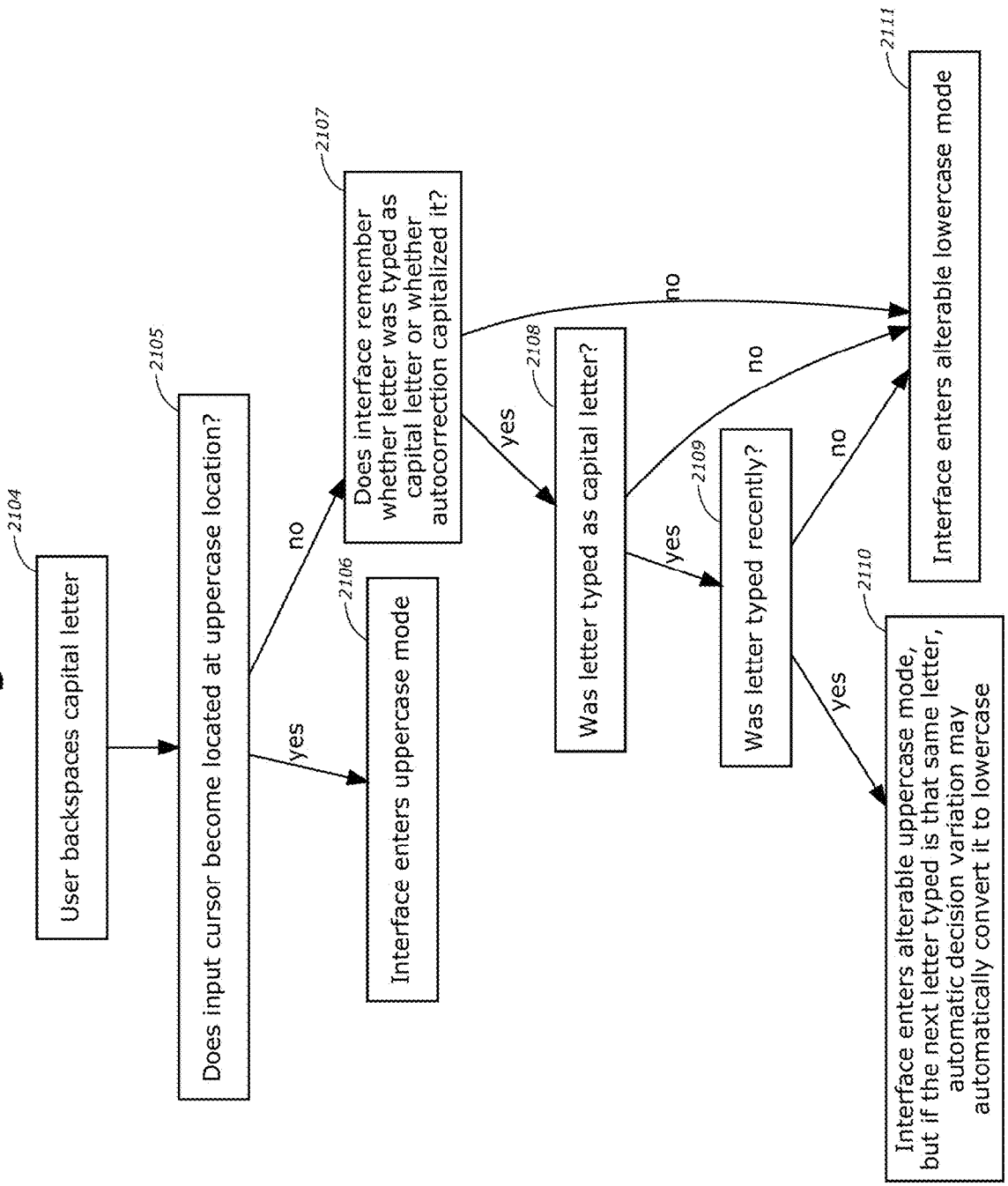
FIG. 21B is a flowchart that illustrates what happens when a user backspaces a capital letter, according to one embodiment.
Figure 22:
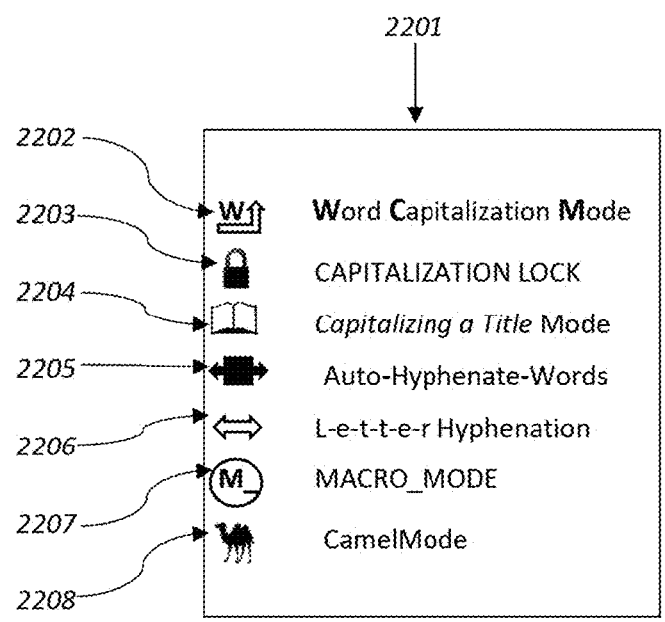
FIG. 22 illustrates an example of a word entry mode menu.
Figure 23A:
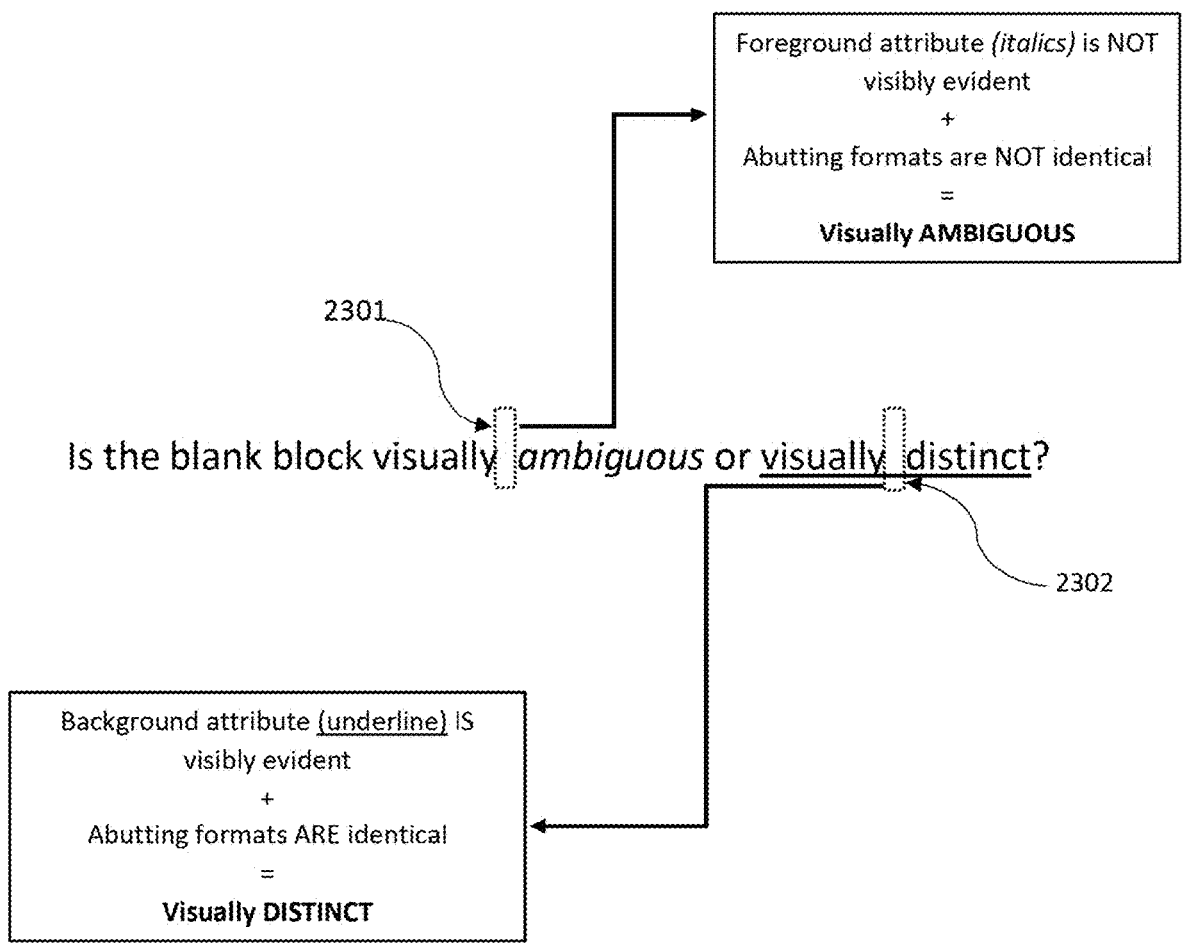
FIG. 23A illustrates a diagram identifying and deconstructing the pertinent format elements distinguishing visually ambiguous from visually distinct blank blocks, according to one embodiment.
Figure 23C:
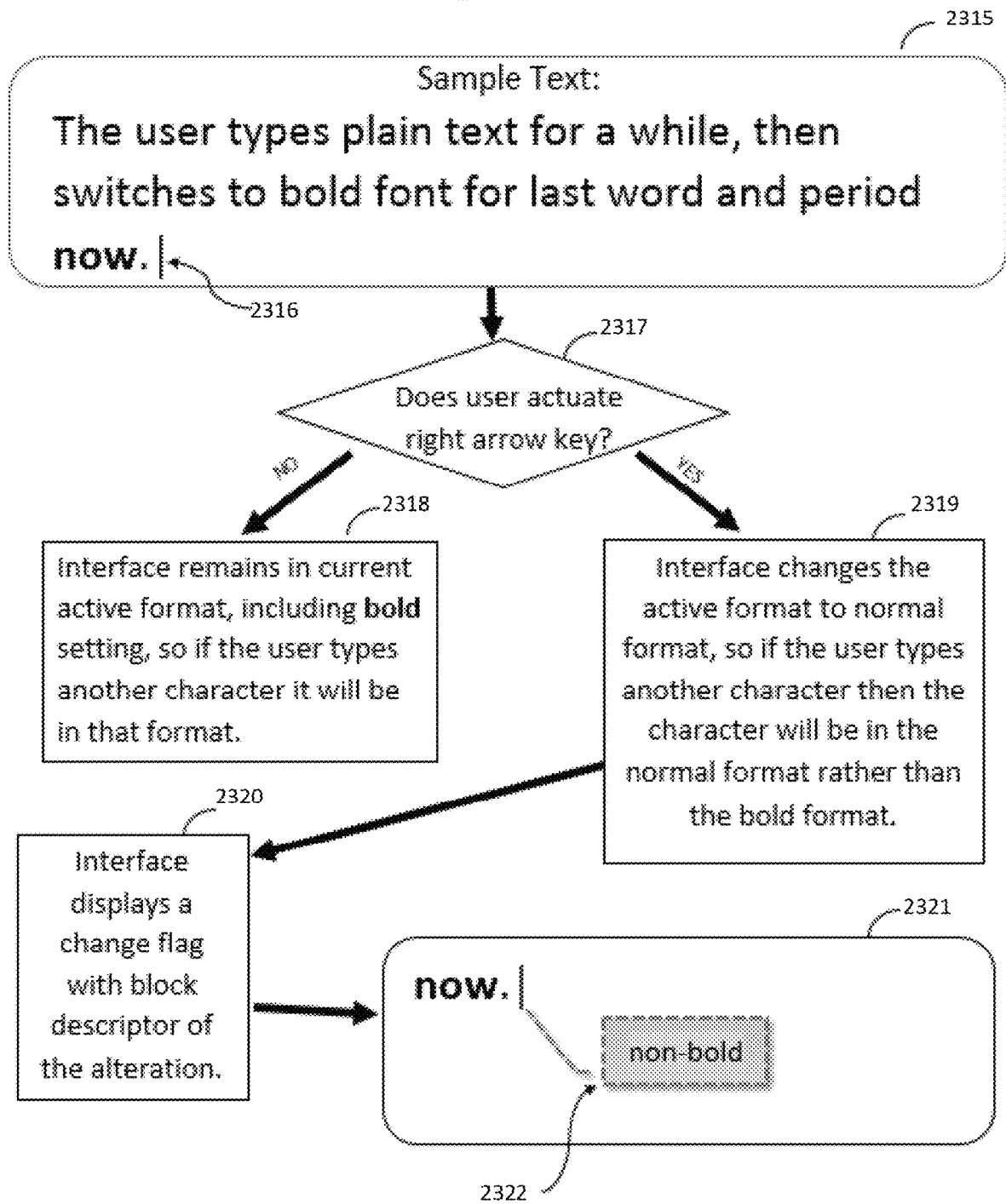
Figure 24:
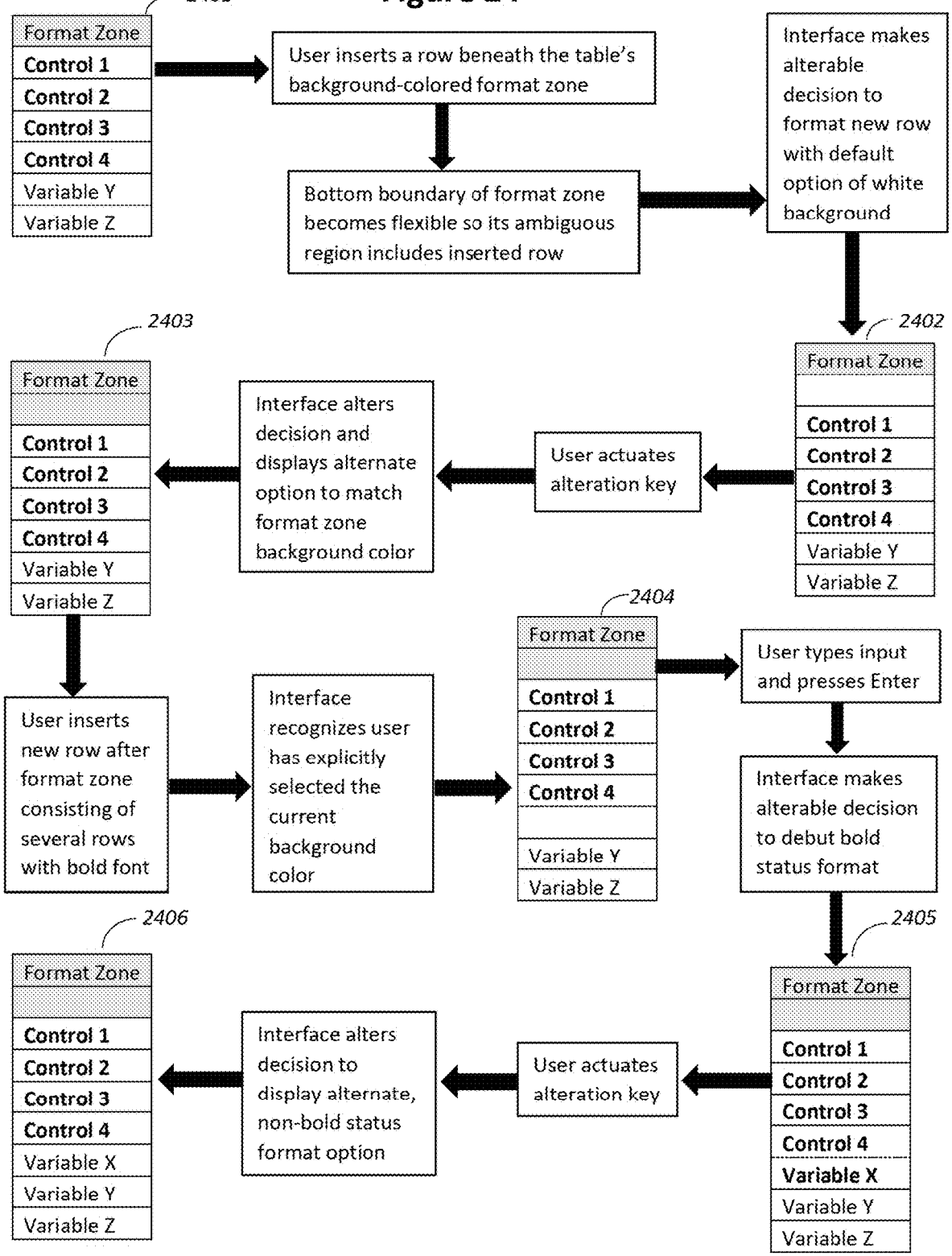
FIG. 24 illustrates alterable format expression decisions in action, according to an embodiment.

FIG. 2A illustrates what may happen as a result of repeated consecutive actuations of the alteration key in an embodiment that has an alteration key as described below and in which additional consecutive actuations of the alteration key may have additional effects as described below. Each block of the figure illustrates what the user's input will be after a certain number of consecutive actuations of the alteration key. In each block, the text that the currently alterable decision pertains to is highlighted (if there is a currently alterable decision). In each block, the number in parentheses corresponds to an interface state from FIG. 2B, and thus indicates what state the interface is in at that point. The effect of each actuation can be seen by comparing the block above that actuation's arrow to the block below it.

At the beginning of the example in FIG. 2A, the user has typed "Tursday is its premiere" but the interface has made an alterable decision to autocorrect "Tursday" to read "Tuesday" and an alterable decision to autocorrect "its" to read "it's." The text thus reads "Tuesday is it's premiere," as shown in Block 200. The alterable decision pertaining to the word "it's" is the currently alterable decision. The interface is in default operating mode as shown in FIG. 2B, Block 206.

The user then actuates the alteration key a first time. The interface alters the currently alterable decision, yielding "Tuesday is its premiere," as shown in Block 201. The alterable decision pertaining to the word "its" is still the currently alterable decision. The interface is now in alternate option selected mode as shown in FIG. 2C, Block 218.

The user then actuates the alteration key a second consecutive time. The interface alters the currently alterable decision again and thus reverts it to its default option, yielding "Tuesday is it's premiere," as shown in Block 202. The interface then causes the alterable decision pertaining to the word "Tuesday" to become the currently alterable decision, as indicated by the highlighting of that word in Block 202. The interface is now in alteration cycle operating mode as shown in FIG. 2C, Block 215.

The user then actuates the alteration key a third consecutive time and a fourth consecutive time. This yields "Thursday is it's premiere" as shown in Block 203 and then "Tursday is it's premiere" as shown in Block 204. After these actuations, the alterable decision pertaining to the word "Thursday" or "Tursday" is the currently alterable decision, and the interface is in alternate option selected mode as shown in FIG. 2C, Block 218.

The user then actuates the alteration key a fifth consecutive time. The interface reverts the currently alterable decision to its default option, yielding "Tuesday is it's premiere" as shown in Block 205. There is now no currently alterable decision, as indicated by the lack of highlighting in Block 205. The interface has returned to default operating mode as shown in FIG. 2B, Block 206.

The user then actuates the alteration key a sixth consecutive time. Because there is no currently alterable decision, this actuation of the alteration key does not affect the user's input; instead, it causes the alterable decision pertaining to the word "it's" to become the currently alterable decision again. The arrow labeled "Actuation 6" that points from Block 205 to Block 200 indicates that this sixth consecutive actuation of the alteration key causes the interface to return to the same state it was in prior to the first of these consecutive actuations of the alteration key. Subsequently, a seventh consecutive actuation of the alteration key would again yield the result shown in Block 201, and an eighth consecutive actuation would again yield the result shown in Block 202, and so on.

An Alteration Key Algorithm

FIGS. 2B and 2C are flowcharts that illustrate one possible algorithm for an embodiment that has an alteration key as described below, and in which additional consecutive actuations of the alteration key may have additional effects as described below. This algorithm yields the interface behavior that is illustrated in FIG. 2A.

In an embodiment that behaves as indicated by these flowcharts, whenever the user's most recent action was not an actuation of the alteration key (and in certain other circumstances), the interface is in a "default operating mode" as shown in FIG. 2B, Block 206. While the interface is in default operating mode, each time the user performs an editing action (Block 207) other than an actuation of the alteration key, the interface will handle that action (Block 208) and remain in default operating mode. Whenever the interface handles an editing action other than an actuation of the alteration key, this may cause the interface to update which decision is the currently alterable decision or "CAD" (Block 209): in particular, if the interface makes an alterable decision in response to an editing action, then in certain circumstances this new alterable decision will become the currently alterable decision.

While the interface is in default operating mode (Block 206), if a user actuates the alteration key (Block 210) when there is no currently alterable decision (Block 213), this actuation of the alteration key will cause the most relevant alterable decision to become the currently alterable decision (Block 214) if there is any alterable decision, or will have no effect if there are no alterable decisions; in either case, the interface will remain in default operating mode and return to Block 206.

While the interface is in default operating mode (Block 206), if the user actuates the alteration key when there is a currently alterable decision (Block 210), then the interface will add the other alterable decisions to the alteration cycle (Block 211). The interface will then select an alternate option of the currently alterable decision (Block 212, leading to FIG. 2C, Block 217) and enter an "alternate option selected mode" (Block 218). While the interface is in alternate option selected mode, each time the user actuates the alteration key (Block 220), if the currently alterable decision is a multi-alternative decision and there is an alternate option that has not yet been selected, then the interface will select such an option (Block 217) and remain in alternate option selected mode (Block 218).

While the interface is in alternate option selected mode (Block 218), if the user performs an action other than an actuation of the alteration key, then the user has explicitly selected an alternate option of the currently alterable decision (Block 226), which has effects that are described in Chapter 3. The interface will handle the action (Block 227) and revert to default operating mode (Block 206).

While the interface is in alternate option selected mode (Block 218), if the user actuates the alteration key (Block 219) when there is no alternate option (Block 220) for the currently alterable decision that has not yet been selected, the interface will revert the currently alterable decision to its default option (Block 221). The user has completed review of the currently alterable decision, which has effects that are described in Chapter 3. The interface will then move on to the next decision in the alteration cycle (Block 222), as described in the following paragraphs.

When the interface moves on to the next decision in the alteration cycle, if any alterable decisions are remaining in the alteration cycle, then the most relevant such decision will be removed from the alteration cycle and will become the new currently alterable decision (Block 225). The interface will then enter an "alteration cycle operating mode" (Block 215). The alteration cycle operating mode (Block 215) and the default operating mode (Block 206) are quite similar, but when the interface is in the alteration cycle operating mode (Block 215) it already has an alteration cycle in mind, so if the user's next action is an actuation of the alteration key (Block 216) then the interface will not need to initialize the alteration cycle before proceeding to alter the currently alterable decision (Block 217) and enter alternate option selected mode (Block 218). When the interface is in the alteration cycle operating mode (Block 215), if the user's next action is not an actuation of the alteration key, the interface will handle the action (Block 227, leading to Block 208), update which decision is the CAD (Block 209), and revert to default operating mode (Block 206).

When the interface moves on to the next decision in the alteration cycle, if no alterable decisions are remaining in the alteration cycle, there will then be no currently alterable decision (Block 223) and the interface will revert to default operating mode (Block 224, leading to Block 206).

Other algorithms that implement the same interface behavior or similar behavior will be evident to those of ordinary skill in the art.

Altering Decisions

In the present specification, the "default option" of an alterable interface decision can be the actual initial outcome of that decision, and an "alternate option" can be some other outcome that the user might prefer for that decision, except as otherwise specified. For example, in an embodiment, if the interface has automatically corrected the spelling of a word that a user typed, and the interface's decision to correct this word's spelling is an alterable interface decision, then the corrected spelling is the default option and the user's original uncorrected spelling is an alternate option.

In an embodiment, when the interface makes an alterable decision, in addition to saving enough information for the interface to subsequently identify the portion of input that the decision pertained to, the interface will also save enough information about the alternate options of that decision that the interface can later determine what the user's input would then be if an alternate option were chosen instead of the default option. For example, in an embodiment, when the interface makes an alterable decision to automatically correct a word that a user typed, the interface will save enough information to later be able to determine what the user's input would then be if the user's original uncorrected spelling were restored retroactively.

Below, various embodiments are specified in which the interface will "alter an alterable interface decision" in certain circumstances. Except as otherwise specified, when the interface alters an alterable interface decision, it replaces that decision's default option with an alternate option, without prompting the user for any additional confirmation or clarification; however, various other ways that the interface may alter an alterable interface decision in certain circumstances are specified below. In an embodiment, when the interface alters an alterable interface decision, it will retain enough information to be able to subsequently revert that decision to its default option.

In an embodiment, after a user has caused the interface to alter a decision so that an alternate option of that decision is selected, if the user then performs some action that does not cause the interface to alter that decision, this constitutes "explicitly selecting an option" of that alterable interface decision. Unless otherwise specified, when the user's most recent action caused the interface to alter a decision, the user has not yet explicitly selected an option of that alterable interface decision—not until the user performs some other action.

In an embodiment, once a user has explicitly selected an alternate option of an alterable interface decision, if the decision is still alterable, then for purposes of the alteration functionality described herein, the interface will subsequently treat the option the user explicitly selected as the default option of that particular alterable decision and will treat the former default option of that decision as an alternate option. For example, in an embodiment, after the interface makes an alterable decision to automatically replace the word "goof" with the word "good" but then the user explicitly selects the alternate option "goof," if the decision is still alterable, then "goof" will subsequently be treated as the default option of that particular decision for purposes of alteration functionality and "good" will be treated as an alternate option. (This does not mean that explicitly selecting the alternate option "goof" necessarily has any effect on future interface decisions regarding whether or not to automatically replace the word "goof": it only means that "goof" will subsequently be treated as the default option of the alterable decision the interface already made.)

In the present specification, any mention of "alteration features" or "alteration functionality" may refer to features that are disclosed herein that are specifically designed to interact with alterable interface decisions. Any mention of "altering" an alterable interface decision generally refers only to altering such a decision by means of such alteration features, and generally does not refer to manual editing of the portion of the user's input that an alterable interface decision pertains to, unless otherwise specified. For example, if the interface has made an alterable decision to automatically insert an apostrophe in the word "its," then if the user manually deletes the apostrophe, the user will not be considered to have "altered" an alterable interface decision.

The Alteration Key

In an embodiment, in certain circumstances an alterable interface decision is the "currently alterable decision" for purposes of alteration functionality. In Chapter 3, methods and systems are described for determining which alterable interface decision, if any, is the currently alterable decision at any given time. (In an embodiment, the currently alterable decision is often, but not always, the most recent alterable decision, as is explained in Chapter 3. In an embodiment, it may be possible to alter an alterable decision by various means even when it is not the so-called currently alterable decision.)

In an embodiment, the computing device has an alteration key such that when the alteration key is actuated, if there is a currently alterable decision, then the interface will immediately alter that decision. For example, if the interface has made an alterable decision to automatically insert an apostrophe in the word "its" and that decision is the currently alterable decision, then actuating the alteration key will cause that apostrophe to be deleted, regardless of the input cursor's current location, without prompting the user for any additional confirmation or clarification. Such an alteration key will often enable a user to correct an undesired outcome of an interface decision with a single keystroke, without the need to go back and manually correct the interface decision.

In an embodiment, when the alteration key is actuated, if there is then no currently alterable decision but at least one alterable decision exists, then in response to that actuation of the alteration key the interface will cause the "most relevant decision" as defined in Chapter 3 to become the currently alterable decision, and no other effect will occur. (In such an embodiment, it may be particularly advantageous for the interface to then highlight the currently alterable decision, as is described in Chapter 5, so that the user can see the effect of such an actuation of the alteration key.) This behavior is illustrated by Actuation 6 of FIG. 2A.

As is discussed in Chapter 1, the alteration "key" need not necessarily be an individual key on a hardware keyboard, but may be any means of invoking the function that is specified above in the description of the alteration key. For example, in various embodiments, a key labeled "Oops" on a hardware keyboard may be the alteration key, or the F12 key may be the alteration key, or the key combination Ctrl-T may be the alteration key, or a specific virtual key on a virtual keyboard may be the alteration key, and so forth.

Deleting Alterable Decisions

In the present specification, when an alterable interface decision is said to "cease to exist," this means that subsequently none of the functionality disclosed herein that pertains to alterable interface decisions will treat that decision as an alterable interface decision, unless otherwise specified. For example, if an alterable interface decision has "ceased to exist," then that alterable interface decision cannot be the currently alterable decision and actuating the alteration key will not alter that decision. This does not mean that the portion of input that the decision pertained to ceases to exist. After an alterable interface decision has ceased to exist, information about the alterable interface decision may still be retained in the memory of the computing device for various purposes, such as for purposes of the automatic decision variation feature described in Chapter 17 and the manual alteration detection feature described in Chapter 18. In the present specification, if an alterable interface decision is said to be "deleted," this means that the alterable interface decision ceases to exist.

In an embodiment, if an action that causes an alterable interface decision to cease to exist is subsequently undone by means of the Undo key, then the alterable interface decision will be made to exist once again.

In an embodiment, an alterable interface decision will immediately cease to exist if the portion of input that it pertains to is deleted, because that alterable interface decision is no longer applicable. For example, when the interface has made an alterable decision to automatically convert the word "friday" to "Friday," that alterable interface decision will cease to exist if the entire sentence containing the word "Friday" is deleted.

In an embodiment, an alterable interface decision will immediately cease to exist if the portion of input that it pertains to is modified in some way other than by means of altering that particular interface decision, if the modification is sufficiently relevant to the nature of the alterable decision. For example, in an embodiment, when the interface has made an alterable decision to automatically convert the word "friday" to "Friday," that alterable interface decision will cease to exist if the user manually changes the word to "Friendly," but not if the user italicizes the word. In such an embodiment, in certain circumstances, the interface may make more than one alterable decision that pertains to the same portion of input, and altering one such decision need not necessarily cause all the other decisions that pertain to the same portion of input to cease to exist. For example, in an embodiment, if the interface makes an alterable decision to convert the word "friday" to "Friday," and the interface also makes an alterable decision whether or not to italicize this word, then the user can alter either, both, or neither of these two decisions.

In an alternative embodiment, an alterable interface decision will immediately cease to exist if the portion of input that it pertains to is modified in some way other than by means of altering that particular interface decision, regardless of whether or not the modification is relevant to the nature of the alterable decision.

In an alternative embodiment, an alterable interface decision will not necessarily cease to exist immediately as soon as the portion of input that it pertains to is deleted or modified: instead, as soon as it becomes relevant whether or not a particular alterable interface decision still exists, the interface will determine whether the portion of input that alterable decision pertains to appears to have been deleted or modified. For example, in such an embodiment, if a certain portion of input that an alterable interface decision pertains to is deleted and is then retyped exactly as before, the interface may not notice that such activity occurred and may not delete the alterable decision in response to such activity.

In an embodiment, when an alterable interface decision is altered, no other alterable interface decision will be deleted in response to the alteration of that alterable interface decision until the user has explicitly selected an option of that decision, and then only if deletion of the other decision is appropriate based on the option the user selected. In other words, in such an embodiment, if for example a user cycles past various options of an alterable interface decision by repeatedly actuating the alteration key as is described below, then no option that is only temporarily selected will cause any other alterable interface decision to permanently cease to exist.

In implementing an embodiment, a programmer should ensure by some means that if the interface makes an alterable decision and saves information regarding that alterable decision, subsequent editing actions do not cause that information to become inaccurate while it is still possible for the user to cause the interface to alter the decision. For example, if the interface alterably decides to capitalize the word "friday" and saves the information that it alterably chose to capitalize the 100th character in the document the user was editing, then this is sufficient information for the interface to be able to alter that decision by locating that letter F and converting it back to lowercase, but if subsequently the user moves the input cursor to the beginning of the document and inserts additional text there, then that letter F is no longer the 100th character of the document, so the interface should either update its information or delete the alterable decision. Those of ordinary skill in the art will understand how to implement an embodiment that updates location data for alterable decisions when appropriate. However, in an alternative embodiment, the interface deletes every alterable decision whenever a user either performs an action that directly affects input that precedes the current input cursor location or performs an action that moves the input cursor to an earlier location; in such an alternative embodiment, it is thus impossible to edit a portion of the document that is prior to the location of any alterable decision without deleting the alterable decision, and so it may never be necessary to update location data for alterable decisions. Such an alternative embodiment may be somewhat less advantageous, but may still have advantages over prior art, and may take less effort to implement.

The Alteration Key in Perspective

The alteration key as described herein is an unusually efficient means of recovering from a mistake. Generally, prior art mistake recovery features require a user to perform at least two gestures: one gesture to indicate the location of the mistake and cause the interface to display one or more possible corrections, and another gesture to select the desired correction. A single actuation of the alteration key is faster than that two-step process; in fact, for a user who has become accustomed to the alteration key, a single actuation of the alteration key will probably be faster than the first step of that process in most cases.

In many prior art interfaces, a user can fully recover from an undesired interface intervention by means of a single actuation of the Undo key in most cases provided that the user has not performed any other action since the undesired interface intervention occurred. However, if a user performs even one action before noticing an undesired interface intervention, then fully recovering from the mistake by means of the Undo key will require a three-step process: the user must undo everything he did after the undesired interface intervention occurred, and then must actuate the Undo key once more to undo the undesired interface intervention, and then must repeat everything he did after the undesired interface intervention occurred. It is quite common to not notice an undesired interface intervention right away, so in many cases the alteration key will be more efficient than prior art, even for correcting undesired interface interventions.

The present specification includes many illustrative examples of altering decisions, and many of these examples refer to the alteration key. In particular, in various places, in order to show that it may be advantageous to make some particular type of interface decision be an alterable interface decision, the present specification provides an example scenario in which a user who makes a particular type of mistake can easily correct the mistake with just a single actuation of the alteration key. Such examples are not intended to imply that an embodiment must necessarily have an alteration key in order for it to be possible to alter decisions; on the contrary, other means of altering decisions are described below, including means that may be more convenient than the alteration key in certain circumstances. It is to be understood that it may be useful to make various types of interface decisions be alterable decisions even in an embodiment that does not have an alteration key. For that reason, the behavior that constitutes "altering a decision" is defined herein in terms that do not explicitly refer to the alteration key.

Multi-Alternative Decisions

In an embodiment, in certain circumstances, when the interface makes an alterable decision in which the interface selects among more than two relevant available options, the interface will save enough information to later replace the option that was selected with any of the plurality of options that were not selected. In such a case, the alterable decision will have more than one alternate option. In the present specification, an alterable interface decision that has more than one alternate option will be referred to as a "multi-alternative decision"; an alterable interface decision that has only one alternate option will be referred to as a "single-alternative decision." (These terms thus refer to the number of alternate options of an alterable decision, not counting the default option.)

In an embodiment, after the interface has made an alterable interface decision, in certain circumstances, the interface may later add more alternate options to that alterable interface decision or may later remove alternate options from that alterable interface decision. In such an embodiment, it may be possible for a single-alternative decision to later become a multi-alternative decision, or vice versa.

In an embodiment, when the interface first alters a multi-alternative decision, in addition to selecting an alternate option of the decision, the interface will create a list of alternate options of that decision that have been selected. In an embodiment, when the interface alters a multi-alternative decision that the interface has previously altered, if an alternate option currently exists that has not been selected, then interface will replace the selected alternate option with an alternate option that has not yet been selected and will then add the newly selected alternate option to the list of alternate options that have been selected. For example, in a certain embodiment, when a user types the word "Tursday" and presses the space bar key the interface may make a decision between three options: leaving the word as "Tursday," correcting the word to read "Tuesday," or correcting the word to read "Thursday"; if the interface initially decides to correct the word to read "Tuesday," such a correction may be a multi-alternative decision such that if the user then actuates the alteration key once the word will be changed to "Thursday" and if the user then actuates the alteration key a second consecutive time the word will be changed to "Tursday." This example corresponds to Actuations 3 and 4 of FIG. 2A. Thus, in such an embodiment, if the interface responds to a first actuation of the alteration key by selecting an alternate option that is not the particular alternate option a user desired, then the user can simply continue to actuate the alteration key repeatedly until the desired alternate option becomes selected.

Reverting Alterable Decisions

In an embodiment, when the interface alters a single-alternative decision, if the decision already has its alternate option selected, then the interface reverts that decision to its default option. For example, if the currently alterable decision is the interface's decision to insert an apostrophe in the word "it's," and if this decision is a single-alternative decision, then after the user actuates the alteration key once and thus causes the apostrophe to be deleted, actuating the alteration key a second consecutive time will cause the apostrophe to be inserted again, as is illustrated by Actuation 2 of FIG. 2A. Similarly, in an embodiment, when the interface alters a multi-alternative decision, if the decision has already been altered sufficiently many times that it is no longer possible for the interface to again replace the selected alternate option with a different alternate option that has not been selected yet, then the interface will instead revert that decision to its default option, as is illustrated by Actuation 5 of FIG. 2A. Thus, in such an embodiment, if in response to an actuation of the alteration key the interface actually introduces a new mistake by changing a decision that the user did not want to change, then the user can correct this mistake by continuing to actuate the alteration key repeatedly until the decision reverts to its default option.

In an embodiment, once a user causes the interface to alter an alterable decision sufficiently many times that the decision reverts to its default option, the user has "completed review" of that alterable interface decision. When a user causes the interface to alter an alterable decision sufficiently many times that every alternate option of that decision has been selected at some point, the user still has not "completed review" of that decision until the user causes that decision to revert to its default option.

In an embodiment, after the interface reverts a multi-alternative alterable decision to its default option, the interface will discard or empty its list of alternate options of that decision that have been selected, which means that the interface will subsequently regard each alternate option as though it had not been selected yet, and so continuing to repeatedly alter that particular decision will cause the interface to cycle through the various alternate options again.

The Alteration Cycle

In an embodiment, for purposes of the interface behaviors described in the following paragraphs, the alteration key is an "alteration-cycle-related key." Other alteration-cycle-related keys are described in Chapter 9.

In an embodiment, except as otherwise specified, whenever the user's most recent action was not an actuation of an alteration-cycle-related key, the currently alterable decision is the "most relevant" alterable interface decision as defined below. (In an embodiment, the most relevant alterable decision is often, but not always, the most recent alterable decision, as is explained in Chapter 3.)

In an embodiment, when a user actuates the alteration key or some other alteration-cycle-related key, if the user's most recent previous action was not an actuation of an alteration-cycle-related key, then the interface will determine an "alteration cycle" that initially includes every alterable decision other than the currently alterable decision. The interface will continue to remember this alteration cycle until the user performs an action that is not an actuation of an alteration-cycle-related key, except as otherwise specified below. (Once the user performs an action that is not an actuation of an alteration-cycle-related key this alteration cycle is no longer relevant, so after that, the next time the user actuates an alteration-cycle-related key, the interface will determine a new, updated alteration cycle.)

In an embodiment, when a user performs an actuation of the alteration key that causes the currently alterable decision to revert to its default option, the interface will "move on to the next decision in the alteration cycle." When the interface moves on to the next decision in the alteration cycle, this means that if any decisions remain in the alteration cycle, then the most relevant decision that is in the alteration cycle will be removed from the alteration cycle and will become the new currently alterable decision. This is illustrated by Actuation 2 of FIG. 2A, which not only causes an alterable decision to revert to its default option but also causes a different alterable decision to become the new currently alterable decision. Thus, in an embodiment, if a user does not notice that a particular alterable decision had an undesired outcome until after the interface has made other alterable decisions, then as long as that particular decision is still alterable, it is still possible for the user to correct the mistake by means of the alteration key: the user can repeatedly press the alteration key sufficiently many times to cycle past any more relevant alterable decisions (which are, in most cases, the more recent alterable decisions) and then press the alteration key again to alter the decision that had the undesired outcome.

In an alternative embodiment, when a user performs an actuation of the alteration key that causes the currently alterable decision to revert to its default option, if any decisions remain in the alteration cycle, then the interface will move on to the next decision in the alteration cycle as described in the preceding paragraph, and will also alter the new currently alterable decision (if any). (In such an embodiment, it may be particularly advantageous to have a No key or Escape key that can revert the currently alterable decision to its default option without affecting any other alterable decision, as is described in Chapter 9.)

In an embodiment, if no decisions are in the alteration cycle when the interface moves on to the next decision in the alteration cycle, then there will cease to be a currently alterable decision and this alteration cycle will no longer be relevant, as is illustrated by Actuation 5 in FIG. 2A. In an embodiment, after this happens, if the user's next action is an actuation of the alteration key, then that actuation of the alteration key will have the same effect as though it were a nonconsecutive actuation of the alteration key: the most relevant alterable decision will become the currently alterable decision, and the interface will determine a new, updated alteration cycle. This behavior is illustrated by Actuation 6 in FIG. 2A, which returns the user's input to its initial state so that a seventh consecutive actuation of the alteration key would have the same effect that Actuation 1 had. Thus, in such an embodiment, by continuing to actuate the alteration key consecutively, a user may repeatedly cycle through alterable interface decisions.

In an alternative embodiment, if no decisions are in the alteration cycle when the interface moves on to the next decision in the alteration cycle, then there will cease to be a currently alterable decision, and any further consecutive actuations of the alteration key will have no effect: there will be no currently alterable decision until after the user performs an action that is not an actuation of an alteration-cycle-related key.

In another alternative embodiment, if no decisions are in the alteration cycle when the interface moves on to the next decision in the alteration cycle, then the most relevant alterable decision will become the new currently alterable decision (even if it was the previous currently alterable decision) and the interface will add every alterable decision other than that decision to the alteration cycle. In such an embodiment, by continuing to actuate the alteration key consecutively, a user may repeatedly cycle through alterable interface decisions without arriving at any intermediate state in which there is no currently alterable decision.

In an embodiment that behaves as described in the preceding paragraphs, when a user is actuating the alteration key repeatedly, the alteration cycle contains all the alterable decisions that have not yet become the currently alterable decision. It will be evident to those of ordinary skill in the art that alternative embodiments can be constructed where the interface behaves the same way as an embodiment that has an alteration cycle as described above, but where this interface behavior is achieved by a slightly different means. For example, in one alternative embodiment, instead of keeping track of an alteration cycle that contains all the alterable decisions that have not yet become the currently alterable decision, the interface keeps track of a "used decision list" of all the alterable decisions that have already become the currently alterable decision, and when the interface "moves on to the next decision in the alteration cycle," this means that first the currently alterable decision is added to the used decision list, and then if there are any remaining alterable decisions that are not in the used decision list then the most relevant remaining alterable decision becomes the new currently alterable decision.

Specialized Alteration Cycles

Farther below, certain user actions are described such that when a user performs the action, the interface will alter an alterable interface decision that fits certain criteria, in some embodiments. Unless otherwise specified, when performing an action is said to cause the interface to alter an alterable interface decision that fits certain criteria, this means that the action serves the purpose of an alteration key that affects only alterable decisions that fit the criteria, in an embodiment (regardless of whether the embodiment has an alteration key).

In other words, if performing an action is said to cause the interface to alter an alterable interface decision that fits certain criteria, this means that in an embodiment, when the user performs such an action, if the user's previous action was not the exact same action, then the interface will alter the most relevant alterable decision that fits the criteria, and will determine and remember a specialized alteration cycle that includes any other alterable decisions that fit the same criteria. If the user then performs the exact same action several more times consecutively, then after the interface reverts the most relevant decision that fits the criteria to its default option, the interface will begin to cycle through the options of the other alterable decisions in the specialized alteration cycle.

For example, in an embodiment that is described in Chapter 25, a spoken alteration command exists such that if a user says "Alter 'its'" then the interface will alter an alterable interface decision pertaining to an occurrence of the word "its," if any such alterable decision exists. Where that interface behavior is explained, it is not explicitly specified what will happen if a user says "Alter 'its'" when more than one alterable decision exists that pertains to an occurrence of the word "its"; nevertheless, even though it is not explicitly specified below, in light of the above paragraphs it is to be understood that, in an embodiment, in such circumstances the interface will alter the most relevant alterable decision that pertains to an occurrence of the word "its," and then if the user repeats the same spoken command sufficiently many times consecutively, the interface will eventually cycle through every alterable decision that pertains to an occurrence of the word "its."

Repeated Alteration Features in Perspective

In some embodiments, a user may be able to correct a wide variety of mistakes with just a single actuation of the alteration key, with no need to explicitly specify what mistake to correct or what correction is desired, because in many cases the currently alterable decision will be the mistake the user wishes to correct and the first alternate option will be the desired correction. The alteration key may therefore be advantageous even in an embodiment where only a first actuation of the alteration key has any effect.

However, the alteration key may be significantly more advantageous in an embodiment where additional consecutive actuations of the alteration key have additional effects as described above. In such an embodiment, when a first actuation of the alteration key makes a different change than the one a user desires, additional consecutive actuations of the alteration key may revert the undesired change and/or make the desired change. It is usually possible to actuate a single key multiple consecutive times relatively quickly, so actuating the alteration key several consecutive times in order to achieve a desired result may still be a fairly efficient way to achieve that result. Likewise, for similar reasons, various other means of alteration that are described below may be more advantageous in an embodiment where additional consecutive alterations may have additional effects.

What is claimed is:

1. A computing device having an interface with retroactive input state alteration, the device comprising:
   at least one display configured to display user input;
   a memory unit configured to store at least a currently selected input state comprising contextual information affecting subsequently entered input;
   an input device configured to allow a user to enter input, and configured to allow a user to select a desired input state;
   at least one non-transitory computer readable medium having stored thereon executable instructions;
   at least one processor in communication with the at least one non-transitory computer readable medium and configured to execute the instructions to cause the system to:
      in response to an entry of a portion of input, identify one or more alternative input states for that portion of input such that each alternative input state comprises an input state that, had it been selected when the portion of input was entered, would have yielded results that the user might have preferred over the results that actually obtained;
      upon identifying one or more alternative input states for a portion of input, store in memory information associating the one or more alternative input states with the portion of input; and
      in response to a triggering user action, perform a retroactive alteration of a previously entered portion of input such that the previously entered portion of input becomes as though it had been entered while an associated alternative input state had been in effect.

2. The computing device of claim 1, wherein the input device comprises at least an alteration key, and wherein the triggering user action comprises an actuation of the alteration key.

3. The computing device of claim 1, wherein the input state comprises at least a text format, and wherein an alternative input state associated with a portion of input may comprise a different text format than the text format that was selected when the portion of input was entered, and wherein in response to a triggering user action a retroactive alteration may cause the text format of a previously entered portion of input to change.

4. The computing device of claim 1, wherein the input state comprises at least an input location, and wherein an alternative input state associated with a portion of input may comprise a different location than the location where the portion of input was entered, and wherein in response to a triggering user action a retroactive alteration may cause the location of a previously entered portion of input to change.

5. The computing device of claim 4, wherein:
   the input state comprises the location of an insertion caret within a document; wherein the at least one display is further configured to in certain circumstances display at least a portion of a document in a document window; and
   the system is further configured to, in response to an entry of a portion of input such that immediately prior to the entry of the portion of input the insertion caret was positioned at a location in the document that was not currently visible in the document window, identify an alternative input location for that portion of input such that immediately prior to the entry of the portion of input the alternative input location was currently visible in the document window.

6. The computing device of claim 4, wherein the system is further configured to, in response to an entry of a portion of input, preemptively alter the input location of the currently selected input state in certain circumstances, and to in such circumstances associate with the portion of input an alternative input state corresponding to the location where the portion of input would have been entered had the input location not been preemptively altered.

7. The computing device of claim 6, wherein the computing device further comprises a user-facing camera, and wherein the system is further configured to, in response to an entry of a portion of input, determine whether or not it can be determined that immediately prior to the entry of the portion of input the user was looking at a location within the at least one display where input could be entered but was not looking at the input location of the currently selected input state, and in the circumstances wherein it can indeed be determined that the user was looking at a location where input could be entered but was not looking at the input location of the currently selected input state, to preemptively alter the input location of the currently selected input state so that it corresponds to a location that the user may have been looking at, and to in such circumstances associate with the portion of input an alternative input state corresponding to the location where the portion of input would have been entered had the input location not been preemptively altered.

8. The computing device of claim 7, wherein the system comprises at least two displays, and wherein the at least two displays are configured to display an insertion caret, and wherein the system is configured to in certain circumstances determine whether or not the user was looking at a particular display at a particular point in time, and wherein the system is configured to, in response to a entry of a portion of input, determine whether or not it can be determined that immediately prior to the entry of the portion of input the user was looking at a particular display that is not the display where the insertion caret was visible, and in the circumstances wherein it can indeed be determined that the user was looking at a particular display that is not the display where the insertion caret was visible, to preemptively alter the input location of the currently selected input state so that it corresponds to a location within the display that the user was looking at, and to in such circumstances associate with the portion of input an alternative input state corresponding to the location where the portion of input would have been entered had the input location not been preemptively altered.

9. The computing device of claim 4, wherein the system is further configured so that when a portion of input has been entered such that if the user were to perform a triggering user action then a retroactive alteration would cause the location of the portion of input to change, the system determines the location where the input would be moved if the user were to perform the triggering user action, and the system displays at that location a message explaining how to perform the triggering user action.

10. The computing device of claim 4, wherein the one or more displays are configured so that when a portion of input has been entered such that if the user were to perform a triggering user action then a retroactive alteration would cause the location of the portion of input to change, the input is highlighted in its current location, and the location to which the input will be moved if the user performs the triggering user action is also highlighted.

11. A computing device having an interface with alternative input location highlighting, the device comprising:
at least one display configured to display user input;
a memory unit configured to store at least a currently selected input state comprising at least an input location affecting where subsequently entered input will appear;
an input device configured to allow a user to enter input, and configured to enable a user to execute one or more available commands;
at least one non-transitory computer readable medium having stored thereon executable instructions;
at least one processor in communication with the at least one non-transitory computer readable medium and configured to execute the instructions to cause the system to:
in certain circumstances, in response to at least one of the one or more available commands, cause the entry of input at a location that is not the input location of the currently selected input state;
in circumstances where the user's next action could be a command that would cause the entry of input at a location that is not the input location of the currently selected input state, visually highlight that location that is not the input location of the currently selected input state.

12. The computing device of claim 11, wherein the one or more available commands comprise an least an alteration command; and wherein the system is further configured to, in certain circumstances, in response to the alteration command, move input to a location that is not the input location of the currently selected input state; and wherein the system is further configured to, in circumstances where executing the alteration command would cause input to appear at a location that is not the input location of the currently selected input state, visually highlight that location.

13. The computing device of claim 11, wherein the one or more available commands comprise at least an undo command; and wherein the system is further configured to, in certain circumstances, in response to the undo command, insert previously deleted input; and wherein the system is further configured to, in circumstances where executing the undo command would cause previously deleted input to be inserted, visually highlight the location where the previously deleted input will be inserted if the user's next action is an execution of the undo command.

14. The computing device of claim 13, wherein the system is further configured to, whenever executing the undo command would cause previously deleted input to be inserted, visually highlight the location where the previously deleted input will be inserted if the user's next action is an execution of the undo command only if the user's most recent action was either an execution of the undo command or an execution of a redo command; and wherein the system is further configured to, whenever it is the case that the user's most recent action was either an execution of the undo command or an execution of a redo command and it is also the case that if the user's next action is an execution of the undo command then user input that is currently present will be modified or deleted, visually highlight the user input that will be modified or deleted if the user's next action is an execution of the undo command.

15. The computing device of claim 14, wherein the one or more available commands additionally comprise at least a redo command; and wherein the system is further configured to, whenever it is the case that the user's most recent action was either an execution of the undo command or an execution of the redo command, visually highlight the user input that will modified or deleted if the user's next action is an execution of the redo command if such input exists, and visually highlight the location where input will be inserted if the user's next action is an execution of the redo command if such a location exists.

16. The computing device of claim 15, wherein the highlighting of user inputs and/or locations that will be affected if the user's next action is an execution of the redo command has a different appearance than the highlighting of user inputs and/or locations that will be affected if the user's next action is an execution of the undo command.

17. A computing device having an interface with undo scope selection, the device comprising:
- a memory unit configured to store at least one or more undo buffers comprising information regarding past user actions, and configured to store at least information regarding a currently selected undo scope;
- an input device configured to enable a user to execute at least an undo command;
- at least one non-transitory computer readable medium having stored thereon executable instructions comprising at least one operating system and at least one software application;
- at least one processor in communication with the at least one non-transitory computer readable medium and configured to execute the instructions to cause the system to:
  - in response to a triggering user action, allow a user to select between an undo scope comprising only the currently active application and an undo scope comprising the entire computing device;
  - in response to an execution of the undo command, if the currently selected undo scope comprises the entire computing device, undo the most recent user action that has not yet been undone that is stored within any of the one or more undo buffers.

18. The computing device of claim 17, wherein the input device is further configured to enable a user to execute at least copy and paste commands, and wherein the memory is further configured to include a clipboard that is the destination for copy commands and the source for paste commands, and wherein the system is further configured to allow the user to select between a setting wherein executing an undo command may affect the contents of the clipboard and a setting wherein executing an undo command cannot affect the contents of the clipboard.

19. The computing device of claim 17, wherein the computing device comprises at least one computer writeable persistent storage medium, and wherein the system is further configured to allow the user to select between a setting wherein executing an undo command may affect the contents of the at least one persistent storage medium and a setting wherein executing an undo command cannot affect the contents of the at least one persistent storage medium.

20. The computing device of claim 17, wherein the input device is further configured to enable a user to execute at least an undo rewind command, and wherein the system is further configured to, in response to an execution of the undo rewind command, execute the undo command repeatedly at intervals until the user performs an action or until no user actions that have not yet been undone remain in any of the one or more undo buffers, whichever comes first.

\* \* \* \* \*